US008712162B2

(12) United States Patent
Kirsch

(10) Patent No.: US 8,712,162 B2
(45) Date of Patent: Apr. 29, 2014

(54) INTEREST POINT DETECTION

(75) Inventor: Graham Kirsch, Bramley (GB)

(73) Assignee: Aptina Imaging Corporation, George Town (KY)

( * ) Notice: Subject to any disclaimer, the term of this patent is extended or adjusted under 35 U.S.C. 154(b) by 387 days.

(21) Appl. No.: 13/161,324

(22) Filed: Jun. 15, 2011

(65) Prior Publication Data
US 2012/0183224 A1 Jul. 19, 2012

(30) Foreign Application Priority Data

Jan. 18, 2011 (GB) .................................. 1100848.9

(51) Int. Cl.
*G06K 9/46* (2006.01)
*G06K 9/66* (2006.01)

(52) U.S. Cl.
USPC .......................................... 382/195; 382/264

(58) Field of Classification Search
USPC .................................................. 382/195, 264
See application file for complete search history.

(56) References Cited

U.S. PATENT DOCUMENTS

| 7,869,640 | B2* | 1/2011 | Yamagata et al. | 382/128 |
|---|---|---|---|---|
| 8,189,945 | B2* | 5/2012 | Stojancic et al. | 382/264 |
| 8,265,415 | B2* | 9/2012 | Choi et al. | 382/264 |
| 2007/0183683 | A1* | 8/2007 | Ricard et al. | 382/264 |
| 2009/0169107 | A1 | 7/2009 | Chien et al. | |
| 2010/0080469 | A1 | 4/2010 | Liu et al. | |
| 2010/0169576 | A1 | 7/2010 | Chen | |
| 2010/0310177 | A1 | 12/2010 | Xiong et al. | |
| 2012/0008862 | A1* | 1/2012 | Das Gupta et al. | 382/167 |
| 2012/0182442 | A1* | 7/2012 | Kirsch | 348/222.1 |
| 2012/0183224 | A1* | 7/2012 | Kirsch | 382/195 |
| 2012/0274627 | A1* | 11/2012 | Huggett et al. | 345/419 |

FOREIGN PATENT DOCUMENTS

| CN | 1987928 | 6/2007 |
|---|---|---|
| CN | 101488217 | 7/2009 |
| KR | 200920452 | 2/2009 |
| WO | 03009579 | 1/2003 |
| WO | 2004055724 | 7/2004 |

OTHER PUBLICATIONS

Huggett, Anthony, GB Patent Application #1100850.5, filed Jan. 18, 2011.
Kirsch, Graham, GB Patent Application #1100848.9, filed Jan. 18, 2011.
H. Bay, "From Wide-baseline Point and Line Correspondences to 3D", Ph.D. Thesis, ETH Zurich, 2006 [online], [retrieved on Jun. 17, 2011]. Retrieved from the Internet: <URL:http://e-collection.library.ethz.ch/eserv/eth:28817/eth-28817-01.pdf> and <URL:http://e-collection.library.ethz.ch/eserv/eth:28817/eth-28817-02.pdf>.

(Continued)

*Primary Examiner* — Gregory M Desire
(74) *Attorney, Agent, or Firm* — David C. Kellogg

(57) ABSTRACT

Interest points are markers anchored to a specific position in a digital image of an object. They are mathematically extracted in such a way that, in another image of the object, they will appear in the same position on the object, even though the object may be presented at a different position in the image, a different orientation, a different distance or under different lighting conditions. Methods are disclosed that are susceptible to implementation in hardware and corresponding hardware circuits are described.

18 Claims, 24 Drawing Sheets

(56) References Cited

OTHER PUBLICATIONS

Lowe, David G., "Distinctive Image Features from Scale-Invariant Keypoints", Journal Name: International Journal of Computer Vision, Cover Date: Nov. 1, 2004, Publisher: Springer Netherlands, Issn: 0920-5691, Subject: Computer Science, Start p. 91, End p. 110, vol. 60, Issue: 2, Url: http://dx.doi.org/10.1023/B:VISI.0000029664.99615.94, Doi: 10.1023/B:VISI.0000029664.99615.94, [online], [retrieved on Jun. 17, 2011]. Retrieved from the Internet: <URL:http://people.cs.ubc.ca/~lowe/paper/ijcv04.pdf>.

Herbert Bay, Andreas Ess, Tinne Tuytelaars, Luc Van Gool, "SURF: Speeded Up Robust Features", Computer Vision and Image Understanding (CVIU), vol. 110, No. 3, pp. 346-359, 2008, [online], [retrieved on Jun. 17, 2011]. Retrieved from the Internet: <URL:ftp://ftp.vision.ee.ethz.ch/publications/articles/eth_biwi_00517.pdf>.

Bay, Herbert, Tuytelaars, Tinne, Van Gool, Luc, "SURF: Speeded Up Robust Features", Computer Vision—ECCV 2006, Lecture Notes in Computer Science, Copyright: 2006, Publisher: Springer Berlin / Heidelberg, Start p. 404, End p. 417, vol. 3951, <Url: http://dx.doi.org/10.1007/11744023_32>.

S. Winder, Gang Hua, M. Brown, "Picking the best DAISY," cvpr, pp. 178-185, 2009 IEEE Conference on Computer Vision and Pattern Recognition, 2009.

"Tutorials—SIFT", VLFeat.org, [online], [retrieved on Jun. 17, 2011]. Retrieved from the Internet: <URL:http://www.vlfeat.org/overview/sift.htmlf>.

Huggett, Anthony, U.S. Appl. No. 13/149,824, filed May 31, 2011.

\* cited by examiner $$\begin{bmatrix}
\text{SURF KERNELS: 9x9} & & \\
\begin{matrix}
0 & 0 & 0 & 0 & 0 & 0 & 0 & 0 & 0 \\
0 & 0 & 0 & 0 & 0 & 0 & 0 & 0 & 0 \\
1 & 1 & 1 & -2 & -2 & -2 & 1 & 1 & 1 \\
1 & 1 & 1 & -2 & -2 & -2 & 1 & 1 & 1 \\
1 & 1 & 1 & -2 & -2 & -2 & 1 & 1 & 1 \\
1 & 1 & 1 & -2 & -2 & -2 & 1 & 1 & 1 \\
1 & 1 & 1 & -2 & -2 & -2 & 1 & 1 & 1 \\
0 & 0 & 0 & 0 & 0 & 0 & 0 & 0 & 0 \\
0 & 0 & 0 & 0 & 0 & 0 & 0 & 0 & 0
\end{matrix}
&
\begin{matrix}
0 & 0 & 1 & 1 & 1 & 1 & 1 & 0 & 0 \\
0 & 0 & 1 & 1 & 1 & 1 & 1 & 0 & 0 \\
0 & 0 & 1 & 1 & 1 & 1 & 1 & 0 & 0 \\
0 & 0 & -2 & -2 & -2 & -2 & -2 & 0 & 0 \\
0 & 0 & -2 & -2 & -2 & -2 & -2 & 0 & 0 \\
0 & 0 & -2 & -2 & -2 & -2 & -2 & 0 & 0 \\
0 & 0 & 1 & 1 & 1 & 1 & 1 & 0 & 0 \\
0 & 0 & 1 & 1 & 1 & 1 & 1 & 0 & 0 \\
0 & 0 & 1 & 1 & 1 & 1 & 1 & 0 & 0
\end{matrix}
&
\begin{matrix}
0 & 0 & 0 & 0 & 0 & 0 & 0 & 0 & 0 \\
0 & 1 & 1 & 1 & 0 & -1 & -1 & -1 & 0 \\
0 & 1 & 1 & 1 & 0 & -1 & -1 & -1 & 0 \\
0 & 1 & 1 & 1 & 0 & -1 & -1 & -1 & 0 \\
0 & 0 & 0 & 0 & 0 & 0 & 0 & 0 & 0 \\
0 & -1 & -1 & -1 & 0 & 1 & 1 & 1 & 0 \\
0 & -1 & -1 & -1 & 0 & 1 & 1 & 1 & 0 \\
0 & -1 & -1 & -1 & 0 & 1 & 1 & 1 & 0 \\
0 & 0 & 0 & 0 & 0 & 0 & 0 & 0 & 0
\end{matrix}
\end{bmatrix}$$

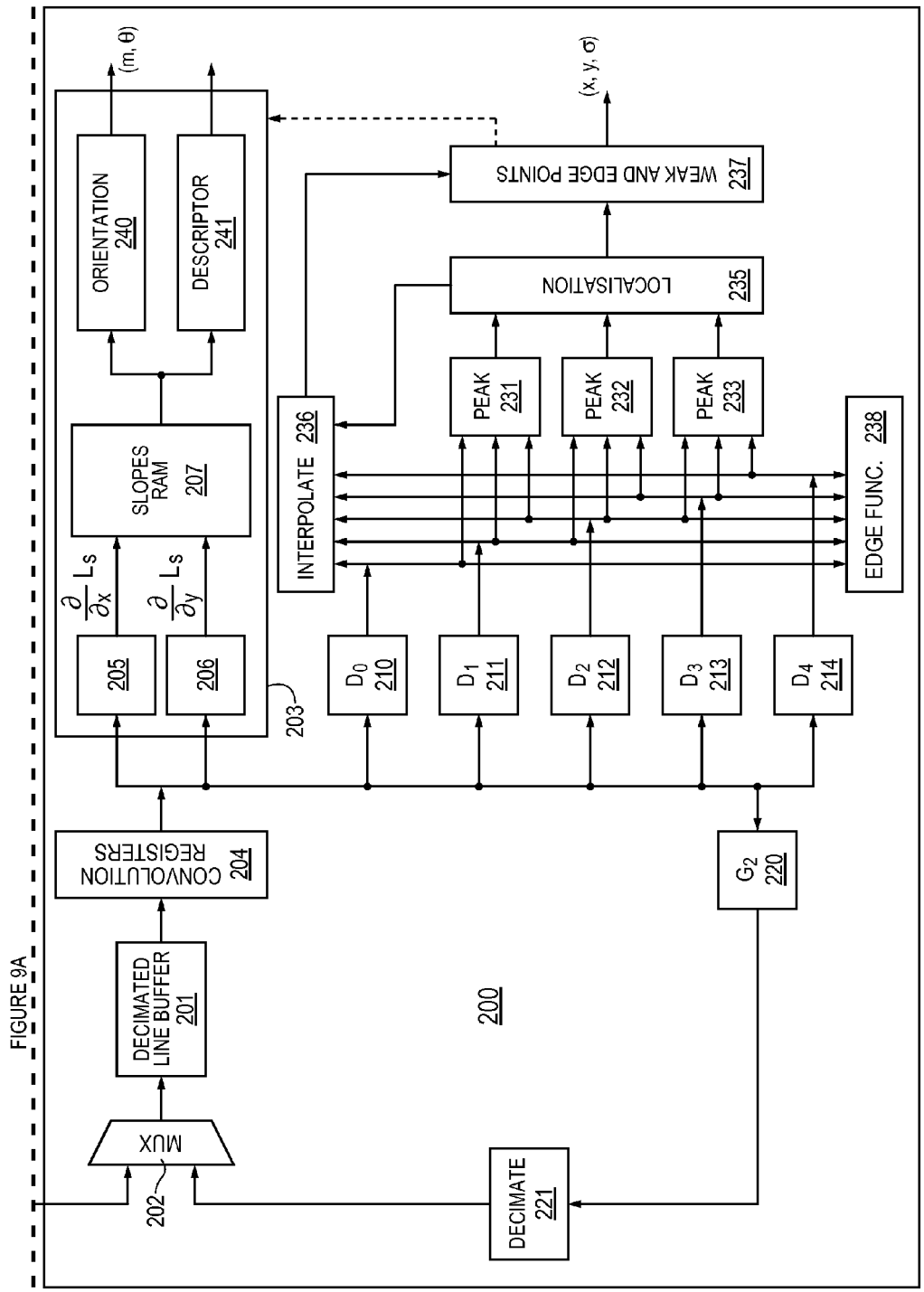

SHIFT KEY POINT DESCRIPTOR

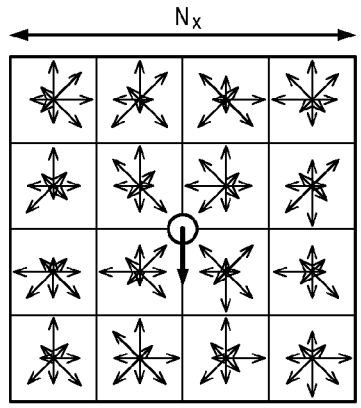

DESCRIPTOR CONTAINS $N_x \times N_x \times N_\theta$ BIN HISTOGRAMS.
($N_x = 4$, $N_\theta = 8$ IN DIAGRAM)

NOTE THAT THE DESCRIPTOR IS DRAWN HERE
IN THE SCALE-SPACE OF THE KEY POINT.

FIG. 10

SHIFT DESCRIPTOR IN THE SCALE SPACE OF THE IMAGE
PIXELS IN SCALE-SPACE

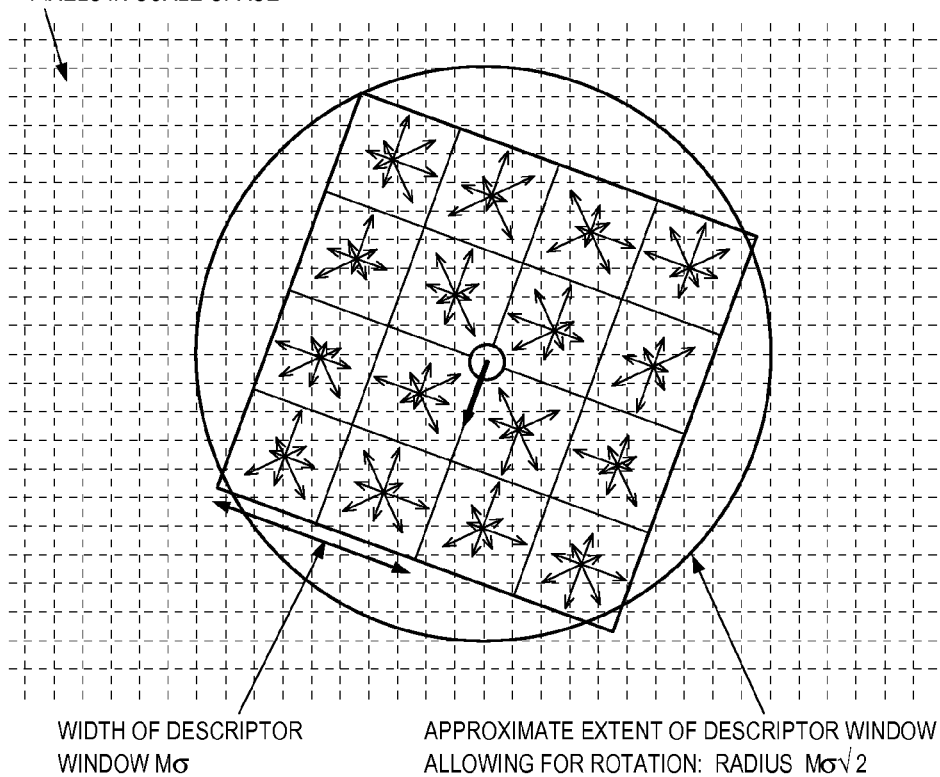

WIDTH OF DESCRIPTOR
WINDOW $M\sigma$

APPROXIMATE EXTENT OF DESCRIPTOR WINDOW
ALLOWING FOR ROTATION: RADIUS $M\sigma\sqrt{2}$

FIG. 11

HARDWARE TIMING

| OCTAVE 1 ROW | | | | |
| OCTAVE 2 | | OCTAVE 3 | | |
| OCTAVE 1 ROW | | | | |

| OCTAVE 1 ROW | | | | |
| OCTAVE 2 | | | | |
| OCTAVE 1 ROW | | | | |

| OCTAVE 1 ROW | | | | |
| OCTAVE 2 | | OCTAVE 3 | | |
| OCTAVE 1 ROW | | | | |

| OCTAVE 1 ROW | | | | |
| OCTAVE 2 | | | | |
| OCTAVE 1 ROW | | | | |

| OCTAVE 1 ROW | | | | |
| OCTAVE 2 | | OCTAVE 3 | OCTAVE 4 | O5 | O |

FIG. 12

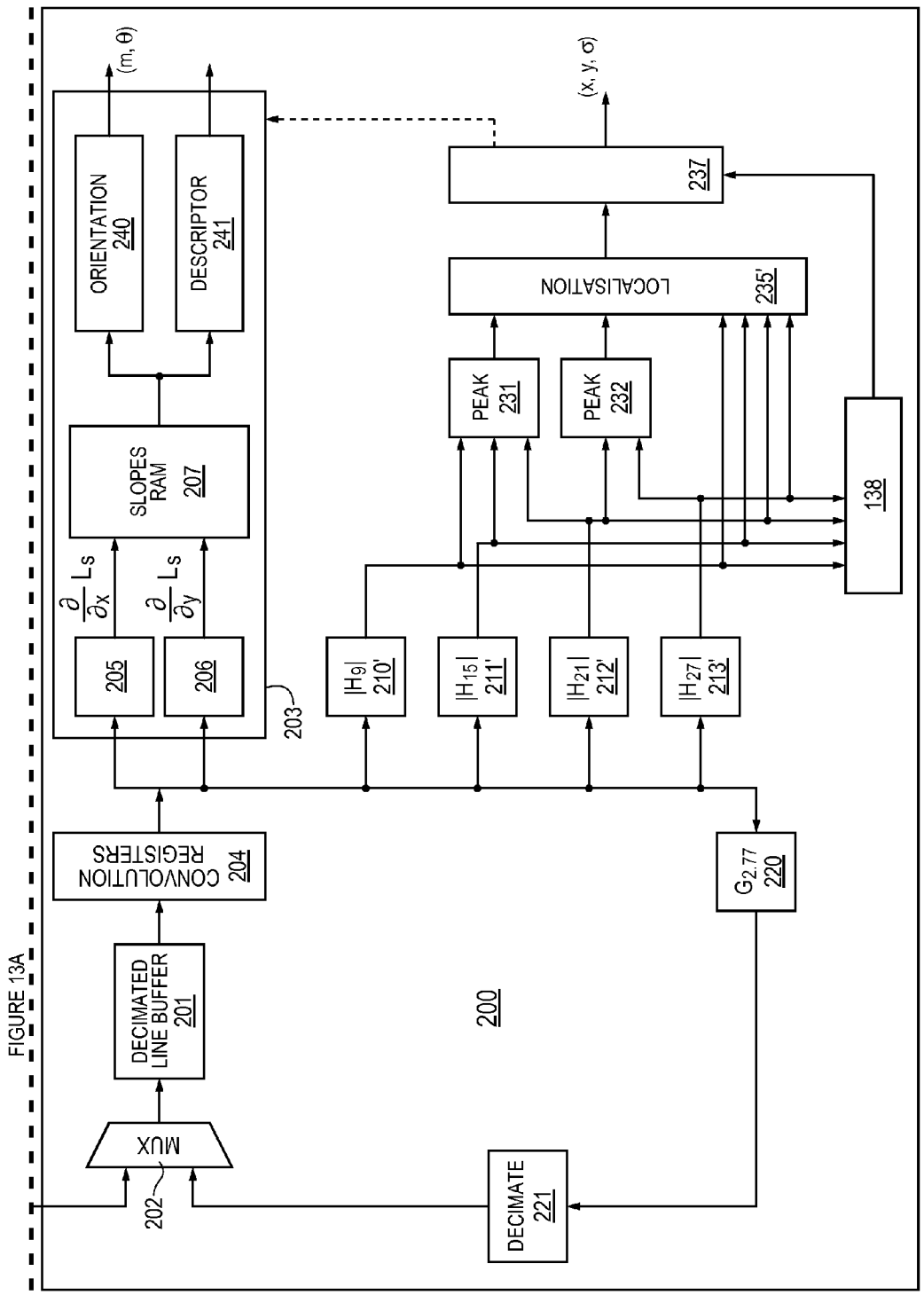

INTEREST POINT DETECTION

This application claims priority under 35 U.S.C. §119 to United Kingdom patent application UK 1100848.9, filed Jan. 18, 2011, which is hereby incorporated by reference herein in its entirety.

BACKGROUND

Interest points are markers anchored to a specific position in a digital image of an object. They are mathematically extracted in such a way that, in another image of the object, they will appear in the same position on the object, even though the object may be presented at a different position in the image, a different orientation, a different distance or under different lighting conditions. Interest points are combined with data records known as "descriptors" that describe the area of the image surrounding the interest point. Interest points and descriptors are used to identify and correlate related regions in two or more images, such as frames in a video stream.

A number of algorithms that operate upon raw image data and result in the identification of objects, or features of objects, have been proposed and are used, and examples of those will be discussed. An early stage of each of these algorithms that differ in detail, but have many characteristics in common, is the process of interest point detection. The identification of interest points underlies a host of useful applications that involve image understanding. Examples include 3-D imaging, object and person recognition, industrial inspection and control, automotive applications and object tracking.

An ideal interest point will always be accurately placed on an object regardless of the presentation of the object to the camera. This property is summarised in the phrase "affine invariant", which means that the interest point is detected even when the object has been reshaped by translation, rotation, dilation and shear. The descriptor must also represent the presentation of the object to the camera. In this way the region surrounding the interest point can be transformed into a standard presentation, enabling comparisons between interest points in different images and corresponding regions detected in several frames.

Interest points are usually expensive to calculate in terms of processor resource, and can easily take 50% or more of the processing resources of a desktop PC to calculate at video frame rates even for small images. All the popular algorithms are optimised to run in software on a desktop computer and require a lot of memory, often several frames' worth, and are constrained to operate serially, one operation at a time.

One established algorithm for extracting a class of interest points or features from images is known as the Scale-Invariant Feature Transform or "SIFT". SIFT is a technique that reduces the effect of normal variations of scale, orientation and lighting. It was first developed by David G. Lowe of the University of British Columbia and described in Lowe, David G.: "Distinctive Image Features From Scale-Invariant Keypoints", International Journal of Computer Vision, 2004.

SIFT is a widely used but computationally demanding technique for feature extraction and image understanding. Consider a view of a familiar object, such as a face or a road sign. The human visual system has little difficulty in recognising such objects regardless, within reasonable limits, of the distance of the object, its orientation and the incident lighting. Simple computer vision systems, on the other hand, that use basic detectors for edges and other features, have great difficulty handling objects at different scales and presentations to the camera. Lighting can be especially problematic when strong shadows introduce false edges, for instance.

Object recognition researchers often use SIFT, implemented in software. There are public open source libraries available that include SIFT functions, for example the VLFeat library online, www.vlfeat.org. As will be understood from the following discussion, a processor implementation of SIFT requires a lot of memory to store the image filtered to successive scales.

SIFT uses the fact that the scale of a feature can be measured by successively blurring the image with a scaling function. The scaling function is a Gaussian blur so is straightforward to calculate as a convolution. The features themselves are found by looking for the extrema of the difference of Gaussians function (DoG) between successive scales. The DoG is used as a convenient approximation to the Hessian blob function, which is the determinant of the Hessian matrix |H|. The Hessian is defined as:

$$H = \begin{bmatrix} \frac{\partial^2 L(\sigma_D)}{\partial x^2} & \frac{\partial^2 L(\sigma_D)}{\partial x \partial y} \\ \frac{\partial^2 L(\sigma_D)}{\partial x \partial y} & \frac{\partial^2 L(\sigma_D)}{\partial y^2} \end{bmatrix} = \begin{bmatrix} L_{xx}(x, \sigma_D) & L_{xy}(x, \sigma_D) \\ L_{xy}(x, \sigma_D) & L_{yy}(x, \sigma_D) \end{bmatrix}$$

where:
$L(\sigma_D) = g(\sigma_D) * I$
I is the original image $$\det H = \begin{vmatrix} L_{xx}(x, \sigma_D) & L_{xy}(x, \sigma_D) \\ L_{xy}(x, \sigma_D) & L_{yy}(x, \sigma_D) \end{vmatrix} = L_{xx}(x, \sigma_D) L_{yy}(x, \sigma_D) - (L_{xy}(x, \sigma_D))^2$$

A local maximum of det H=|H|, indicates a blob.

Each feature, or "key" lies in a 3D space defined by its position (x, y) and the scale σ. After applying some tests to reject unsuitable and weak features, the keys are assigned a direction by examining the surrounding intensity gradients and a descriptor is constructed that describes the region near the key as a histogram of slope directions.

SIFT typically extracts several thousand keys in a 3D (x, y, σ) space from an image, corresponding to around 1% of the number of pixels. An object to be matched can be represented by a set of keys with a particular interrelationship between their (x, y, σ) coordinates and their orientations. In principle, it should be possible to rescale and rotate a whole set of features (keys) that describe any object so that it is possible to match an observed object to a database.

Speeded-Up Robust Features, or "SURF" is another method of extracting key features from an image. It was developed at ETH Zurich and at the University of Leuven, Belgium. It is described in Bay, Herbert: "From Wide-baseline Point and Line Correspondences to 3D" DSc dissertation submitted to ETH Zurich, Diss. ETH No 16606, 2006 and also, originally, in Herbert Bay, Andreas Ess, Tinne Tuytelaars, Luc Van Gool, "SURF: Speeded Up Robust Features", Computer Vision and Image Understanding (CVIU), Vol. 110, No. 3, pp. 346-359, 2008. Like SIFT, SURF detects extrema in the Hessian of the image at various scales to identify blobs that match the scale. However, it simplifies the calculation by using an integral frame store and very simple kernels, consisting only of the values +1, 0, −1 and −2 with the values arranged in rectangular blocks. This allows an optimisation using integral images that greatly reduces the number of calculations per pixel.

Integral images are not useful unless a frame-store is available, so the SURF algorithm is not a good candidate from implementation in silicon. The quality of SURF is reported in the literature to be similar to that of SIFT.

BRIEF DESCRIPTION OF THE DRAWINGS

FIGS. 5-7 depict SURF kernels in accordance with an embodiment of the present invention.

FIGS. 10-11 depict descriptors in accordance with an embodiment of the present invention.

FIG. 12 is an octave data timing diagram in accordance with an embodiment of the present invention.

DETAILED DESCRIPTION

Figure 1:
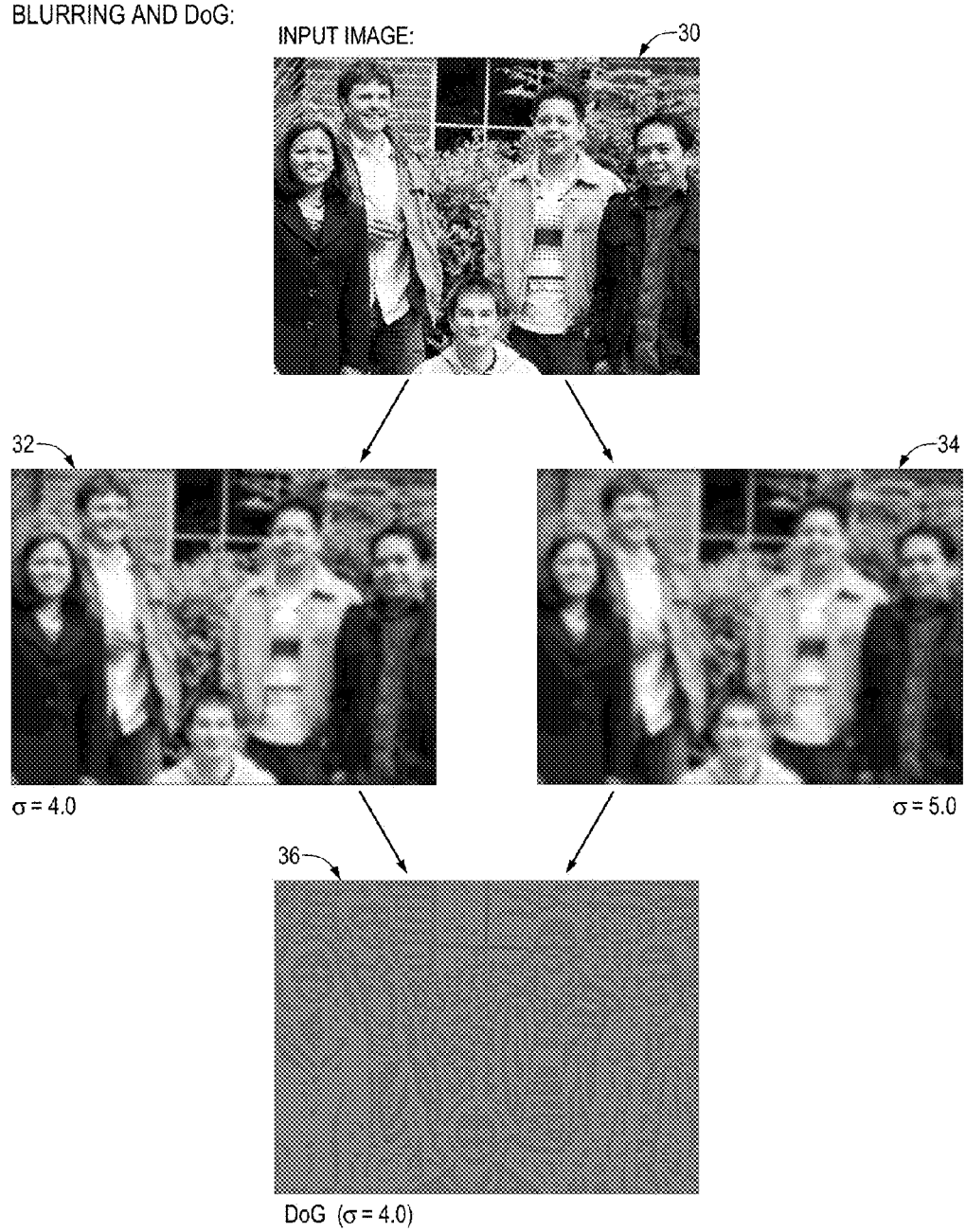
FIG. 1 illustrates Gaussian scaling in accordance with an embodiment of the present invention.

Certain embodiments of the invention presented here were conceived with the aim of achieving a low-cost, silicon-based implementation of interest point detection that will greatly reduce the system cost and increase the system performance of the functionality concerned. In particular, one aim has been to find an implementation that could be integrated onto a low-cost, single chip. A particular challenge is the amount of memory needed for interest point detection algorithms to run. All techniques that run on a desktop system require frame-stores and frame-stores require a lot of silicon.

The bulk of the computation for SIFT is in the front end calculation of the features and key point descriptors. On a conventional processor, a large number of memory accesses are needed. An integrated device that could calculate SIFT features at frame rate in real time could potentially revolutionise the application of machine vision to, for example, face recognition, automotive image understanding and robotics.

SURF and SIFT are both methods for detecting scale and rotation invariant blob features in an image using approximations to the Hessian blob function. A measure of the scale of a feature in an image can be made by successively blurring the image using Gaussian filters. In SIFT, the blurring process is also used to extract the difference of Gaussians (DOG) function, that is an approximation to the Laplacian of Gaussian (LOG) used to indicate a blob response at that scale. In SIFT, after every factor of two increase in scale, the image is decimated, meaning that every other row and every other column is discarded. This reduces the linear resolution by half and the size of the image by three quarters.

SURF, however, approximates the LOG function with a set of greatly simplified kernels. Because the coefficients are arranged in uniform rectangular blocks, they can be very rapidly calculated using an integral image. This is very much faster to calculate in a microprocessor than the DOG functions used in SIFT. In particular, the speed of calculation is independent of the size of the filter, i.e. the scale, so there is no need to build a scale pyramid by successive blurring and decimation as in SIFT. However, a frame-store is required, and this must contain extended precision values.

Certain embodiments of the invention make possible an efficient hardware implementation of feature extraction or interest point detection in a number of different ways. A scale pyramid is constructed in a way that is similar to SIFT. Thus, downscaled or decimated image data is generated by blurring the image data received. The downscaled image data represents the blurred data from a pattern of pixel locations in the received image data. The blurring can be achieved by a Gaussian filter. In the specific SIFT implementation already discussed, this pattern of pixel locations in the received image data corresponds to pixels at the intersection of every other row and every other column, and this has its advantages in terms of simplicity, but need not be the case. Any pattern of pixel locations could be adopted depending on the degree of blurring performed and the extent to which the linear resolution can therefore be reduced without further loss of information. The blurring may be achieved by applying a Gaussian filter to the image data.

Candidate interest points at a first scale are identified by Hessian-filtering the image data and detecting extrema in the Hessian-filtered data. By a Hessian filter is meant any filter that approximates the determinant or trace of the Hessian matrix, such as filters embodying the aforementioned LOG and DOG functions. Candidate interest points at a second scale are identified by Hessian-filtering the downscaled image data and detecting extrema in the Hessian-filtered, downscaled data.

The first adaptation for hardware comes with the recognition that instead of completing the processing of an image and then replacing it wholesale with the next image, which is what happens with a frame-store, the rows of image data can be discarded in series, and in particular that at least one of the rows of image data can discarded before all the rows of image data have been received. How quickly a row of image data can be discarded will depend on a number of factors, including the size of the blurring and Hessian filters, but the key advantage is that there is no need to provide sufficient memory to store a whole image, such as a whole frame of data front a video stream. Instead, it is possible to use smaller quantities of memory, arranged as a line buffer.

Therefore, one embodiment of the invention provides a method of identifying candidate interest points in an image having rows and columns of image data, the method comprising:

receiving the rows of image data in series;

generating downscaled image data by blurring the image data received, wherein the downscaled image data represents the blurred data from a pattern of pixel locations in the received image data;

identifying candidate interest points at a first scale by Hessian-filtering the image data and detecting extrema in the Hessian-filtered data;

discarding the rows of image data in series; and identifying candidate interest points at a second scale by Hessian-filtering the downscaled image data and detecting extrema in the Hessian-filtered, downscaled data;

wherein at least one of the rows of image data is discarded before all the rows of image data have been received.

The process of blurring and decimating the image data to give downscaled image data results, in the SIFT implementation, in a change of scale of one octave, which means a change by a factor of two. In other words, the aforementioned pattern of pixel locations is four times as sparse as the received image data. Different implementations may result in a different change of scale, but a factor of two is convenient. However, the scales at which interest points are detected should ideally approach more of a continuum than an octave-by-octave scale change is capable of delivering. For this reason, SIFT uses not one but many DOG filters to extract interest point information from the same image data at different scales. The scales of adjacent octaves overlap, which has the advantage that the detection of extrema does not require a comparison across octaves. Certain embodiments of the invention presented here employ a similar approach and in particular the process of identifying candidate interest points at a particular scale may comprise applying at least three Hessian filters spaced in scale space to the image data and detecting extrema in the resulting Hessian-filtered data.

Again, in common with SIFT, certain embodiments of the invention presented here employ a process of identifying candidate interest points at a particular scale that comprises identifying candidate interest points at a plurality of scales including that particular scale. This can be done by applying more than three Hessian filters spaced in scale apace to the image data and detecting extrema in the resulting Hessian-filtered data. Extrema are thus be detected in 3D scale space $(x, y, \sigma)$, where $(x, y)$ is position within the image and the third dimension $\sigma$ is the scale. The ratio of the scales ($\sigma$) of adjacent Hessian filters can be kept constant so that the filters are equally spaced in log scale space, i.e. log $\sigma$ is equally spaced.

The actual implementation of this algorithm in hardware will be discussed in detail later on, but can best be achieved by a combination of a line buffer, a convolution engine, an interest point identifier and sequencing circuitry. The convolution engine receives the image data from the line buffer, blurs it and outputs blurred data from a pattern of pixel locations in the received image data as downscaled image data. It also needs to be able to convolve the image data and the downscaled image data with the Hessian filters and to output the Hessian filtered data. The interest point identifier receives the Hessian-filtered data and detects extrema to identify candidate interest points at appropriate scales, and outputs the position and scale of the candidate interest points so identified.

The sequencing circuitry coordinates the operations of the line buffer, convolution engine and interest point identifier. In any particular implementation, the sequencing circuitry may be a control block that coordinates the operation of the other components (a "spider in the web") or it may be distributed amongst the other components, for example by being incorporated into the logic and interface circuits of those components. In such a case, the sequencing circuitry ensures that signals and information are exchanged between components that coordinate and direct their operation as desired. It is likely that the sequencing will be implemented as a state machine, either as a central control block, or distributed state machines, or a combination of both. Any arrangement of sequencing circuitry is contemplated so long as the proper coordination and control occurs, and, therefore, when the proper coordination and control occurs, sequencing circuitry is present.

Thus, certain embodiments of the invention provide a circuit for identifying candidate interest points in an image having rows and columns of image data, the circuit comprising:

at least one input for receiving the rows of image data in series;

a line buffer for storing at most a subset of the rows of image data as they are received, whereby at least one of the rows of image data is to be discarded from the line buffer before all the rows of image data have been received;

a convolution engine adapted to convolve received image data with a blurring filter and to output blurred data from a pattern of pixel locations in the received image data as downscaled image data, and to convolve received image data with at least three Hessian filters of different scales and to output the Hessian filtered data;

an interest point identifier adapted to receive the Hessian filtered data from the convolution engine, to detect extrema in the Hessian-filtered data to identify candidate interest points and to output the position and scale of the candidate interest points so identified; and sequencing circuitry adapted to sequence the operation of the circuit to pass received image data from the line buffer to the convolution engine to be convolved with both the blurring filter and the Hessian filters, to pass downscaled image data from the blurring filter back to the convolution engine to be convolved with the Hessian filters, and to discard the rows of received image data in series;

whereby the interest point identifier identifies candidate interest points at a first scale in the Hessian-filtered received image data and at a second scale in the Hessian-filtered, downscaled data and outputs the position and scale of the candidate interest points so identified.

As has already been discussed, the image data can be received into and discarded from a line buffer. The downscaled image data may also be received into and discarded from a line buffer, which may be the same line buffer. Thus, the sequencing circuitry may sequences the operation of the circuit to pass downscaled image data from the blurring filter to the line buffer and from the line buffer back to the convolution engine, and to discard the rows of downscaled image data in series.

As with SIFT, embodiments of the invention presented here can use multiple generations or octaves of downscaled data. Thus, twice downscaled image data can be generated by blurring the downscaled image data, wherein the twice downscaled image data represents the blurred data from a pattern of pixel locations in the once downscaled image data, and candidate interest points at a third scale (or a plurality of scales including a third scale) can then be identified by Hessian-filtering the twice downscaled image data and detecting extrema in the Hessian-filtered, twice downscaled data. The twice downscaled image data can be received into and discarded from a line buffer, and, as with the original image data, at least one of the rows of once downscaled image data is discarded before all the rows of once downscaled image data have been generated or received. Thus, the sequencing circuitry may sequence the operation of the circuit to pass downscaled image data from the line buffer to the convolution engine to be convolved with both the blurring filter and the Hessian filters, to pass twice downscaled image data from the blurring filter back to the convolution engine (for example via the line buffer) to be convolved with the Hessian filters, and to discard the rows of once downscaled image data in series. In this way, the interest point identifier also identifies candidate interest points at a third scale in the Hessian-filtered, twice downscaled data and outputs the position and scale of the candidate interest points so identified.

More than two generations of downscaled image data may be generated. In general, for m equals 2 to n, where n is an integer greater than 2, the method may comprise:

generating m-times downscaled image data by blurring m−1-times downscaled image data, wherein the m-times downscaled image data represents the blurred data from a pattern of pixel locations in the m−1-times downscaled image data;

where a line buffer is used, receiving the m-times downscaled image data into a line buffer as a series of rows;

identifying candidate interest points at an $(m+1)^{th}$ scale (or a plurality of scales including that scale) by Hessian filtering the m-times downscaled image data and detecting extrema in the Hessian-filtered, m-times downscaled data; and discarding the rows of m−1-times downscaled image data in series.

As before, at least one of the rows of m−1-times downscaled image data may be discarded, e.g. discarded from the line buffer, before all the rows of m−1-times downscaled image data have been generated. This constraint may not apply to the last generation or octave of downscaled image data, i.e. the case where m=n.

In hardware terms, this means that the sequencing circuitry sequences the operation of the circuit to pass m−1-times downscaled image data from the line buffer to the convolution engine to be convolved with both the blurring filter and the Hessian filters, to pass m-times downscaled image data from the blurring filter back to the convolution engine (for example via the line buffer) to be convolved with the Hessian filters, and to discard the rows of m−1-times downscaled image data in series. In this way, the interest point identifier also identifies candidate interest points at an $(m+1)^{th}$ scale in the Hessian-filtered, m-times downscaled data and outputs the position and scale of the candidate interest points so identified.

As has already been said, the blurring of the image data at each generation or octave may be done using a Gaussian filter. It is especially convenient for the image data to be successively blurred by application of the same Gaussian filter. Thus, only one such filter needs to be implemented in hardware for these operations. Where the Hessian filters are difference of Gaussian (DoG) filters, at least one can be implemented so as to employ the same Gaussian filter as is used to blur the image data. Finally, the successive generations of downscaled image data should ideally represent, in each case, the blurred data from the same pattern of pixel locations in the previous generation of image data.

Since there may be multiple generations or octaves of downscaled image data that are to be stored in line buffers, a second adaptation for hardware has been realised in certain embodiments of the invention presented here, where all generations or octaves of downscaled image data are stored in the same line buffer. This has briefly already been described. An example will be discussed where the downscaling reduces the linear resolution by half and the size of the image by three quarters, but it will be understood, and explained throughout, that this is just an example.

Depending upon the size of the filters used in the downscaling process and blob detection processes, there must be a certain minimum number of lines of image data in the line buffer. The number is the same for each generation or octave of image data, but since each line of downscaled image data can only be generated once two extra lines of the image data from which it is produced are available, the turnover of image data lines decreases by half with each generation. As will already be understood, every four pixels of original image data result in one pixel of downscaled image data, every four pixels of downscaled image data results in one pixel of twice downscaled image data, and so on.

In conclusion, therefore, the line buffer or line buffers used to capture the multiple generations or octaves of image data have to contain the same number of lines of each generation of data and turn the lines of data over at successively slower rates. In addition, each line of data for successive generations contains successively fewer pixels.

An innovative organisation of line buffer is proposed as follows. The line buffer is organised into rows and columns. Throughout the following discussion, the idea of the line buffer being organised into rows and columns will be understood to be physical organisation, but the concept is equally applicable to a logical organisation that achieves the same effect. Each line of the line buffer is longer than a single line of the received image data, and the received image data is received into the first columns of each line. The $j^{th}$ pixel of each row in the received image data is received into the $j^{th}$ column of the line buffer. This continues to happen until a sufficient number of rows of original image data have been received for the first row of downscaled image data to be generated. The downscaled image data is then received into successive available columns of each line, for example beginning with the first. The $j^{th}$ pixel of the downscaled image data may be received into the $(p_0+j)^{th}$ column of the line buffer, where $p_0$ is the number of pixels in a line of the received image data. Again, this continues until a sufficient number of rows of downscaled image data have been received for the first row of twice downscaled image data to be received. The $j^{th}$ pixel of the twice downscaled image data may be received into the $(p_0+p_1+j)^{th}$ column of the line buffer, where $p_1$ is the number of pixels in a line of the once downscaled image data. In general, as the process previously outlined continues, the m-times downscaled image data can be received into the next available columns of the line buffer.

Therefore, certain embodiments of the invention also provide a method of downscaling and organising image data, the method comprising:

receiving image data organised into rows and columns;

storing the image data in a line buffer organised into rows and columns, wherein the rows of image data are stored in successive rows of the line buffer and, in each row, the image data is stored in successive columns;

generating downscaled image data by blurring the image data received, wherein the downscaled image data is organised into rows and columns and represents the blurred data from a pattern of pixel locations in the received image data; and storing the downscaled image data in the same line buffer, wherein the rows of the downscaled image data are stored in successive rows of the line buffer, at least one of which also stores received image data and, in each row, the downscaled image data is stored in successive unused columns.

In hardware terms, a circuit for downscaling and organising image data is provided, comprising:

at least one input for receiving the rows of image data in series;

a line buffer organised into rows and columns;

a convolution engine adapted to convolve received image data with a blurring filter and to output blurred data from a pattern of pixel locations in the received image data as downscaled image data; and sequencing circuitry adapted to sequence the operation of the circuit to store the rows of image data in successive rows of the line buffer and, in each row, in successive columns, to pass the received image data from the line buffer to the convolution engine to be convolved with the blurring filter, to pass downscaled image data from the blurring filter back to the line buffer and to store the rows of the downscaled image data in successive rows of the line buffer, at least one of which also stores received image data and, in each row, in successive unused columns.

The downscaled data are thus stored alongside the received data and may be adjacent to it. Of course, in some implementations, more than one row of the line buffer stores both received and downscaled image data and the greatest efficiency is achieved when every row that stores downscaled image data also stores received data, and this may be every row in the line buffer.

As was discussed above, certain embodiments of the invention presented here can use multiple generations or octaves of downscaled data. Thus, twice downscaled image data can be generated by blurring the downscaled image data, wherein the twice downscaled image data is organised into rows and columns and represents the blurred data from a pattern of pixel locations in the once downscaled image data. The twice downscaled image data is stored in the same line buffer, wherein the rows of the twice downscaled image data are stored in successive rows of the line buffer, at least one of which also stores received and once downscaled image data and, in each row, the twice downscaled image data is stored in successive unused columns of the line buffer. In hardware terms, the sequencing circuitry is adapted to sequence the operation of the circuit to pass the downscaled image data from the line buffer to the convolution engine to be convolved with the blurring filter, to pass twice downscaled image data from the blurring filter back to the line buffer and to store the rows of the twice downscaled image data in successive rows of the line buffer, at least one of which also stores received image data and downscaled image data and, in each row, in successive unused columns.

More than two generations of downscaled image data may be generated. In general, for m equals 2 to n, where n is an integer greater than 2, the method may comprise:

generating m-times downscaled image data by blurring m−1-times downscaled image data, wherein the m-times downscaled image data represents the blurred data from a pattern of pixel locations in the m−1-times downscaled image data;

storing the m-times downscaled image data into the same line buffer, wherein the rows of the m-times downscaled image data are stored in successive rows of the line buffer, at least one of which also stores received and m−1 times downscaled image data and any and all intermediate downscaled image data, and, in each row, the m-times downscaled image data is stored in successive unused columns.

In hardware terms, the sequencing circuitry is adapted to sequence the operation of the circuit to pass the m−1-times image data from the line buffer to the convolution engine to be convolved with the blurring filter, to pass m-times downscaled image data from the blurring filter back to the line buffer and to store the rows of the m-times downscaled image data in successive rows of the line buffer, at least one of which also stores received image data, m−1-times downscaled image data and any and all intermediate downscaled image data and, in each row, in successive unused columns.

Thus, each generation of downscaled image data is stored alongside all previous generations, and may be adjacent to the previous generation. Again, in some implementations, more than one row of the line buffer stores all generations of downscaled image data and the greatest efficiency is achieved when every row that stores m-times downscaled image data also stores received data and every previous generation of downscaled data, and this may be every row in the line buffer.

As has already been discussed, one implementation uses a downscaling algorithm in which the downscaled image data is blurred image data from the intersection of every other row and every other column of the received image data. In that case, that each row of the line buffer may be at most twice as long as one row of received image data. Other arrangements are possible however. A downscaling algorithm could be used in which the downscaled image data is blurred image data from the intersection of every third row and every third column of the received image data. In that case, each row of the line buffer should be at most one and a half times as long as one row of received image data. Numerous other examples are possible.

Because the throughput of rows of received image data is a multiple of, for example double, that of the rows of downscaled image data, which is a multiple of, for example double, that of the rows of twice downscaled image data, the line buffer must include some mechanism to allow this to happen. One possibility is that each section of the line buffer (one for received data, one for downscaled data, one for twice downscaled data, etc.) forms a chain of storage locations in the nature of a shift register so that the columns of, for example, received image data can be shifted along and then upwards, thus discarding the uppermost row or rows and making room for a new row or rows at the bottom. Alternatively, pointers could be used to keep track of the location of the oldest rows of data. Another possibility is to configure the buffer as a RAM with suitable addressing.

The reader will understand that the two concepts so far presented are useful individually and together. The data storage scheme using a line buffer can complement the interest point detection method and certain embodiments of the invention presented here therefore provide a method of identifying candidate interest points in an image having rows and columns of image data, the method comprising:

receiving the rows of image data in series;

storing the image data in a line buffer organised into rows and columns, wherein the rows of image data are stored in successive rows of the line buffer and, in each row, the image data is stored in successive columns of the line buffer;

generating downscaled image data by blurring the image data received, wherein the downscaled image data is organised into rows and columns and represents the blurred data from a pattern of pixel locations in the received image data; and storing the downscaled image data in the same line buffer, wherein the rows of the downscaled image data are stored in successive rows of the line buffer, at least one of which also stores received image data and, in each row, the downscaled image data is stored in successive columns;

identifying candidate interest points at a first scale by Hessian-filtering the image data and detecting extrema in the Hessian-filtered data;

discarding the rows of image data in series; and identifying candidate interest points at a second scale by Hessian-filtering the downscaled image data and detecting extrema in the Hessian-filtered, downscaled data;

wherein at least one of the rows of image data is discarded before all the rows of image data have been received.

In hardware terms, this combined method can be implemented in a circuit for identifying candidate interest points in an image having rows and columns of image data, the circuit comprising:

at least one input for receiving the rows of image data in series;

a line buffer organised into rows and columns for storing at most a subset of the rows of image data as they are received, whereby at least one of the rows of image data is to be discarded from the line buffer before all the rows of image data have been received;

a convolution engine adapted to convolve received image data with a blurring filter and to output blurred data from a pattern of pixel locations in the received image data as downscaled image data, and to convolve received image data with at least three Hessian filters of different scales and to output the Hessian filtered data;

an interest point identifier adapted to receive the Hessian filtered data from the convolution engine, to detect extrema in the Hessian-filtered data to identify candidate interest points and to output the position and scale of the candidate interest points so identified; and sequencing circuitry adapted to sequence the operation of the circuit to store the rows of image data in successive rows of the line buffer and, in each row, in successive columns, to pass the received image data from the line buffer to the convolution engine to be convolved with both the blurring filter and the Hessian filters, to pass downscaled image data from the blurring filter back to the line buffer and to store the rows of the downscaled image data in successive rows of the line buffer, at least one of which also stores received image data and, in each row, in successive unused columns, to pass the downscaled image data from the line buffer back to the convolution engine to be convolved with the Hessian filters, and to discard the rows of received image data in series;

whereby the interest point identifier identifies candidate interest points at a first scale in the Hessian-filtered received image data and at a second scale in the Hessian-filtered, downscaled data and outputs the position and scale of the candidate interest points so identified.

It will be understood that all aspects of the interest point detection algorithm already discussed can be implemented using the line buffer described above.

As has been discussed, some implementations of the line buffer store successive generations of image data in a single row of the line buffer. A similar sort of thing can be done with the temporal order of image processing as opposed to, or in addition to, the physical order of pixels in the line buffer. Consider the process of blurring the received image data. This process can only begin once a certain number of lines of image data have been received, depending upon the size of the Gaussian or other blurring filter that is used. Where the image is being downscaled by a factor of two in each linear dimension, one further line of downscaled or blurred image data can be generated from every two further lines of received image data. Once a sufficient number of lines of blurred data have been generated, the process of generating twice downscaled data can begin, followed by three-times downscaled data, etc. At some point, a dynamic steady state is achieved, in which all the generations of downscaled data that will be generated have begun to be generated, and image data is continued to be received. Two new lines of received image data result in a new line of downscaled image data. Four new lines of received image data result in two new lines of downscaled image data and one new line of twice downscaled image data.

The process of downscaling each generation of image data to form the next will typically be performed by the same hardware, such as a Gaussian convolution engine. Certain embodiments of the invention presented here provide an innovative way of supplying the generations of image data to the downscaling hardware via the intermediary of a register pipeline or other pipeline. Taking the case where the image data is downscaled by a factor of two in each linear dimension, the number of cycles required by the downscaling hardware to downscale rows of image data reduces by half with each generation. This in turn means that rows of all generations of downscaled image data can be downscaled again in the time it takes to downscale the rows of the received image data. This follows from the fact that $$\sum_{i=0}^{n}(1/2)^{i}$$

is less than unity for all integer values of n. Common downscaling hardware, or a common pipeline, can most efficiently be employed therefore, in circumstances where the downscaling hardware is used in a first time interval to generate a row of once downscaled image data and in a second interval to generate rows of twice downscaled image data, where the second time interval following the first time interval. The second time interval will be followed by a third time interval in which the next row of once downscaled image data is generated.

Therefore, certain embodiments of the invention presented here provide a method of downscaling and organising image data, the method comprising:

receiving successive rows of image data into a line buffer organised into rows and columns, wherein the rows of image data are stored in rows of the line buffer;

for successive rows of image data received, outputting that row of image data together with a plurality of preceding rows of image data from the line buffer to a pipeline and storing the row of image data received in a row of the line buffer while discarding the oldest preceding row of image data from the line buffer;

generating successive rows of downscaled image data by blurring the image data in the pipeline, wherein the downscaled image data represents the blurred data from a pattern of pixel locations in the received image data;

receiving the successive rows of downscaled image data into the line buffer, wherein the rows of downscaled image data are stored in rows of the line buffer; and for successive rows of downscaled image data, outputting that row of downscaled image data together with a plurality of preceding rows of downscaled image data from the line buffer to the pipeline and storing the row of downscaled image data in a row of the line buffer while discarding the oldest preceding row of downscaled image data from the line buffer;

wherein the rows of downscaled image data are output to the pipeline between respective rows of received image data.

The downscaled data are thus interleaved with the received image data before being passed to the pipeline.

In hardware terms, a circuit for downscaling and organising image data is provided, comprising:

at least one input for receiving the rows of image data in series;

a line buffer organised into rows and columns;

a pipeline;

a convolution engine adapted to convolve image data in the pipeline with a blurring filter and to output blurred data from a pattern of pixel locations in the received image data as downscaled image data;

sequencing circuitry adapted to sequence the operation of the circuit as follows:
for successive rows of image data received, to pass that row of image data together with a plurality of preceding rows of image data from the line buffer to the pipeline and to store the row of image data received in a succeeding row of the line buffer while discarding the oldest preceding row of image data from the line buffer, to pass the image data from the pipeline to the convolution engine to be convolved with the blurring filter, and to pass downscaled image data from the blurring filter back to the line buffer; and for successive rows of downscaled image data, to pass that row of downscaled image data together with a plurality of preceding rows of downscaled image data from the line buffer to the pipeline between respective rows of received image data and to store the row of downscaled image data in a row of the line buffer while discarding the oldest preceding row of downscaled image data from the line buffer.

For the next generation of downscaled image data, if there is one, the method further comprises:

generating successive rows of twice downscaled image data by blurring the downscaled image data in the pipeline, wherein the twice downscaled image data represents the blurred data from a pattern of pixel locations in the downscaled image data;

receiving the successive rows of twice downscaled image data into the line buffer, wherein the rows of twice downscaled image data are stored in rows of the line buffer; and for successive rows of twice downscaled image data, outputting that row of twice downscaled image data together with a plurality of preceding rows of twice downscaled image data from the line buffer to the pipeline and storing the row of twice downscaled image data in a row of the line buffer while discarding the oldest preceding row of twice downscaled image data from the line buffer;

wherein the rows of twice downscaled image data are output to the pipeline after a respective row of downscaled image data and before a respective row of received image data.

Again, more than two generations of downscaled image data may be generated. In general, for m equals 2 to n, where n is an integer greater than 2, the method may further comprise:

generating successive rows of m-times downscaled image data by blurring the m−1-times downscaled image data in the pipeline, wherein the m-times downscaled image data represents the blurred data from a pattern of pixel locations in the m−1-times downscaled image data;

receiving the successive rows of m-times downscaled image data into the line buffer, wherein the rows of m-times downscaled image data are stored in rows of the line buffer; and for successive rows of m-times downscaled image data, outputting that row of m-times downscaled image data together with a plurality of preceding rows of m-times downscaled image data from the line buffer to the pipeline and storing the row of m-times downscaled image data in a row of the line buffer while discarding the oldest preceding row of m-times downscaled image data from the line buffer;

wherein the rows of m-times downscaled image data are output to the pipeline after a respective row of m−1-times downscaled image data and before a respective row of received image data.

Whilst at first sight, it may seem inefficient, once a row of received image data has been processed, to have to wait for one or more subsequent generation of data to be processed before the next row of received image data, that is not always the case. In fact, if the received image data is already the product of an upstream downscaling process, then its rows will arrive separated by exactly the amount of time needed to process the one or more subsequent generation of data. For this reason, the method may comprise:

receiving rows of original image data;

generating successive rows of working image data by blurring the original image data, wherein the working image data represents the blurred data from a pattern of pixel locations in the original image data; and receiving the working image data into the line buffer as the received image data.

At least one of the rows in the line buffer that stores downscaled image data may also store received image data. Of course, in some implementations, more than one row of the line buffer stores both received and downscaled image data and the greatest efficiency is achieved when every row that stores downscaled image data also stores received data, and this may be every row in the line buffer. The same applies to subsequent generations. At least one row that stores m-times downscaled image data, and in some implementations every one of them, may also store received image data, m−1-times downscaled image data and any and all intermediate generations of downscaled image data.

In view of this, it will come as no surprise to the informed reader that this temporal ordering of image downscaling can be efficiently implemented using the physical or logical line buffer organisation already described. In terms of m-times downscaled image data, the reason is this. The rows of m-times downscaled image data are output to the pipeline after a respective row of m−1-times downscaled image data. This applies for all m, so the image data is output as follows: received image data, once downscaled image data, twice downscaled image data . . . m−1-times downscaled image data, m-times downscaled image data, and this is exactly the order in which the data is stored in the rows of the line buffer organised as previously discussed.

This combination results in a method of downscaling and organising image data, the method comprising:

receiving successive rows of image data into a line buffer organised into rows and columns, wherein the rows of image data are stored in successive rows of the line buffer and, in each row, the image data is stored in successive columns;

for successive rows of image data received, outputting that row of image data together with a plurality of preceding rows of image data from the line buffer to a pipeline and storing the row of image data received in a row of the line buffer while discarding the oldest preceding row of image data from the line buffer;

generating successive rows of downscaled image data by blurring the image data in the pipeline, wherein the downscaled image data represents the blurred data from a pattern of pixel locations in the received image data;

receiving the successive rows of downscaled image data into the line buffer, wherein the rows of downscaled image data are stored in successive rows of the line buffer, at least one of which also stores received image data and, in each row, the downscaled image data is stored in successive unused columns; and for successive rows of downscaled image data, outputting that row of downscaled image data together with a plurality of preceding rows of downscaled image data from the line buffer to the pipeline and storing the row of downscaled image data in a row of the line buffer while discarding the oldest preceding row of downscaled image data from the line buffer;

wherein the rows of downscaled image data are output to the pipeline between respective rows of received image data.

In hardware terms, the combined circuit for downscaling and organising image data comprises:

at least one input for receiving the rows of image data in series;

a line buffer organised into rows and columns;

a pipeline;

a convolution engine adapted to convolve image data in the pipeline with a blurring filter and to output blurred data from a pattern of pixel locations in the received image data as downscaled image data;

sequencing circuitry adapted to sequence the operation of the circuit as follows:

for successive rows of image data received, to pass that row of image data together with a plurality of preceding rows of image data from the line buffer to the pipeline and to store the row of image data received in a succeeding row of the line buffer and, in that row, in successive columns, while discarding the oldest preceding row of image data from the line buffer, to pass the image data from the pipeline to the convolution engine to be convolved with the blurring filter, and to pass downscaled image data from the blurring filter back to the line buffer; and for successive rows of downscaled image data, to pass that row of downscaled image data together with a plurality of preceding rows of downscaled image data from the line buffer to the pipeline between respective rows of received image data and to store the row of downscaled image data in a row of the line buffer that also stores received image data and, in that row, in successive unused columns, while discarding the oldest preceding row of downscaled image data from the line buffer.

For reasons of efficiency, the downscaled image data are the next data output to the pipeline after the received image data from the same row of the line buffer. This enables the two generations of image data to be output to the pipeline in a single operation. In one embodiment, the downscaled image data are stored in the next successive unused columns in their respective row of the line buffer, i.e. directly adjacent to the received image data, and are output to the pipeline directly after the received image data adjacent to which they are stored. Thus, the sequencing circuitry is configured to pass a row of image data together with a plurality of preceding rows of image data, followed by a row of downscaled image data together with a plurality of preceding rows of downscaled image data, from the line buffer to the pipeline, by passing the same rows containing both received and downscaled image data from the line buffer to the pipeline.

Again, because some embodiments of the invention presented here can use multiple generations or octaves of downscaled data, successive rows of twice downscaled image data can be generated by blurring the downscaled image data in the pipeline, wherein the twice downscaled image data represents the blurred data from a pattern of pixel locations in the once downscaled image data. The successive rows of twice downscaled image data are then received into the line buffer, wherein the rows of twice downscaled image data are stored in successive rows of the line buffer, at least one of which also stores received image data and downscaled image data and, in each row, the twice downscaled image data are stored in successive unused columns. For successive rows of twice downscaled image data, the row of twice downscaled image data is output together with a plurality of preceding rows of twice downscaled image data from the line buffer to the pipeline and the row of twice downscaled image data is stored in a row of the line buffer while the oldest preceding row of twice downscaled image data is discarded from the line buffer. The rows of twice downscaled image data are output to the pipeline after a respective row of once downscaled image data and before a respective row of received image data.

Again, for reasons of efficiency, the twice downscaled image data should be the next data output to the pipeline after the once downscaled image data from the same row of the line buffer. This enables three generations of image data, i.e. received, once downscaled and twice downscaled, to be output to the pipeline in a single operation. In one embodiment, the twice downscaled image data are stored in the next successive unused columns in their respective row of the line buffer, i.e. directly adjacent to the once downscaled image data, and are output to the pipeline directly after the once downscaled image data adjacent to which they are stored.

More than two generations of downscaled image data may be generated. In general, for m equals 2 to n, where n is an integer greater than 2, the method may comprise:

generating successive rows of m-times downscaled image data by blurring m−1-times downscaled image data in the pipeline, wherein the m-times downscaled image data represents the blurred data from a pattern of pixel locations in the m−1-times downscaled image data;

receiving the successive rows of m-times downscaled image data into the line buffer, wherein the rows of m-times downscaled image data are stored in successive rows of the line buffer, at least one of which also stores received image data, m−1-times downscaled image data and any and all intermediate generations of downscaled image data and, in each row, the m-times downscaled image data is stored in successive unused columns;

for successive rows of m-times downscaled image data, outputting the row of m-times downscaled image data together with a plurality of preceding rows of m-times downscaled image data from the line buffer to the pipeline and storing the row of m-times downscaled image data in a row of the line buffer while discarding the oldest preceding row of m-times downscaled image data from the line buffer;

wherein the rows of m-times downscaled image data are output to the pipeline after a respective row of m−1-times downscaled image data and before a respective row of received image data.

Thus, each generation of downscaled image data is stored alongside all previous generations. Again, in some implementations, more than one row of the line buffer stores all generations of downscaled image data and the greatest efficiency is achieved when every row that stores m-times downscaled image data also stores received data and every previous generation of downscaled data, and this may be every row in the line buffer. Again, for reasons of efficiency, the m-times downscaled image data should be the next data output to the pipeline after the m−1-times downscaled image data from the same row of the line buffer. This enables m+1 generations of image data to be output to the pipeline in a single operation. In one embodiment, the m-times downscaled image data are stored in the next successive unused columns in their respective row of the line buffer, i.e. directly adjacent to the m−1-times downscaled image data, and are output to the pipeline directly after the m−1-times downscaled image data adjacent to which they are stored.

Once again, it will be understood that the innovative method of temporally ordering the outputting of successive generations of image data to a common pipeline can be integrated with the interest point detection method. To this end, the method can further comprise identifying candidate interest points at a first scale by Hessian-filtering the received image data in the pipeline and detecting extrema in the Hessian-filtered data, and identifying candidate interest points at a second scale by Hessian-filtering the downscaled image data in the pipeline and detecting extrema in the Hessian-filtered, downscaled data. In hardware terms, therefore, the convolution engine is also adapted to convolve received image data with at least three Hessian filters of different scales and to output the Hessian filtered data, the circuit includes an interest point identifier adapted to receive the Hessian filtered data from the convolution engine, to detect extrema in the Hessian-filtered data to identify candidate interest points and to output the position and scale of the candidate interest points so identified, and the sequencing circuitry is adapted to pass the rows of received image data and downscaled image data from the pipeline to the convolution engine to be convolved with the Hessian filters, whereby the interest point identifier identifies candidate interest points at a first scale in the Hessian-filtered received image data and at a second scale in the Hessian-filtered, downscaled data and outputs the position and scale of the candidate interest points so identified.

It has already been mentioned that the image data can be successively blurred by application of the same Gaussian filter and that the successive generations of downscaled image data should ideally represent, in each case, the blurred data from the same pattern of pixel locations in the previous generation of image data. In addition, and an a further departure from previous methods designed to accommodate hardware implementation, certain embodiments of the invention presented here can implement the Hessian filter or filters in a convolution engine using one or more Hessian filter kernels and use the same filter kernel or kernels for all generations of image data. This is particularly useful where the data are all presented in the same pipeline, as the methods just discussed will do, but it has wider application too. It represents a further adaptation for hardware since there is no need to provide different filter kernels for different generations of image data.

Thus, certain embodiments of the invention provide a method of identifying candidate interest points in an image having rows and columns of image data, the method comprising:

receiving the rows of image data in series;

generating downscaled image data by blurring the image data, wherein the downscaled image data represents the blurred data from a pattern of pixel locations in the received image data;

identifying candidate interest points at a first scale by applying the image data to a convolution engine using at least three Hessian filter kernels and detecting extrema in the Hessian-filtered data; and identifying candidate interest points at a second scale by applying the downscaled image data to the same convolution engine using the same Hessian filter kernels and detecting extrema in the Hessian-filtered, downscaled data.

In hardware, a circuit for identifying candidate interest points in an image having rows and columns of image data is provided, the circuit comprising:

at least one input for receiving the rows of image data in series;

a line buffer for storing the rows of image data as they are received;

a convolution engine adapted to convolve received image data with a blurring filter and to output blurred data from a pattern of pixel locations in the received image data as downscaled image data, and to convolve received image data with at least three Hessian filters of different scales and to output the Hessian filtered data;

an interest point identifier adapted to receive the Hessian filtered data from the convolution engine, to detect extrema in the Hessian-filtered data to identify candidate interest points and to output the position and scale of the candidate interest points so identified; and sequencing circuitry adapted to sequence the operation of the circuit to pass received image data from the line buffer to the convolution engine to be convolved with both the blurring filter and the Hessian filters, to pass downscaled image data from the blurring filter back to the convolution engine to be convolved with the same Hessian filters, and to discard the rows of received image data in series;

whereby the interest point identifier identifies candidate interest points at a first scale in the Hessian-filtered received image data and at a second scale in the Hessian-filtered, downscaled data and outputs the position and scale of the candidate interest points so identified.

As previously presented, identifying candidate interest points at a particular scale can comprise identifying candidate interest points at a plurality of scales including that particular scale. This can be done by applying the image data to a convolution engine using at least four Hessian filter kernels and detecting extrema in the resulting set of Hessian-filtered data.

Both the original image data and the downscaled image data can be applied to the same convolution engine using the same plurality of Hessian filter kernels. The same applies to subsequent generations. The method may therefore comprise:

generating twice downscaled image data by blurring the downscaled image data, wherein the twice downscaled image data represents the blurred data from a pattern of pixel locations in the once downscaled image data; and identifying candidate interest points at a third scale by applying the twice downscaled image data to the same convolution engine using the same Hessian filter kernels and detecting extrema in the resulting set of Hessian-filtered, twice downscaled data.

In general the method may comprise, for m equals 2 to n, where n is an integer greater than 2:

generating m-times downscaled image data by blurring m−1-times downscaled image data, wherein the m-times downscaled image data represents the blurred data from a pattern of pixel locations in the m−1-times downscaled image data;

identifying candidate interest points at an $m+1^{th}$ scale by applying the m-times downscaled image data to the same convolution engine using the same Hessian filter kernels and detecting extrema in the resulting set of Hessian-filtered, m-times downscaled image data.

Owing to the constraints imposed by a hardware implementation, it is convenient for the Hessian filters and the Gaussian or other blurring filters, to use integer arithmetic where possible rather than the floating point arithmetic encountered in software implementations of SIFT. The very simplified integer arithmetic of SURF is not available in a sensible hardware implementation concerned with minimizing the amount of silicon employed, because it needs to use an integral frame store.

The methods and circuits of this invention may therefore use quantized Hessian filters. The quantized filters are constructed on rectangular grid, for example as a kernel of a convolution engine, using integer values of reduced precision. By reduced precision is meant represented by a small number of binary bits, for example three or four or five bits, and typically fewer than eight bits. Negative numbers can be represented by adopting two's complement notation. Convolving the image data with quantized bits yields a convolution product that is approximately correct up to a normalization factor that depends upon the filter employed and the scale and can be calculated in advance. The convolution product is then renormalized by being multiplied by the renormalization factor and this may be achieved using a single floating point multiplier followed by a conversion to an integer result. One advantage of constructing the filters thus is that the filter designed has complete flexibility and can arrange that the filters be evenly spaced in scale space, i.e. in log σ space, as in SIFT.

The use of common filter kernels can be applied to any of the methods and any of the hardware configurations already discussed, as the reader will understand.

Before details of the embodiments of the invention are discussed, it will be useful to describe some further details of the SIFT and SURF algorithms.

The SIFT algorithm is implemented in the following stages, of which the first two and the last will briefly be described:
  scaling and detection of scale-space extrema;
  accurate localisation of key point candidates;
  elimination of weak features;
  elimination of edge features; and
  orientation assignment.

Scaling is achieved by successively applying Gaussian filters to the image. The width parameter of the Gaussian filter, σ, determines the cut off (spatial) frequency. The width of the Gaussian filters is chosen such that a fixed number of filters halves the spatial resolution of the filtered image. This is equivalent to doubling the feature scale and is called an "octave", analogous to a musical octave. The process is illustrated in FIG. 1, in which can be seen an input image 30 at the top of the figure. Below that are two blurred images 32 and 34, the one on the left (image 32) blurred using a Gaussian filter with σ=4.0, and the one on the right (image 34) using a Gaussian filter with σ=5.0.

By subtracting Gaussians with different values of σ a Difference of Gaussians (DoG) band pass filter is obtained. Thus, a DoG filter finds features in the image that match a certain range of spatial frequencies, so are of a certain range of sizes. The DoG derived from the two blurred images 32 and 34 in FIG. 1 is shown at the bottom of the figure (as image 36).

Figure 2:
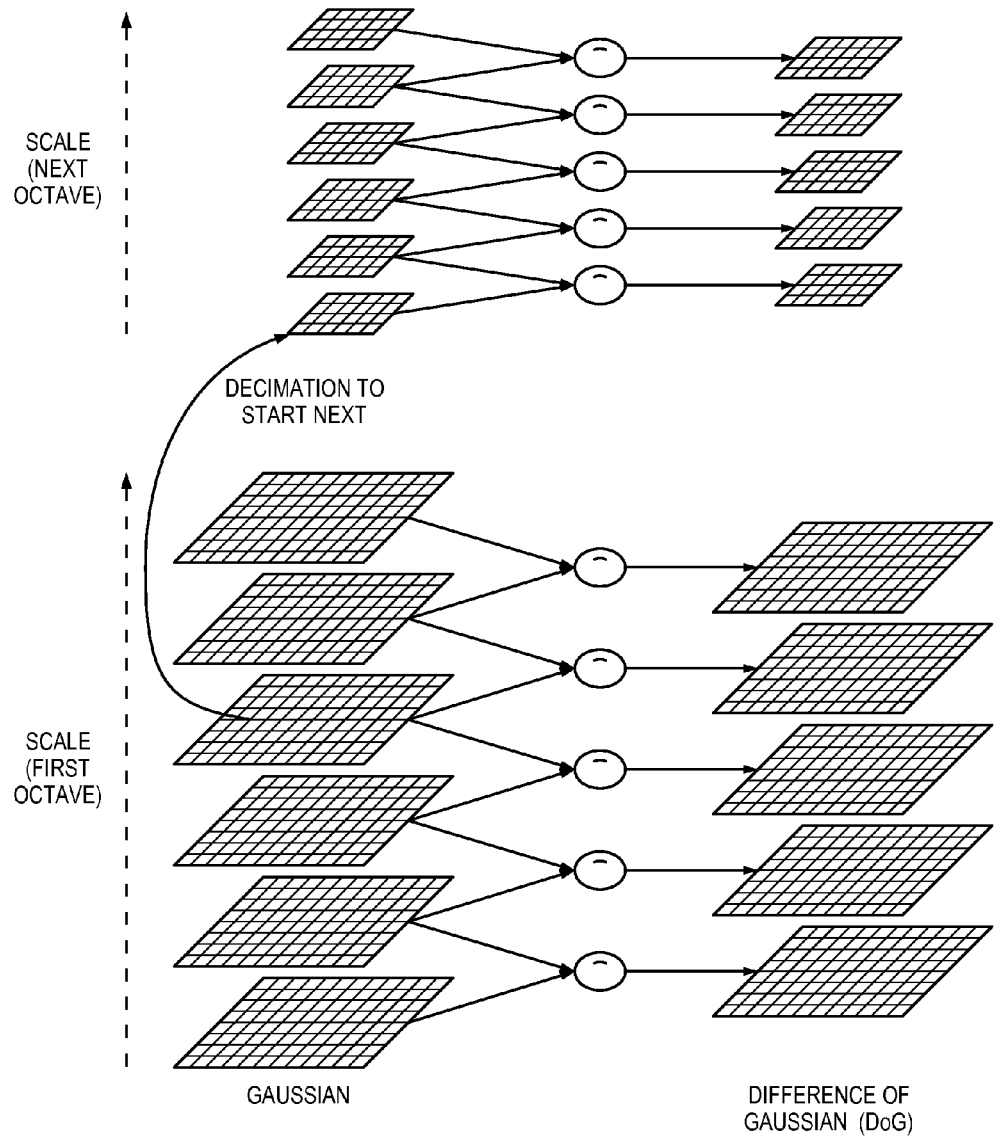
FIG. 2 illustrates the process of decimation in accordance with an embodiment of the present invention.

After the image has been blurred by an octave, it can be decimated to reduce the size of the calculation for the next octave. The process is illustrated in FIG. 2.

Figure 3:
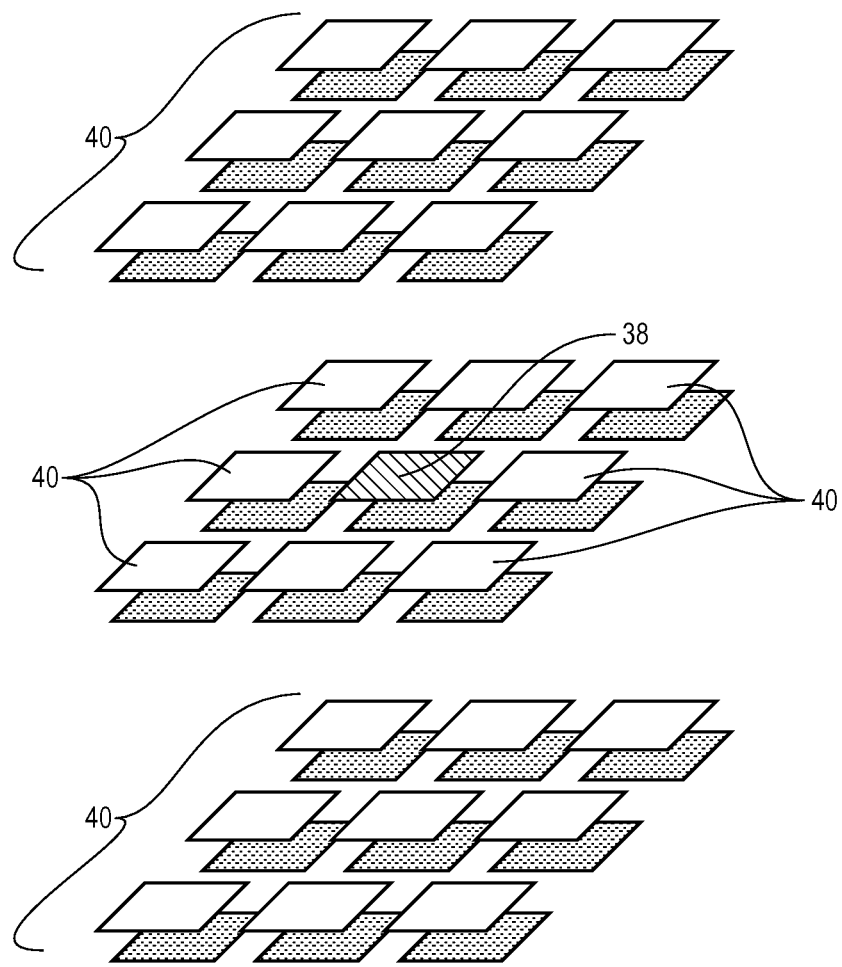
FIG. 3 illustrates the detection of extrema in scale space in accordance with an embodiment of the present invention.

Candidate key points are detected as extrema (maxima or minima) in the DoG functions, by comparing each point 38 with its 26 neighbours 40: 8 in the DoG at one value of σ and 9 in the previous and next values of σ. This is illustrated in FIG. 3, showing three 3×3 regions in successive DoG images. The middle 3×3 region contains the point 40 in question, shown hatched, and represents the DoG at a particular value of σ. The upper 3×3 region is the same spatial neighbourhood at a previous value of σ and the lower 3×3 region 3 is the same spatial neighbourhood at a subsequent value of σ. If the hatched point is an extremum, which is to say that it has the highest or lowest value of all the 27 points 38 and 40 shown, it is identified as a candidate interest point.

Figure 4:
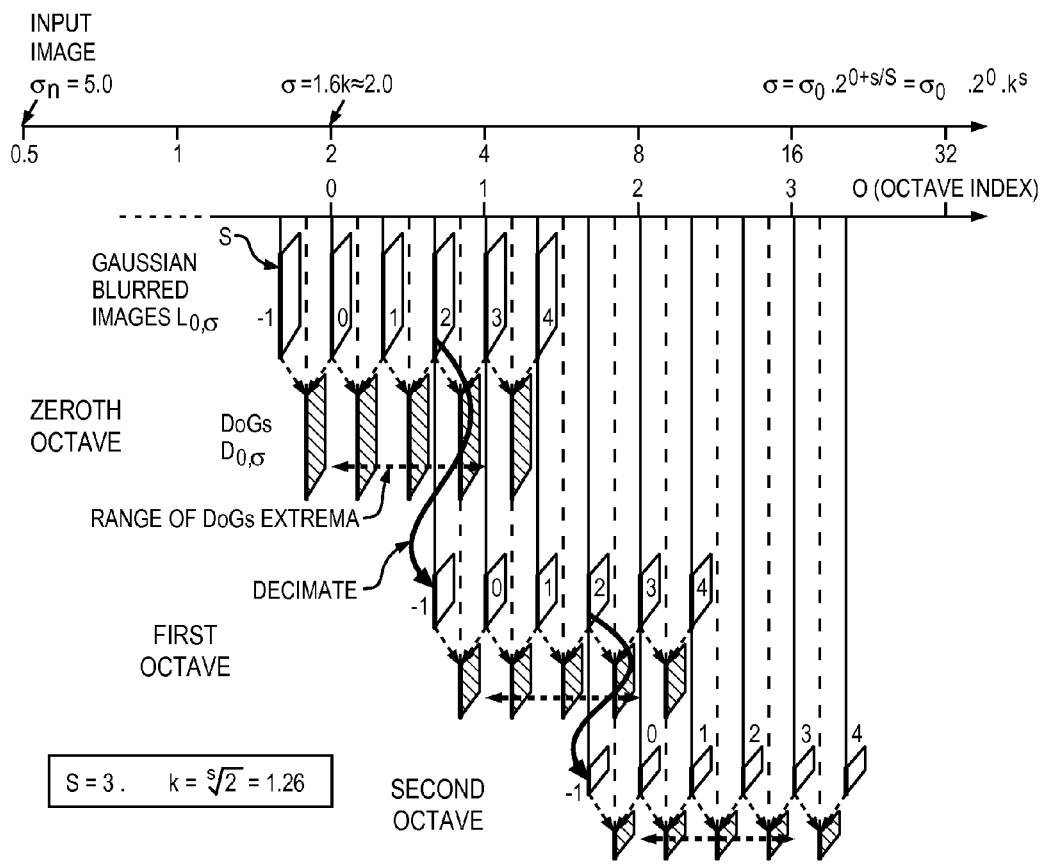
FIG. 4 is a scale and octave diagram for SIFT in accordance with an embodiment of the present invention.

The scale and octave diagram of FIG. 4, illustrates the process of blurring, generation of the DoGs and down-sampling for a few octaves. The horizontal a axis is a logarithmic scale. Note the gap between the input image and the first blurred image, $L_{O,-1}$. An integer number of iterations S corresponds to a doubling of the width of the Gaussian. To construct an octave of DoGs, S+3 blurred images are needed $L_{-1} \ldots L_4$, giving S+2 DoGs $D_{O,0} \ldots D_{O,4}$. The octave spans $L_{O,0} \ldots L_{O,3}$.

Improved matching can be obtained by more precisely locating the extrema in (x, y, σ) space. This can be done using a quadratic fit using the local sample points in the DoG function. Weak features are rejected with a threshold. Edge features tend to be unstable and are rejected by examining the curvature in orthogonal directions.

Once a key point in the image/scale space has been identified and located it is assigned an orientation, indicating the dominant direction of intensity gradient in the region around it. This is done by building a weighted histogram of slope directions, weighted by gradient and distance from the key point. The distance weighting function is another Gaussian, with a width 1.5 times the scale σ for the key point. SIFT calculates (m, θ) at every point in a circle of radius 4σ from the interest point, using only nearest neighbour points. A histogram of 10 bins of values of θ is built, using the slope magnitudes m multiplied by the Gaussian envelope with $\sigma_{env}=1.5\sigma$. The modal value of the histogram is assigned as the direction. For the largest scale (σ=3.2), a radius of 4σ demands a circle of radius ~13 pixels. Therefore, 26 lines of the image are needed. It is possible that the histogram can have more than one peak, in which case two key points are assigned to the position.

As well as the orientation assignment, the region adjacent to the key point is described with a local image descriptor, which is a set of sixteen 8-bin orientation histograms describing the sixteen 4×4 regions nearest to the key point. The assigned orientation for the key point is used to normalise the directions in the histogram.

The end product of this calculation is a set of key point descriptors for the image. Each key point or interest point is described by its position in (x, y, σ) space, its orientation and a set of sixteen 8-bin orientation histograms.

Figure 6:
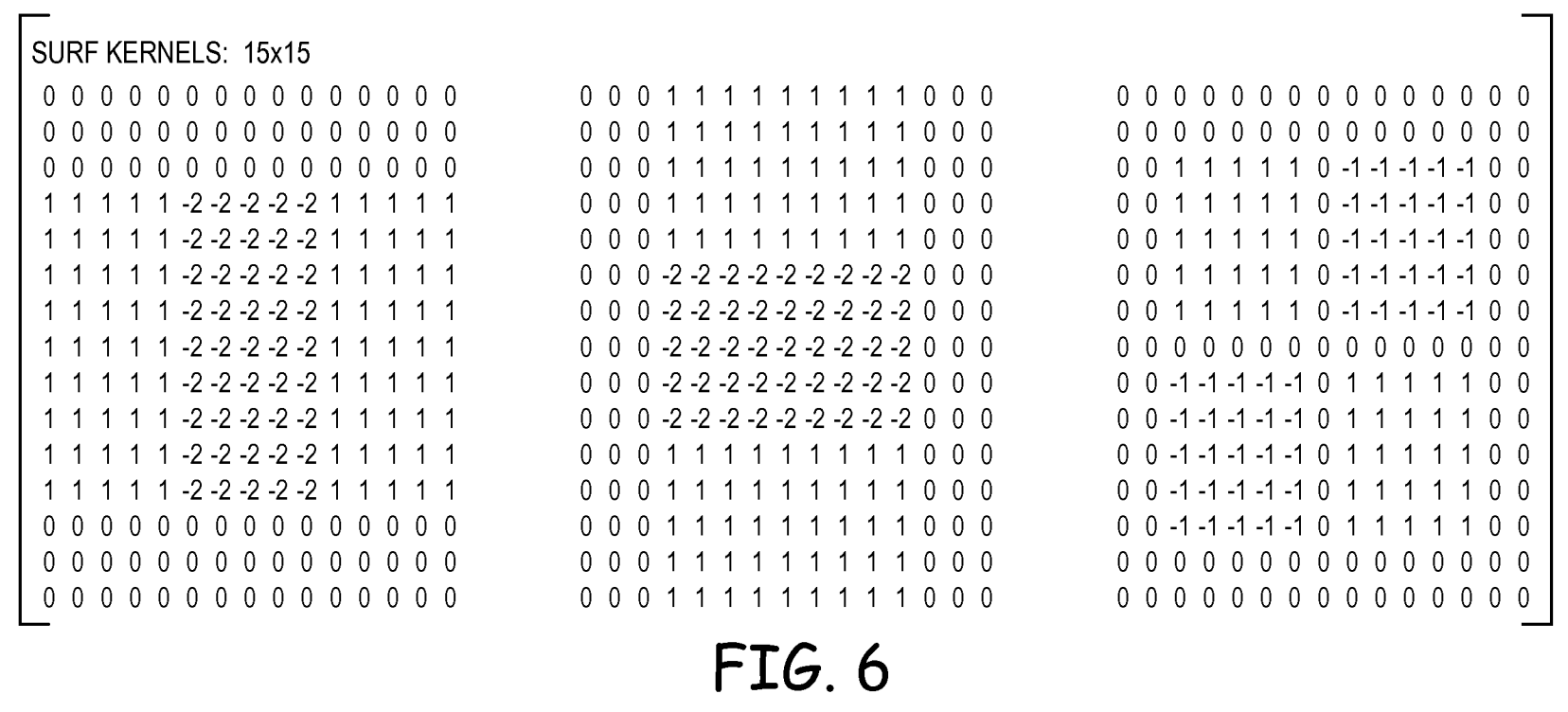

The DoG function used in SIFT is an approximation to the Laplacian of Gaussian, or LoG. In SURF, however, the LoG function is approximated using a set of greatly simplified kernels. These are illustrated in FIGS. 5 and 6.

Because the coefficients are arranged in uniform rectangular blocks, they can be very rapidly calculated using an integral image. This is explained in Bay, Herbert: "From Wide-baseline Point and Line Correspondences to 3D," DSc. dissertation submitted to ETH Zurich, Diss. ETH No 16606, 2006. This is very much faster to calculate in a microprocessor than the DoG functions used in SIFT. In particular, the speed of calculation is independent of the size of the filter, i.e. independent of the scale, so there is no need to build a scale pyramid as for SIFT. However, a frame store is required, containing extended precision values.

The kernel sizes must grow by a minimum of 6 on a side to keep a central pixel, giving sizes of 9×9, 15×15, 21×21, 27×27. The kernels illustrated in FIG. 5 are 9×9 kernels and those in FIG. 6 are 15×15.

Figure 7:
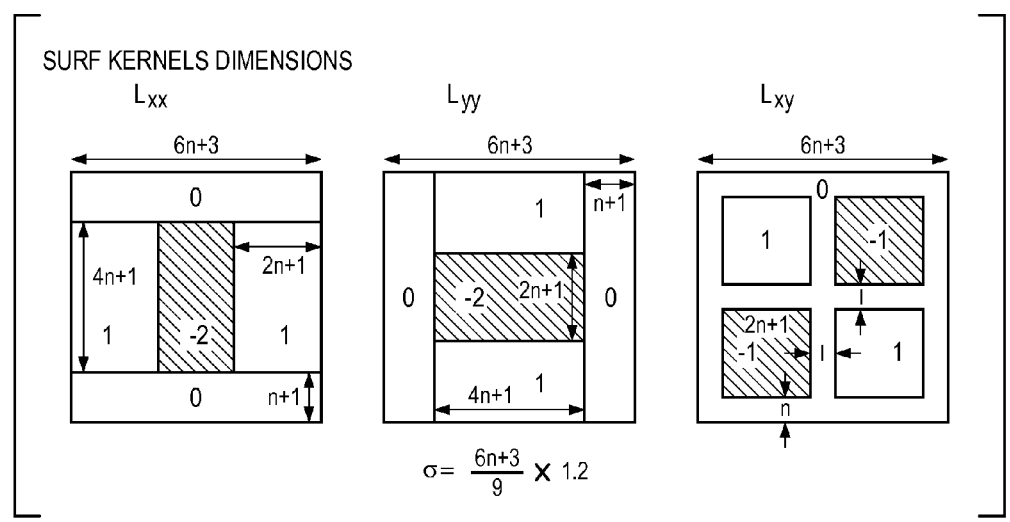

In software implementations of SURF, the kernel sizes used are increased by 6 in the first "octave", by 12 in the second, by 24 in the third, and so on. The blocks of coefficient values in the kernel grow according to the patterns shown in FIG. 7. The kernel size and scale range sequences are shown in the FIG. 8.

The relationship between the so-called octaves is not exact and the range of the octaves gradually increases, i.e. the ratio between the larger and the smaller scales increases. Therefore, they are not, strictly, octaves, but this approach allows each octave to use two of the filters used in the previous octave every time, so it reduces the amount of calculation by half. The filters are always odd sided, so there is a central pixel as required Orientation assignment is performed in SURF by examining the luma intensity gradients in a circular area around the interest point to determine the dominant direction of gradient. SURF uses a wider circle than SIFT, of radius 6σ. At each point in the circle, a 4σ×4σ area around the point is used to calculate the local gradients using Haar wavelet functions. In total, therefore, pixels from 8σ lines before and after the interest point are used, so up to 51 lines of the image are needed.

The SURF interest point descriptor is calculated over a larger area than the SIFT descriptor, with an extent of 20σ. The descriptor is a square region, aligned with the assigned orientation of the interest point. It is divided into 4×4 subregions and uses 5×5 4σ×4σ Haar wavelets in the x and y directions oriented with respect to the interest point, i.e. four sums in each region: Σdx, Σdy, Σ|dx|, Σ|dy|. The SURF descriptor requires up to 20√2σ lines of memory to be calculated, which is about 90 lines.

Embodiments of the invention will now be described, beginning with FIG. 9, which is a hardware and dataflow diagram for a first embodiment of the invention. All of the components illustrated in FIG. 9 can be integrated onto a single device or chip, although this is not an essential requirement. Nevertheless, the design and arrangement of the components is such as to make this possible, and there are many circumstances in which this would be desirable. The same integrated device or chip can also include additional components that are not shown in this figure, but will be illustrated with reference to later embodiments of the invention. For example, the circuit of FIG. 9 may be embedded into an image sensor chip that possesses all of the components, such as CCDs or CMOS image sensors, necessary to capture an image or series of images in real time on which the circuits of FIG. 9 can then operate.

Figures 9A, 9B:
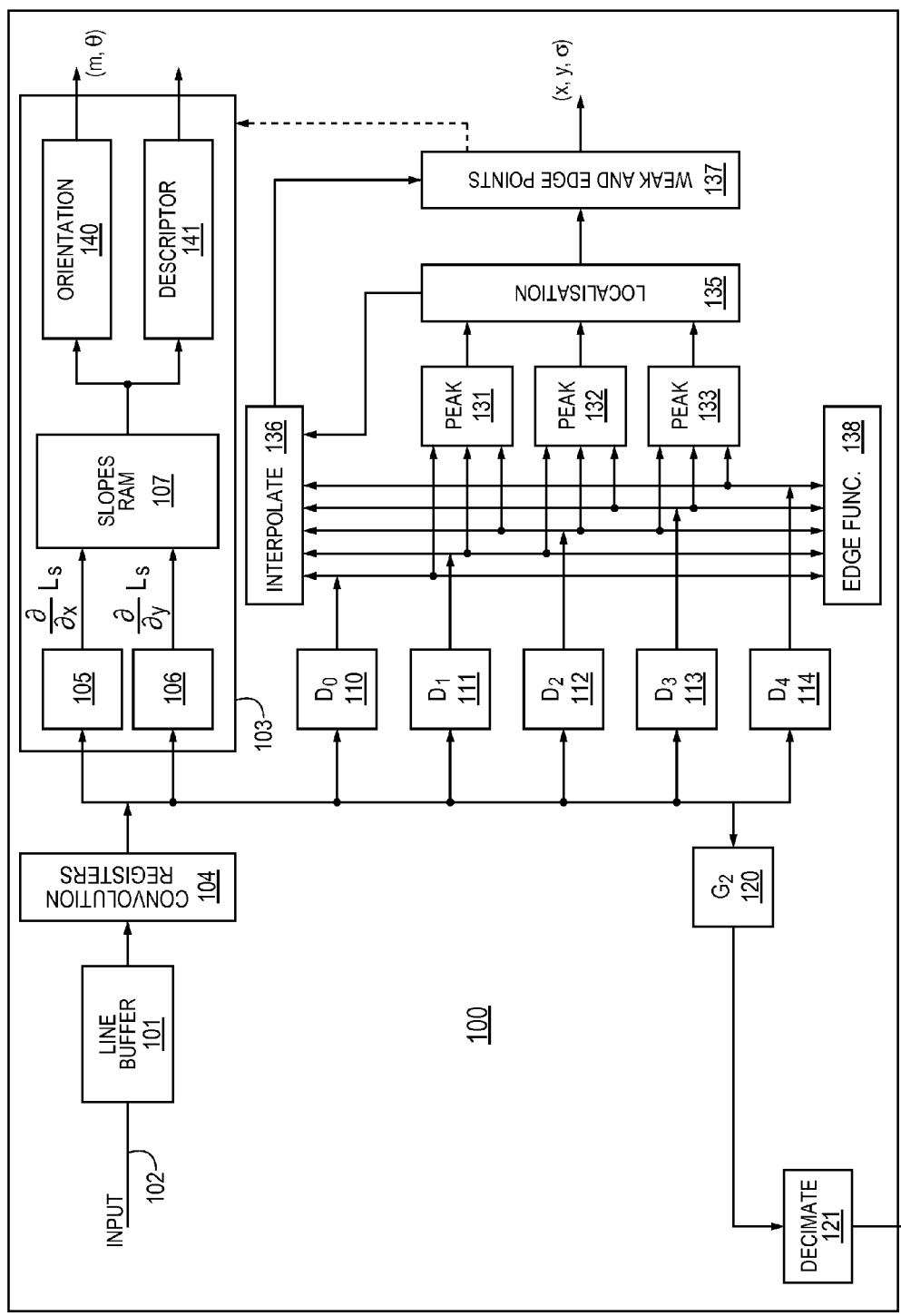
FIG. 9 depicts first embodiments of the invention.

The block forming the top half of FIG. 9 is the zeroth octave hardware 100 and the block forming the bottom half of the figure is the subsequent octave hardware 200. The zeroth octave hardware includes a line buffer 101. This is constructed as a 40-line buffer and can therefore buffer 40 lines of image data. Other numbers of lines can be used, of course, but it is useful to reduce the number of lines in the buffer as much as possible so as to reduce the amount of space it occupies on the chip. Each pixel position in the line buffer is embodied as an 8 bit integer value, but other number of bits can be used depending upon the accuracy required. The use of integer values simplifies the arithmetic.

The line buffer 101 receives image data line-by-line through an input port 102. In the following, these lines of image data will be designated "$L_{zero}$". The image data may simply be the luma channel of original colour image data, or any other channel that carries information suitable for analysis to detect interest points. In general, the image data will contain many more than 40 lines per frame, from which it will be clear that the line buffer 101 is physically incapable of storing more than a fraction of an image frame. Once the line buffer 101 is full, subsequent lines of image data are received into it at the expense of the oldest line of data it contains. For example, the first time this will happen is with the receipt of line 40, at which time the line buffer already holds 40 lines from line 0 to line 39. Line 40 is received into the line buffer at the expense of line 0, which is discarded.

The size of the line buffer 101 is determined by the requirements of downstream components in the zeroth octave hardware 100. For example, suppose that a downstream component, for example a filter, requires a minimum of N lines of image data to be supplied to it simultaneously. The minimum number of lines that the line buffer 101 must contain will then be N-1. As a new line of image data is received, it can be conveyed to the downstream hardware together with N-1 lines of previously received data from the line buffer 101, making for N lines of data altogether, as required. At the same time, the oldest line of data in the line buffer 101 is discarded and the new line of data is stored.

Zeroth octave hardware 100 also include an orientation and localization engine 103, the function of which will be described later. Forty-one lines of image data are passed to the orientation and localization engine 103 via convolution registers 104, and are received in the horizontal slope filter 105 and the vertical slope filter 106. These filters take the horizontal ($\partial L_{zero}/\partial x$) and vertical ($\partial L_{zero}/\partial y$) first derivatives of the input image data and the results are stored in a slopes register 107. The slopes register 107 stores 39 rows by 39 columns of horizontal and vertical derivatives, as n-bit integer values.

The zeroth octave hardware 100 includes five DoG filters 110, 111, 112, 113 and 114, to which the image data from the convolution registers 104 is simultaneously fed. Although DoG filters are described, other filters that approximate the trace or determinant of the Hessian matrix could equally well be used. Each of the DoG filters calculates the difference between Gaussians at successive scales. Mathematically, we represent the DoG filters by the functions $D_0, D_1, D_2, D_3$ and $D_4$:

$$D_s = G_{s+1} - G_s \approx \frac{\partial}{\partial \sigma} G$$

where $G_s$ is the Gaussian at scale s.

The subsequent octave hardware 200 includes a decimated line buffer 201. This is again constructed as a 40-line buffer and can therefore buffer 40 lines of image data. Other numbers of lines can be used, of course, but it is useful to reduce the number of lines in the buffer as much as possible so as to reduce the amount of space it occupies on the chip. Each pixel position in the decimated line buffer 201 is embodied as an 8 bit integer value, but other number of bits can be used depending upon the accuracy required.

The decimated line buffer 201 receives image data line-by-line through a multiplexer 202, the function of which will be described later. In the following, these lines of image data will be designated "$L_{O,-1}$". The image data stored in the decimated line buffer 201 includes decimated data from the zeroth octave hardware and subsequently decimated data from the subsequent octave hardware 200 itself. In general, the decimated image data from the zeroth octave hardware 100 will contain many more than 40 lines per frame, from which it will be clear that the decimated line buffer 201 is physically incapable of storing more than a fraction of a decimated image frame. Once the decimated line buffer 201 is full, subsequent lines of image data are received into it at the expense of the oldest line of data it contains. For example, the first time this will happen is with the receipt of line 40 at which time the line buffer already holds 40 lines from line 0 to line 39. Line 40 is received into the line buffer at the expense of line 0, which is discarded.

The size of the line buffer 201 is determined by the requirements of downstream components in the subsequent octave hardware 200. For example, suppose that a downstream component, for example a filter, requires a minimum of N lines of image data to be supplied to it simultaneously. The minimum number of lines that the line buffer 101 must contain will then be N−1. As a new line of image data is received, it can be conveyed to the downstream hardware together with N−1 lines of previously received data from the line buffer 201, making for N lines of data altogether, as required. At the same time, the oldest line of data in the line buffer 201 is discarded and the new line of data is stored.

Subsequent octave hardware 200 also include an orientation and localization engine 203, the function of which will be described later. Forty-one lines of image data are passed to the orientation and localization engine 203 via convolution registers 204, and are received in the horizontal slope filter 205 and the vertical slope filter 206. These filters take the horizontal ($\partial L_{O,-1}/\partial x$) and vertical ($\partial L_{O,-1}/\partial y$) first derivatives of the input image data and the results are stored in a slopes register 207. The slopes register 207 stores 39 rows by 39 columns of horizontal and vertical derivatives, as n-bit integer values.

The subsequent octave hardware 200 also includes five DoG filters 210, 211, 212, 213 and 214, to which the image data from the convolution registers 204 is simultaneously fed. Although DoG filters are described, other filters that approximate the trace or determinant of the Hessian matrix could equally well be used. Each of the DoG filters calculates the difference between Gaussians at successive scales. Mathematically, we again represent the DoG filters by the functions $D_0$, $D_1$, $D_2$, $D_3$ and $D_4$:

$$D_s = G_{s+1} - G_s \approx \frac{\partial}{\partial \sigma} G$$

where $G_s$ is the Gaussian at scale s.

As has already been discussed, and by way of background, features or interest points in the images are taken to be the maxima and minima of a function in scale space. Scale space has dimensions x and y (column and row respectively) and a scale parameter $\sigma$. The scale-space function of the image L(x, y, $\sigma$) is given by the convolution of a Gaussian kernel with width $\sigma$ and the input image I(x, y):

$$L(x, y, \sigma) = G(x, y, \sigma) * I(x, y)$$

where $$G(x, y, \sigma) = \frac{1}{2\pi\sigma^2} e^{-(x^2+y^2)/2\sigma^2}$$

The Gaussian is a low pass filter, where the cut-off frequency is determined by $\sigma$. Convolving the image with G($\sigma$) blurs out details smaller than a size related to $\sigma$. By blurring the image with a succession of Gaussians, G($\sigma$), G(k$\sigma$), G($k^2\sigma$), ... etc a succession of image features can be blurred away.

The Difference of Gaussian function is a band pass filter and so has maxima or minima when the characteristic width of the Gaussian filter matches the size of a feature in the image. It is computed as:

$$D_s = D(x,y,\sigma,s) = (G(x,y,k^{s+1}\sigma) - G(x,y,k^s\sigma)) * I(x,y)$$

The constant k is chosen so that an integer number of iterations S corresponds to a doubling of the width of the Gaussian, i.e.

$$k = \sqrt[S]{2}.$$

In the embodiment of the invention described here, we have chosen S=3, k=1.260 and thus five DoG filters are used. The number of filters is chosen to be S+2 because the first filter $D_0$ (110, 210 in FIG. 9) and the S+3$^{th}$ filter $D_{S+2}$ (114, 214 in FIG. 9) are required to allow maxima with respect to $\sigma$ to be determined for S values of $\sigma$ in each octave of data. This ensures that there are no gaps in the values of $\sigma$ for which the extrema can be found. Any other value of S from 2 upwards could be chosen. Since the filters 110 . . . 114, 210 . . . 214 are implemented in hardware, their number is fixed and so it is sensible to fix the value of S.

In this embodiment, the input image already has an assumed blur of $\sigma$=0.5 with respect to a perfectly sharp ideal image. This has to be taken into account for the calculation of $\sigma$ and the Gaussian kernels for each filter. The first blurred image to be used is convolved to give it $\sigma$=1.6.

The following notation will be adopted for the various data and convolution kernels:

The "ideal" (perfectly sharp) image I,
Actual input image $G_{\sigma=0.5}*I=L_{zero}$,
A blurred image $L_{O,s}$,
where O is the octave number and s the iteration within that octave.
A Gaussian blurring filter $G_{O,s}$,
for which $\sigma=1.6\times2^O\times k^{s+1}$. Hence $L_{O,s}=G_{O,s}*I$.
Note that $\sigma_{O,s}=k^{s+1}\sigma_{O,-1}$
The result of the Difference of Gaussians filter $L_{O,s+1}-L_{O,s}=D_{O,s}$.

The DoGs can be calculated by calculating Gaussians and subtracting or can be calculated directly. As shown, they are calculated directly. Memory considerations suggest this is efficient. However, the Gaussian blurred image L in the region surrounding a key point is needed for calculation of the orientation and the descriptor later.

The convolution kernels (Gaussian filter or DoG filter) for the zeroth octave are calculated with a set with respect to the input image. Therefore, $$\sigma_{kernel,s} = \sqrt{\sigma_{O,s}^2 - \sigma_n^2} = \sqrt{k^{2s+2}\sigma_{O,-1}^2 - 0.5^2} = \sqrt{2.56k^{2s+2} - 0.25}$$

After the zeroth octave, the intervals are all calculated with respect to the first down-sampled or decimated image $L_{O,-1}$. Because this is the down-sampled image, the width of its blur, $\sigma_{O,-1}$, is the same as that of the first image in the previous octave, $\sigma_{O-1,-1}$. This is defined to always be equal to 1.6. The intervals are the same for all octaves so the kernels are always the same:

$$\sigma_{kernel,s} = \sqrt{\sigma_{O,s}^2 - \sigma_{O,-1}^2} = \sigma_{O,-1}\sqrt{k^{2s+2}-1} = 1.6\sqrt{k^{2s+2}-1}$$

The next parameter to be considered is the size of the convolution kernels embodied in the DoG filters 110 . . . 114, 210 . . . 214. The VLFeat library for SIFT (www.vlfeat.org) uses kernels that cover 4$\sigma$ from the centre, giving a kernel of size 8$\sigma$+1. The following table shows the values of $\sigma$, the kernel $\sigma$ and kernel size required (dimensions and number of multipliers) for the filters in the zeroth octave and subsequent octaves.

| O | S | $\sigma_{O,s}$ | $\sigma$ wrt $L_{zero}$ | $\sigma$ wrt $L_{O,-1}$ | Kernel size | N multipliers |
|---|---|---|---|---|---|---|
| 0 | −1 | 1.6 | 1.5199 | | 15 | 23 |
| 0 | 0 | 2.0159 | 1.9529 | | 17 | 26 |
| 0 | 1 | 2.5398 | 2.4901 | | 21 | 32 |
| 0 | 2 | 3.2000 | 3.1607 | | 27 | 41 |
| 0 | 3 | 4.0317 | 4.0006 | | 35 (or 33) | 53 (or 51) |
| 0 | 4 | 5.0797 | 5.0550 | | 43 (or 41) | 65 (or 62) |
| >0 | −1 | | | 0 | — | |
| >0 | 0 | | | 1.2263 | 11 | 17 |

-continued

| O | S | $\sigma_{O,s}$ | σ wrt $L_{zero}$ | σ wrt $L_{O,-1}$ | Kernel size | N multipliers |
|---|---|---|---|---|---|---|
| >0 | 1 | | | 1.9725 | 17 | 26 |
| >0 | 2 | | | 2.7713 | 25 | 38 |
| >2 | 3 | | | 3.7006 | 31 | 47 |
| >0 | 4 | | | 4.8211 | 41 | 62 |

The kernels for both Gaussian and DoG convolutions are separable and symmetrical. That means that the number of multipliers needed can be reduced by performing the vertical convolution as the image is read from the line buffers and by using the horizontal symmetry to use most products twice. For the largest convolution a total of 62 multipliers will be needed.

From the sizes of the filter kernels shown in this table, it can be seen that the minimum number of lines in the line buffer 101 is determined by the size of zeroth octave filter $D_4$ (114 in FIG. 9), which, as shown, requires 41 lines of image data simultaneously (with small loss of precision). The minimum number of lines in the decimated line buffer 201 is determined by the size of subsequent octave filter $D_4$ (214 in FIG. 9), which, as shown, also requires 41 lines of image data simultaneously. It will therefore be understood that 41 lines of image data are supplied simultaneously to the convolution registers 104, 204. As a new line of image data is received, it is conveyed to the convolution registers 104, 204 together with 40 lines of previously received data from the line buffer 101 or decimated line buffer 201, making for 41 lines of data altogether. At the same time, the oldest line of data in the line buffer 101, 201 is discarded and the new line of data is stored.

The size of the convolution registers are also determined by this requirement. The convolution registers are 41 rows×41 columns.

The data is conveyed and discarded on a column-by-column basis. In other words, when a new pixel of image data is received, it is conveyed to the convolution registers 104, 204 together with 40 pixels of previously received data from the associated column in the line buffer 101 or decimated line buffer 201, making for a column of data with 41 pixels altogether. This column of data is shifted into the convolution registers 104, 204 and the oldest column in the convolution registers 104, 204 drops out. Thus, the subset of image data contained in each of the line buffers 101, 201 and the convolution registers is continually being turned over. All 41 lines of image data are conveyed from the convolution registers 104, 204 to the DoG filters 110 . . . 114, 210 . . . 214.

The doubling of σ after S iterations as termed an octave. After every octave, the blurred image is re-sampled, taking every second pixel in a row and every second row. No useful information is lost in this process, because higher frequencies have already been filtered out. Thus, the size of the data for the next octave is reduced by a factor of 4. At the same time, the width of the blur in the down-sampled image is halved. Therefore each octave starts with an image blurred with the same width blur.

In FIG. 9, the zeroth octave image is blurred by the Gaussian filter 120 and the job of re-sampling the image is assigned to the decimator 121, the function of which is to discard every other line and every other column from the blurred image supplied by the Gaussian filter 120. The subsequent octave image is blurred by the Gaussian filter 220 and the job of re-sampling the image is assigned to the decimator 221, the function of which is to discard every other line and every other column from the blurred image supplied by the Gaussian filter 220. The Gaussian filters 120, 220 are shown separately because the DoG filters 110 . . . 114, 210 . . . 214 calculate the differences of Gaussians directly. If Gaussian filters had instead been used, and the DoGs calculated from them, one of those Gaussian filters, shared by the filters $D_3$ and $D_4$, could have been used in place of the dedicated Gaussian filters 120, 220.

Downscaled image data is supplied to the decimated line buffer 201 through multiplexer 202. The multiplexer determines whether data from the zeroth octave decimator 121 of the subsequent octave decimator 221 is going to be written into the decimated line buffer. During operation of the device of FIG. 9, the decimated line buffer 201 contains 40½-lines of first octave data (because a line of octave one data is half as long as a line of zeroth octave data). It contains 40¼-lines of second octave data, 40⅛-lines of third octave data, and so on. This means that 40 rows of all octaves of downscaled image data (first octave, second octave, etc.) can be stored in a decimated line buffer 201 that is no larger than the zeroth octave line buffer 101. This follows from the fact that $$\sum_{i=0}^{n}(1/2)^i$$

is less than unity for all integer values of n.

The outputs of the S+2 DoG filters 110 . . . 114, 210 . . . 214 are supplied to S peak detectors 131, 132, 133, 231, 232, 233. The first zeroth octave peak detector 131 is connected to the output of the first to third zeroth octave DoG filters 110, 111 and 112. The second zeroth octave peak detector 132 is connected to the output of the second to fourth zeroth octave DoG filters 111, 112 and 113. The third zeroth octave peak detector 133 is connected to the output of the third to fifth zeroth octave DoG filters 112, 113 and 114.

The first subsequent octave peak detector 231 is connected to the output of the first to third subsequent octave DoG filters 210, 211 and 212. The second subsequent octave peak detector 232 is connected to the output of the second to fourth subsequent octave DoG filters 211, 212 and 213. The third subsequent octave peak detector 233 is connected to the output of the third to fifth subsequent octave DoG filters 212, 213 and 214.

The peak detectors 131 . . . 133, 231 . . . 233 are identical and their purpose is to perform the extremum detection that has already been described with reference to FIG. 3. The output of the peak detectors is supplied to localization block 135, 235.

More accurate location is achieved by interpolation between scales, rows and columns to locate the extremum more precisely. The method employed here is similar to that used in SIFT. It starts with a Taylor expansion (up to the quadratic term) of the DoG function in scale space, D(x, y, σ):

$$D(\underline{x}) = D + \frac{\partial D^T}{\partial x}\underline{x} + \frac{1}{2}\underline{x}^T\frac{\partial^2 D}{\partial x^2}\underline{x}.$$

Here, D is the value of the DoG function at the sample point, and $\underline{x}=(x, y, \sigma)^T$ is the offset from that point. The best estimate of the extremum, $\hat{x}$, is made by differentiating this expression with respect to $\underline{x}$ and setting it to zero:

$$\hat{x} = -\left(\frac{\partial^2 D}{\partial x^2}\right)^{-1}\frac{\partial D}{\partial x}$$

Writing this expression out in full:

$$\begin{pmatrix} \hat{x} \\ \hat{y} \\ \hat{\sigma} \end{pmatrix} = - \begin{pmatrix} \frac{\partial^2 D}{\partial x^2} & \frac{\partial^2 D}{\partial x \partial y} & \frac{\partial^2 D}{\partial x \partial \sigma} \\ \frac{\partial^2 D}{\partial y \partial x} & \frac{\partial^2 D}{\partial y^2} & \frac{\partial^2 D}{\partial y \partial \sigma} \\ \frac{\partial^2 D}{\partial x \partial \sigma} & \frac{\partial^2 D}{\partial y \partial \sigma} & \frac{\partial^2 D}{\partial \sigma^2} \end{pmatrix} \begin{pmatrix} \frac{\partial D}{\partial x} \\ \frac{\partial D}{\partial y} \\ \frac{\partial D}{\partial \sigma} \end{pmatrix}$$

The derivatives in the above equation are approximated from the calculated DoG $D_{O,s}$ and its neighbouring DoGs $D_{O,s-1}$ and $D_{O,s+1}$. The result is a 3×3 matrix for the second derivative (Hessian matrix) that needs to be inverted. Note that this matrix is symmetrical.

It is possible that the more accurate position for the extremum point, $\hat{x}$, is closer to a different sample point in $D_{O,s}$, $D_{O,s-1}$ or $D_{O,s+1}$. This will be the case if any dimension of $\hat{x}$ is larger than 0.5. The localisation could be re-calculated from that point if this happens, but hardware or time considerations may make that difficult.

This accurate calculation of the extremum point, $\hat{x}$, is performed by the localization block 136, 236. Once the extremum point has been accurately located at $\hat{x}$, this result is output to both the interpolator 136, 236 and the weak and edge point eliminator 137, 237.

The interpolator interpolates the scale function $D(x, y, \sigma)$ at the extremum point, $\hat{x}$, and outputs the interpolated result $D(\hat{x})$, to the weak and edge point eliminator 137, 237. Any method of interpolation can be used and one is to estimate the value of D at $\hat{x}$ using:

$$D(\hat{x}) = D_{O,s} + \frac{1}{2} \frac{\partial D^T}{\partial x} \hat{x}$$

Also supplying information to the weak and edge point eliminator 137, 237 is an edge function calculator 138, 238, the function of which is to eliminate unstable features that lie near edges. Features like this are characterised by a strong principal curvature in one direction and a small one in the perpendicular direction. The eigenvalues of the Hessian matrix are used to calculate the principle curvatures.

Recall that the Hessian matrix is as follows.

$$H = \begin{pmatrix} \frac{\partial^2 D}{\partial x^2} & \frac{\partial^2 D}{\partial x \partial y} \\ \frac{\partial^2 D}{\partial x \partial y} & \frac{\partial^2 D}{\partial y^2} \end{pmatrix}$$

All of the elements of this matrix are already available from calculating the larger Hessian matrix for accurate localisation, but in the embodiment illustrated, an edge function calculator 138, 238 is configured to calculate them de novo. An alternative would be for the edge function calculator 138, 238 to receive the elements already calculated from the localization block 136, 236.

As we are only concerned with the ratio of the curvatures, the effort can be reduced to calculating:

$$Tr(H) = \frac{\partial^2 D}{\partial x^2} + \frac{\partial^2 D}{\partial y^2}; \text{ and}$$

$$Det(H) = \frac{\partial^2 D}{\partial x^2} \frac{\partial^2 D}{\partial y^2} - \left( \frac{\partial^2 D}{\partial x \partial y} \right)^2.$$

These are calculated by the edge function calculator 138, 238 and supplied to the weak and edge point eliminator 137, 237. Given a threshold ratio between the principal curvatures r, usually set to 10, edge features can be eliminated by requiring that:

$$\frac{Tr(H)^2}{Det(H)} < \frac{(r+1)^2}{r}.$$

This function is assigned to the weak and edge point eliminator 137, 237. If the above condition is not met, the candidate interest point is discarded. The same happens with weak interest points. The value of D at $\hat{x}$ is supplied by the interpolator 136, 236. Any features with $|D(\hat{x})|<0.03$ are also discarded by the weak and edge point eliminator 137, 237.

Once an interest point that has not been discarded as a weak point or an edge point has been identified, the weak and edge point eliminator 137, 237 outputs the position of the interest point in scale space. It also signals the orientation and localization engine 103, 203 accordingly. The orientation and localization engine 103, 203 determines the orientation (m, θ) and generates a descriptor. The descriptor may be the same descriptor as is used in SIFT.

Having found a key point and determined that is it strong enough and not near an edge, the intensity gradients in the vicinity of the point are used to determine the dominant direction of the gradients and assign this as the orientation of the feature. This is the first step to making the feature invariant under rotation.

The gradients are calculated in the Gaussian blurred image $L_{O,s}$ closest to the keypoint. As the DoGs are calculated directly, the data needed to calculate the gradients as simple gradient filters is not available. As has already been discussed, however, this data is available from the slopes register 107, 207, the contents of which are calculated on the fly.

The procedure for orientation assignment involves calculating a gradient histogram of intensity gradients in the blurred image $L_{O,s}$ surrounding a keypoint. The histogram may have 36 bins, each 10° wide, or other numbers of bins of different widths. At each image sample location, the local gradient magnitude and direction are calculated, as follows:

$$m(x, y) = \sqrt{(L(x+1, y) - L(x-1, y))^2 + (L(x, y+1) - L(x, y-1))^2}$$

$$\theta(x, y) = \tan^{-1}\left( \frac{(L(x, y+1) - L(x, y-1))}{(L(x+1, y) - L(x-1, y))} \right)$$

The gradient magnitudes m(x, y) at each location is then multiplied by a Gaussian envelope, with $\sigma = 1.5 \times \sigma_{kernel, s}$ and added to the correct bin θ.

Once the histogram has been constructed, its modal value is found and assigned to the key point as its orientation. In the case where the peak is not unique, and the second peak is 80% or more the population of the largest peak, a new key point is created at the same position. The complexity of this process indicates that a processor may be needed to perform the task, and such is provided here in the orientation block 140, 240.

Also contained in the orientation and localization engine 103, 203 is a descriptor calculator 141, 241. The descriptor may be any descriptor, but the example given here is of a descriptor similar to the SIFT descriptor. The SIFT descriptor is a histogram containing $N_x^2 N_\theta$ bins (usually 4×4×8): $N_x^2$ regions, $N_\theta$ orientation bins. The size of the descriptor is normalized to the scale of the key point and the orientations are rotated into the frame of the orientation of the frame of the key point. In the scale space of the key point, it looks like FIG. 10.

To calculate the contents of the descriptor, however, one must consider what it looks like in the scale space of the image as in FIG. 11.

In the image space, the descriptor is rotated (by the orientation of the key point) and scaled to the scale of the interest point. The descriptor window covers an area of the image as shown in FIG. 11 with side $M\sigma_{kernel,s}$, where M is called the descriptor window magnification factor.

The gradient magnitudes and direction for pixels in the blurred image $L_{O,s}$ are calculated. In an embedded solution in an imaging chip, it makes sense just to calculate these values within a region of interest. These are the same values used for the orientation assignment described above.

Then, for every pixel in that falls inside the descriptor window as projected into the scale space of $L_{O,s}$:

- Calculate the position, (x', y'), and orientation, θ', of the pixel in the descriptor space. (This is a simple rotation and scaling transform of the corresponding co-ordinates (x, y) and θ.)
- The gradient, m, of $L_{O,s}$ at each pixel is multiplied by several weights before being added to bins in the histogram:
- A Gaussian envelope with $\sigma_{win}=M\sigma_{kernel,s}/2$ to reduce the effect of small changes in position of the window and to give less emphasis to gradients further from the centre of the descriptor.
- To avoid instability and sudden changes when a pixel moves over a box boundary, each pixel can contribute to orientation bins in up to 4 boxes, weighted by the distance from the centre of the box.
- Similarly, each pixel can contribute to two orientation bins, weighted by the proximity of the angle of the gradient to the centre of the orientation bins.

Finally, the histogram is $l^2$ normalised, clamped at 0.2 and $l^2$ normalised again. The descriptor is also a complex object to calculate with several parameters that can vary from application to application. It is output by the descriptor calculator 141, 241. The complexity of this part of the algorithm carries risk of error. It makes sense to use a programmable processor to implement it and that is what is done here in the descriptor calculator 141, 241. This may be the same processor as is used in the orientation block 140, 240 and indeed, in this and other embodiments of the invention, the zeroth octave hardware 100 and the subsequent octave hardware 200 may share the use the same processor for orientation assignment, descriptor generation, or both.

The operation of the device illustrated in FIG. 9 will now be described. At a high level, each of the zeroth octave and subsequent octave hardware 100, 200 includes a line buffer 101, 201, a pipeline consisting of the convolution registers 104, 204, a convolution engine consisting of the DoG filters 110 . . . 114, 210 . . . 214 and the Gaussian filters 120, 220, an interest point identifier consisting of the peak detectors 131 . . . 133, 231 . . . 233, localization block 135, 235, interpolator 136, 236, edge function calculator 138, 238, and weak and edge point eliminator 137, 237. In addition, each of the zeroth octave and subsequent octave hardware 100, 200 includes sequencing circuitry that controls the operation of the other components so that the correct operations are performed on the correct data and the correct time. The sequencing circuitry may be a control block that coordinates the operation of the other components or it may, as illustrated in FIG. 9, not be a separately identifiable functional block, but rather built into the other components in a distributed way.

The sequencing may be implemented as a state machine, either as a central control block, or distributed state machines, or a combination of both.

The process by which image data is received into the line buffer 101 has already been described. As the $40^{th}$ line of image data is received into the line buffer 101, it is output to the pipeline 104 and thence to the convolution engine 110 . . . 114, 120 together with the zeroth to $39^{th}$ lines of image data that have previously been stored in the line buffer 101, and at the same time the zeroth line of image data is discarded and replaced by the $40^{th}$ line. This process continues until all the lines of image data are received. Thus, as the $j^{th}$ line of image data is received into the line buffer 101, it is output to the pipeline 104 and thence to the convolution engine 110 . . . 114, 120 together with the j–$40^{th}$ to j–$1^{th}$ lines that have previously been stored in the line buffer 101, and at the same time the j–$40^{th}$ line of image data is discarded and replaced by the $j^{th}$ line.

The Gaussian filter 120 of the convolution engine receives the image data from the line buffer 101 via the pipeline 104, blurs it and outputs it to the decimator 121. The decimator 121 outputs the blurred data from every other row and every other column, in other words a pattern of every fourth pixel location in the received image data, as downscaled image data. This data is fed via the multiplexer 202 into the decimated line buffer 201 of the subsequent octave hardware 200. The DoG filters 110 . . . 114 of the convolution engine are approximate Hessian filters. The image data from the pipeline 104 is convolved with the DoG filters 110 . . . 114 and the DoG filters 110 . . . 114 therefore output Hessian filtered data to the interest point identifier 131 . . . 133, 135-138. The interest point identifier receives the Hessian-filtered data and detects extrema in the peak detectors 131 . . . 133 to identify candidate interest points at appropriate scales, and, once the remaining components have interpolated and rejected weak points and edge points, it outputs the position and scale of the candidate interest points.

Data fed via the multiplexer 202 into the decimated line buffer 201 of the subsequent octave hardware 200 is treated in a similar way. As the $40^{th}$ line of decimated image data is received into the decimated line buffer 201, it is output to the pipeline 204 and thence to the convolution engine 210 . . . 214, 220 together with the zeroth to $39^{th}$ lines of decimated image data that have previously been stored in the decimated line buffer 201, and at the same time the zeroth line of decimated image data is discarded and replaced by the $40^{th}$ line. This process continues until all the lines of decimated image data are received. Thus, as the $j^{th}$ line of decimated image data is received into the decimated line buffer 201, it is output to the pipeline 204 and thence to the convolution engine 210 . . . 214, 220 together with the j–$40^{th}$ to j–$1^{th}$ lines that have previously been stored in the decimated line buffer 101, and at the same time the j–$40^{th}$ line of image data is discarded and replaced by the $j^{th}$ line.

The Gaussian filter 220 of the convolution engine receives the decimated image data from the pipeline 204, blurs it and outputs it to the decimator 221. The decimator 221 outputs the blurred data from every other row and every other column, in other words a pattern of every fourth pixel location in the decimated image data, as twice decimated image data. This data is fed back via the multiplexer 202 into the decimated line buffer 201 of the subsequent octave hardware 200. The DoG filters 210 . . . 214 of the convolution engine are approximate Hessian filters. The decimated image data from the pipeline 204 is convolved with the DoG filters 210 . . . 214 and the DoG filters 210 . . . 214 therefore output Hessian filtered, decimated data to the interest point identifier 231 . . . 233, 235-138. The interest point identifier receives the Hessian-filtered, decimated data and detects extrema in the peak detectors 231 . . . 233 to identify candidate interest points at appropriate scales, and, once the remaining components have interpolated and rejected weak points and edge points, it outputs the position and scale of the candidate interest points.

As has already been discussed, each line of decimated data fed via the multiplexer 202 into the decimated line buffer 201 from the zeroth octave hardware only occupies half as much space as each line of data in the line buffer 101, but the decimated line buffer 201 is as long as the line buffer 101. The data from the zeroth octave hardware 100 therefore occupies one half of each line of the decimated line buffer 201. Twice decimated data from the decimator 221 is also fed via the multiplexer back to the decimated line buffer 201. Lines of this data are half as long again. They occupy one quarter of each line of the decimated line buffer 201 and are positioned directly adjacent to the data fed in from the zeroth octave hardware 100.

As the $40^{th}$ line of twice decimated image data is received into the decimated line buffer 201, it is output to the pipeline 204 and thence to the convolution engine 210 . . . 214, 220 together with the zeroth to $39^{th}$ lines of twice decimated image data that have previously been stored in the decimated line buffer 201, and at the same time the zeroth line of twice decimated image data is discarded and replaced by the $40^{th}$ line. This process continues until all the lines of twice decimated image data are received. Thus, as the $j^{th}$ line of twice decimated image data is received into the decimated line buffer 201, it is output to the pipeline 204 and thence to the convolution engine 210 . . . 214, 220 together with the $j-40^{th}$ to $j-1^{th}$ lines of twice decimated image data that have previously been stored in the decimated line buffer 101, and at the same time the $j-40^{th}$ line of twice decimated image data is discarded and replaced by the $j^{th}$ line.

The Gaussian filter 220 of the convolution engine receives the twice decimated image data from the pipeline 204, blurs it and outputs it to the decimator 221. The decimator 221 outputs the blurred data from every other row and every other column, in other words a pattern of every fourth pixel location in the twice decimated image data, as three times decimated image data. This data is fed back via the multiplexer 202 into the decimated line buffer 201 of the subsequent octave hardware 200. The twice decimated image data from the pipeline 204 is convolved with the DoG filters 210 . . . 214 and the DoG filters 210 . . . 214 therefore output Hessian filtered, twice decimated data to the interest point identifier 231 . . . 233, 235-138. The interest point identifier receives the Hessian-filtered, twice decimated data and detects extrema in the peak detectors 231 . . . 233 to identify candidate interest points at appropriate scales, and, once the remaining components have interpolated and rejected weak points and edge points, it outputs the position and scale of the candidate interest points.

The three times decimated data from the decimator 221 is also fed via the multiplexer back to the decimated line buffer 201. Lines of this data occupy one eighth of each line of the decimated line buffer 201 and are positioned directly adjacent to the twice decimated data. This process continues until a limit is reached on the number of octaves of data to be decimated, at which point data from the decimator 221 is no longer fed back to the decimated line buffer 201. Each of the lines of the decimated line buffer will, once a steady state has been reached, consist of half a line of decimated image data, one quarter of a line of twice decimated data, one eighth of a line of three times decimated data etc.

Because the throughput of rows of each octave of image data is a multiple of, for example double, that of the rows of the next octave, the line buffer must include some mechanism to allow this to happen. One possibility is that each section of the line buffer (one for each octave) forms a chain of storage locations in the nature of a shift register so that the columns of, for example, an octave of image data can be shifted along and then upwards, thus discarding the uppermost row or rows and making room for a new row or rows at the bottom. Alternatively, pointers could be used to keep track of the location of the oldest rows of data. Another possibility is to configure the buffer as a RAM with suitable addressing.

The fact that the various octaves of data are stored next to each other in the decimated line buffer makes it easy to schedule the provision of the various octaves of data to the pipeline 204 and the convolution engine, as will be described.

For the purposes of this discussion, it is important to recognise that the decimated image data received into the decimated line buffer 201 is the product of an upstream decimation process in the decimator 121. Only one row of decimated image data can be generated by the decimator 121 for every two rows of image data received into the line buffer 101. Thus, the period of time taken for a row of decimated image data to arrive into the decimated line buffer 201 from the decimator 121 is separated from the period of time taken for the next row of decimated image data to arrive into the decimated line buffer 201 from the decimator 121 by an equal period of time in which no decimated data arrives from the decimator 121. Because the 41 lines of decimated image data have to be fed to the pipeline registers 204 at the same time as a new row of decimated image data is being received, which forms the $41^{st}$ row, it follows that the convolution, further decimation and interest point detection processes of the subsequent octave hardware 200 would have to lie idle half of the time if only the once decimated image data were being processed.

According to the embodiment of the invention illustrated in FIG. 9, this idle time is used to process the next and all subsequent octaves of decimated image data. In this case, where the image data is downscaled by a factor of two in each linear dimension, the number of cycles required by the hardware to process rows of image data reduces by half with each octave. Thus, in the subsequent octave hardware 200, rows of all octaves of decimated image data from the second upwards can be processed again in the time it takes to process the rows of the once decimated image data received from the decimator 121. The subsequent octave processing hardware 200 can most efficiently be employed therefore, in circumstances where it is used in the time periods when once decimated image data is being received from the decimator 121, to process a row of once downscaled image data and in the time periods when once decimated image data is not being received from the decimator 121, to process rows of twice decimated image data and any and all further octaves of decimated image data.

The data are processed in octave order, which is precisely the order in which they are stored in the decimated line buffer 201. Thus, if the processing of once decimated data is to be followed by the processing of twice decimated data in the period when otherwise the hardware would be idle, the decimated line buffer 201 will output the content of three quarters of each of its lines instead of one half. The first half of each line contains the once decimated data, and the third quarter contains the twice decimated data. The $41^{st}$ line of the twice decimated data to be processed is generated from the once decimated data processed immediately beforehand and will need to be delayed in a buffer (not shown) before being returned to the decimated line buffer 201 via the multiplexer 202.

Similarly, if the processing of once decimated data is to be followed by the processing of twice and three times decimated data in the period when otherwise the hardware would be idle, the decimated line buffer 201 will output the content of seven eighths of each of its lines instead of one half or three quarters. The first half of each line contains the once decimated data, the third quarter contains the twice decimated data and the seventh eighth contains the three times decimated data. The $41^{st}$ line of the twice decimated data to be processed is generated from the once decimated data processed immediately beforehand and will need to be delayed in a buffer (not shown) before being returned to the decimated line buffer 201 via the multiplexer 202. The $41^{st}$ line of the three times decimated data to be processed is generated from the twice decimated data processed immediately beforehand and will also need to be delayed in a buffer (not shown) before being returned to the decimated line buffer 201 via the multiplexer 202.

FIG. 12 illustrates the timing, where each row of FIG. 12 represent the amount of time taken to receive a new line of decimated image data from the decimator 121 into the decimated line buffer 201. In row 0, a new line of decimated image data is received from the decimator 121 into the decimated line buffer 201 and octave 1 data are processed by the convolution engine etc. In row 1, no new decimated image data are received from the decimator 121 and octave 2 and 3 data are processed. In row 2, a new line of decimated image data is received from the decimator 121 into the decimated line buffer 201 and octave 1 data are processed. In row 3, no new decimated image data are received from the decimator 121 and no data are processed. The next for rows, rows 4-7, are the same except there is no new octave 3 data to be processed. The next four rows, rows 8-11, are the same as rows 0-3. Rows 12-15 are the same as rows 4-7. Rows 16-19 are like rows 0-3, expect that data in octaves 1-6 are all ready to be processed.

It will be understood that octave 1 data is processed every other row, in even numbered rows, octave 2 in the first half of every fourth row, in odd numbered rows, octave 3 in the third quarter of every eighth row, in odd numbered rows, octave 4 in the seventh eighth of every sixteenth row, in odd numbered rows. The pattern continues. Each generation of decimated image data is thus interleaved with the other generations before being passed to the pipeline.

If we term the even numbered rows "octave 1 rows", then the following interleave pattern emerges.

Octave 1:
Processed through Hessian filters on Octave 1 rows.
Downscaled and decimated into delay buffer (½ line) as octave 2.

Octave 2:
Read out of delay buffer in first half of Other Octaves rows and processed through Hessian filters.
Simultaneously downscaled and decimated into delay buffer as octave 3.

Octave 3:
Read out of delay buffer in third quarter of Other Octaves rows and processed through Hessian Filters.
Simultaneously downscaled and decimated into delay buffer as octave 4.

Octave 4:
Read out of delay buffer in seventh eighth of Other Octaves Rows . . . .
etc.

The device of FIG. 9 is susceptible to being integrated onto a single chip. There are about 1100 multipliers and adders required. Assuming that these are 16 bit floating point, this will be a total of about 1.5 million gates. The remaining logic should be substantially less, still in the region of 500,000 gates, giving about 2 million gates in total. In 40iS, this would be about 10 $mm^2$ of logic. The memory requirement will be 82 lines of RAM or SAM, plus the (much smaller) slope memories and the memory for the processor.

In a faster process that can clock at a rate higher than the pixel rate, substantial area savings can be made by hardware sharing. Doubling the clock rate will about halve the gate count because it will do away with the need for separate zeroth octave hardware 100. An alternative is to downscale the original image data to a lower resolution and again use only the subsequent octave hardware with the downscaled lower resolution image data being received into the decimated line buffer 201.

Figures 13A, 13B:
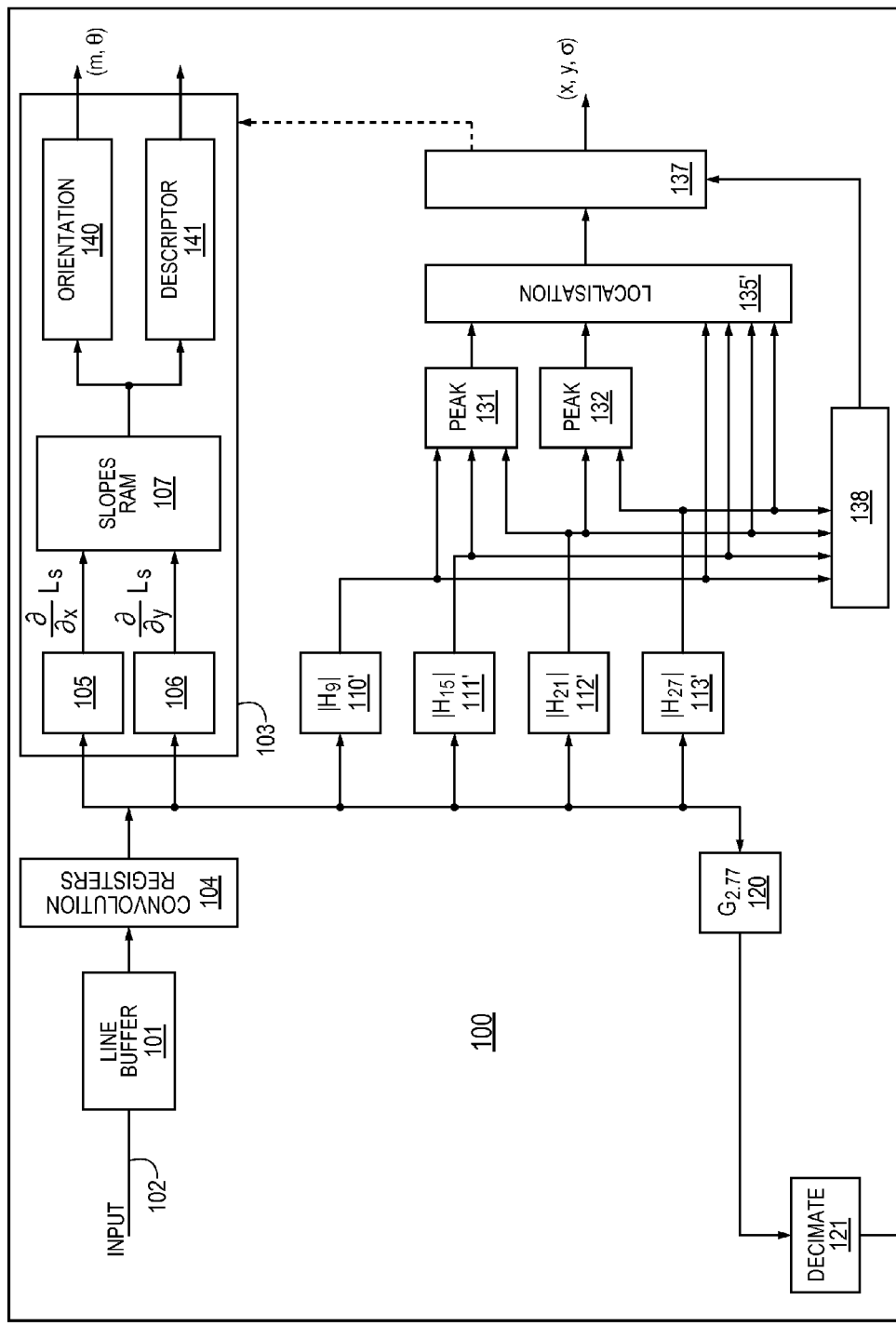
FIG. 13 depicts second embodiments of the invention.

FIG. 13 is a hardware and dataflow diagram for a second embodiment of the invention. All of the components illustrated in FIG. 13 can be integrated onto a single device or chip, although this is not an essential requirement. Nevertheless, the design and arrangement of the components is such as to make this possible, and there are many circumstances in which this would be desirable. The same integrated device or chip can also include additional components that are not shown in this figure, but will be illustrated with reference to later embodiments of the invention. For example, the circuit of FIG. 13 may be embedded into an image sensor chip that possesses all of the components, such as CCDs or CMOS image sensors, necessary to capture an image or series of images in real time on which the circuits of FIG. 13 can then operate.

There are many similarities between the circuit of FIG. 13 and that of FIG. 9. Those will be reflected in the use of the same or similar reference numerals. The block forming the top half of FIG. 13 is the zeroth octave hardware 100 and the block forming the bottom half of the figure is the subsequent octave hardware 200. The zeroth octave hardware includes a line buffer 101. A feature of this embodiment of the invention is that the line buffer 101 is smaller than the line buffer in the embodiment of FIG. 9. It is constructed as a 26-line buffer and can therefore only buffer 26 lines of image data. Other numbers of lines can be used, of course, but it is useful to reduce the number of lines in the buffer as much as possible so as to reduce the amount of space it occupies on the chip. Each pixel position in the line buffer is embodied as an 8 bit integer value, but other number of bits can be used depending upon the accuracy required.

The line buffer 101 receives image data line-by-line through an input port 102. In the following, these lines of image data will be designated "$L_{zero}$". The image data may simply be the luma channel of original colour image data, or any other channel that carries information suitable for analysis to detect interest points. In general, the image data will contain many more than 26 lines per frame, from which it will be clear that the line buffer 101 is physically incapable of storing more than a fraction of an image frame. Once the line buffer 101 is full, subsequent lines of image data are received into it at the expense of the oldest line of data it contains. For example, the first time this will happen is with the receipt of line 26, at which time the line buffer already holds 26 lines from line 0 to line 25. Line 26 is received into the line buffer at the expense of line 0, which is discarded. As with the circuit of FIG. 9, the size of the line buffer 101 is determined by the requirements of downstream components in the zeroth octave hardware 100.

Zeroth octave hardware 100 also include an orientation and localization engine 103, the function of which will be described later. Twenty seven lines of image data are passed to the orientation and localization engine 103 via convolution registers 104, and are received in the horizontal slope filter 105 and the vertical slope filter 106. These filters take the horizontal ($\partial L_{zero}/\partial x$) and vertical ($\partial L_{zero}/\partial y$) first derivatives of the input image data and the results are stored in a slopes register 107. The slopes register 107 stores 25 rows by 25 columns of horizontal and vertical derivatives, as n-bit integer values.

The zeroth octave hardware 100 includes four filters 110', 111', 112' and 113' instead of five and instead of the DoG filters of FIG. 9, these are configured as direct Hessian filters that calculate |H|, to which the image data from the convolution registers 104 is simultaneously fed. Although direct Hessian filters are described, other filters that approximate the trace or determinant of the Hessian matrix could equally well be used. Each of the Hessian filters calculates the determinant of the Hessian matrix at successive scales. Mathematically, we represent the Hessian filters by the functions $H_9$, $H_{15}$, $H_{21}$, and $H_{27}$.

Figure 14:
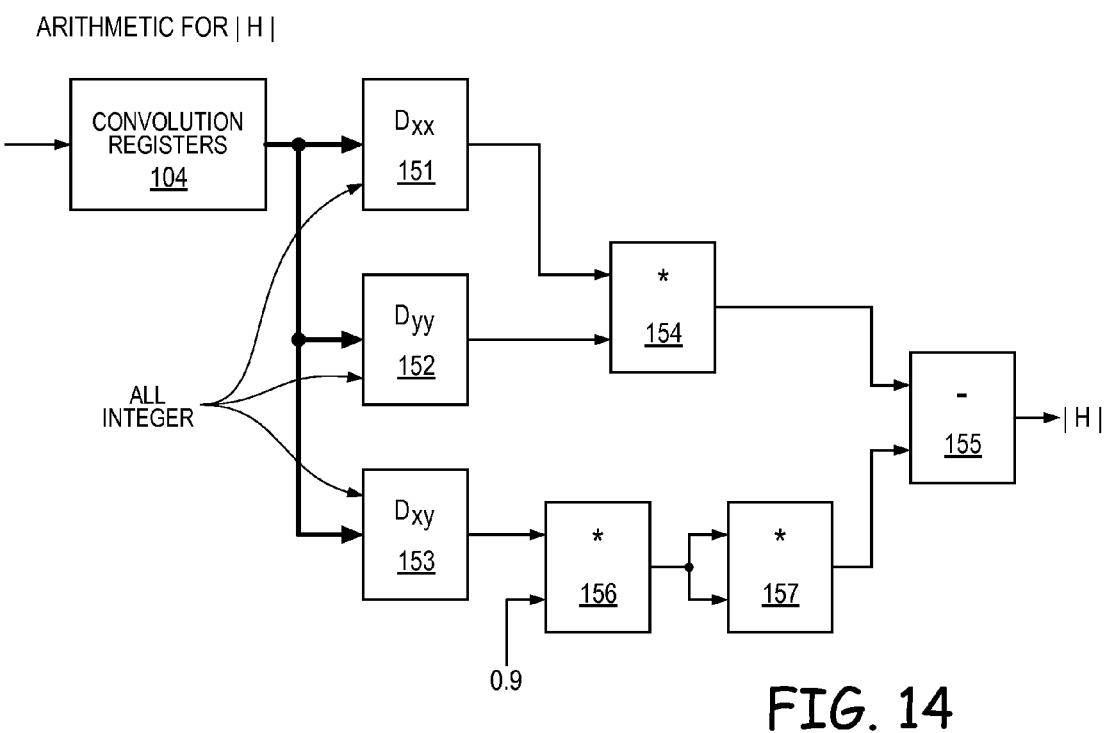
FIG. 14 depicts the Hessian filters of FIG. 13 in accordance with an embodiment of the present invention.

FIG. 14 illustrates the hardware and dataflow for each of the Hessian filters. Data from the convolution registers 104 is fed to three second derivative calculators 151, 152, 153. The first second derivative calculator 151 forms the second derivative with respect to x, $D_{xx}$. The second second derivative calculator 152 forms the second derivative with respect to y, $D_{yy}$. The third second derivative calculator 153 forms the second derivative with respect to x and y, $D_{xy}$.

The outputs ($D_{xx}$ and $D_{yy}$) of the first and second second derivative calculators 151, 152 are applied to the input of a first multiplier 154. The output from the first multiplier ($D_{xx} \cdot D_{yy}$) is applied to the non-inverting input of a subtractor 155. The output ($D_{xy}$) of the third second derivative calculator 153 is applied to the input of a second multiplier 156 and the other receives a constant value, in this case shown to be 0.9, although the exact value it will take depends upon the circumstances. The output ($0.9 \cdot D_{xy}$) of the second multiplier 156 is applied to both inputs of third multiplier 157, which therefore forms the square. Its output ($0.81 \cdot D_{xy}^2$) is applied to the inverting input of the subtractor 155. The output of the subtractor 155 is $D_{xx} \cdot D_{yy} - 0.81 \cdot D_{xy}^2$, which is sufficiently proximate to the determinant of the Hessian that it shall henceforth be designated |H|.

By using integer second derivative calculators in the calculation of |H|, each block of similar coefficients only requires two adders per line for the convolution calculation irrespective of the size of the block. Consequently, the number of adders needed for all the |H| calculations is a total of just over 800, with about a dozen multipliers. As this is all integer arithmetic, the resulting gate count is much smaller than for the equivalent part of the circuit of FIG. 9.

The subsequent octave hardware 200 includes a decimated line buffer 201. Again, the decimated line buffer 201 is smaller than the decimated line buffer in the embodiment of FIG. 9. It is constructed as a 26-line buffer and can therefore only buffer 26 lines of image data. Other numbers of lines can be used, of course, but it is useful to reduce the number of lines in the buffer as much as possible so as to reduce the amount of space it occupies on the chip. Each pixel position in the decimated line buffer is embodied as an 8 bit integer value, but other number of bits can be used depending upon the accuracy required.

The decimated line buffer 201 receives decimated image data line-by-line through a multiplexer 202, as in the case of FIG. 9. In the following, these lines of decimated image data will be designated "$L_{O, -1}$/". In general, the decimated image data will contain many more than 26 lines per frame, from which it will be clear that the decimated line buffer 201 is physically incapable of storing more than a fraction of an image frame. Once the decimated line buffer 201 is full, subsequent lines of decimated image data are received into it at the expense of the oldest line of decimated data it contains. For example, the first time this will happen is with the receipt of line 26, at which time the decimated line buffer already holds 26 lines from line 0 to line 25. Line 26 is received into the line buffer at the expense of line 0, which is discarded. As with the circuit of FIG. 9, the size of the line buffer 201 is determined by the requirements of downstream components in the zeroth octave hardware 200.

Subsequent octave hardware 200 also include an orientation and localization engine 203. Twenty seven lines of image data are passed to the orientation and localization engine 203 via convolution registers 204, and are received in the horizontal slope filter 205 and the vertical slope filter 206. These filters take the horizontal ($\partial L_{O, -1}/\partial x$) and vertical ($\partial L_{O, -1}/\partial y$) first derivatives of the input image data and the results are stored in a slopes register 207. The slopes register 207 stores 25 rows by 25 columns of horizontal and vertical derivatives, as n-bit integer values.

The subsequent octave hardware 200 includes four filters 210', 211', 212' and 213' instead of five and instead of the DoG filters of FIG. 9, these are again configured as direct Hessian filters that calculate |H|, to which the image data from the convolution registers 204 is simultaneously fed. Although direct Hessian filters are described, other filters that approximate the trace or determinant of the Hessian matrix could equally well be used. Each of the Hessian filters calculates the determinant of the Hessian matrix at successive scales. Mathematically, we represent the Hessian filters by the functions $|H_9|$, $|H_{15}|$, $|H_{21}|$, and $|H_{27}|$. These Hessian filters are constructed in accordance with FIG. 14.

Figure 8:
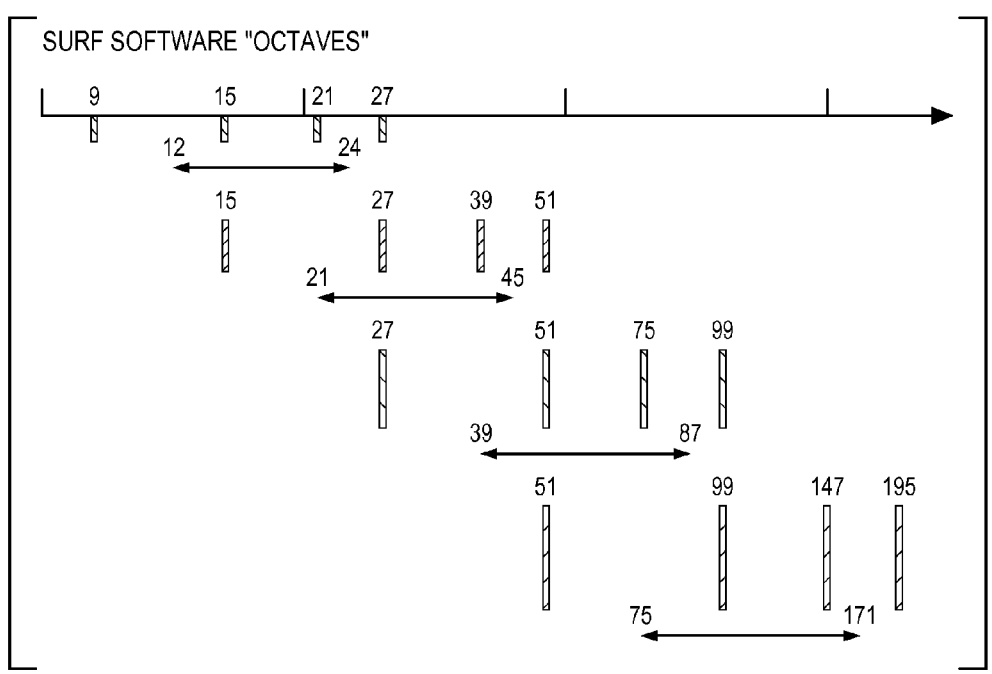
FIG. 8 depicts SURF octaves in accordance with an embodiment of the present invention.
Figure 15:
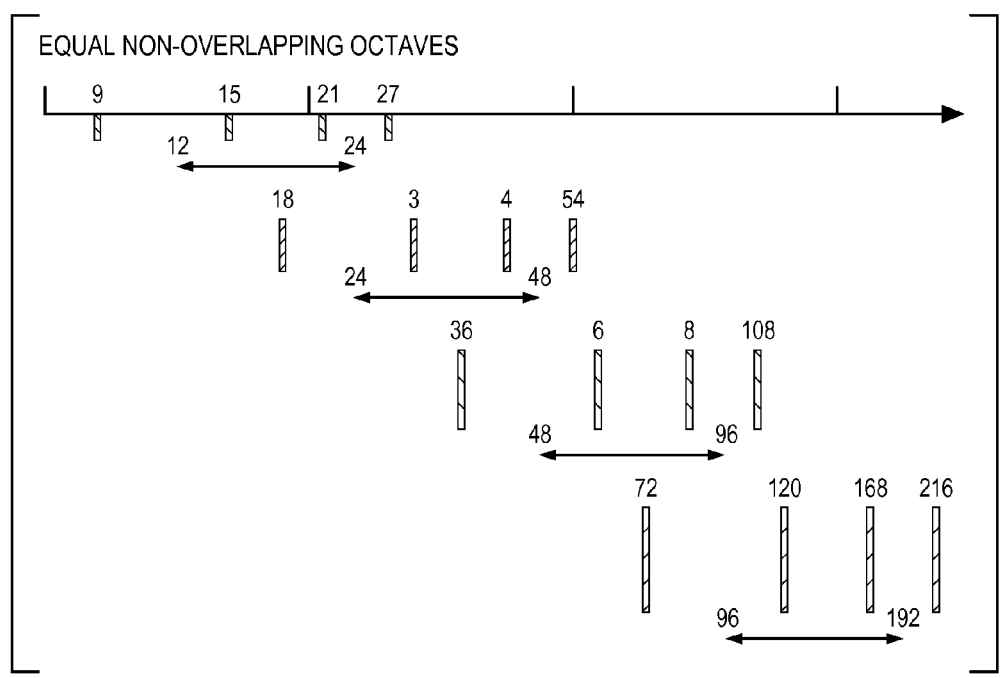
FIG. 15 is a modified scale and octave diagram in accordance with an embodiment of the present invention.

The Hessian filters of FIG. 13 are designed to give similar results as are obtained with SURF, but without the need for an integral frame store and without the oversimplification introduced by the limited values in the SURF box filters. There is one other important difference, however. As has already been discussed, the relationship between the so-called octaves in SURF, illustrated in FIG. 8, is not exact and the range of the octaves gradually increases. If an exact relationship is used, this would give the filter sizes and scales shown in FIG. 15. After the first octave, each set of filters has double the edge sizes of those from the previous octave. This makes them all even sized so they do not have a central pixel so cannot be localised to a pixel position. Also, none of the values repeat, so there is no opportunity for reuse.

However, if a Gaussian blur is applied with $\sigma=2.7713$ and the images are down-sampled in the same way as is done for SIFT and in FIG. 9, the zeroth octave, odd-sided filter set can be used over and over again on each down-sampled image. This approach makes little sense in a software implementation but is useful to consider for a hardware approach.

The variance $\sigma$ of the first 9×9 filter is 1.2. This is also referred to as the scale s. The subsequent filters have $s=\sigma$ as follows:

9×9: $\sigma=1.2$;
15×15: $\sigma=2.0$;
21×21: $\sigma=2.8$;
27×27: $\sigma=3.6$.

The Gaussian with $\sigma=2.7713$ is achieved in the zeroth octave hardware by the Gaussian filter 120 and the job of re-sampling the image is assigned to the decimator 121, the function of which is to discard every other line and every other column from the blurred image supplied by the Gaussian filter 120. The subsequent octave image is blurred by the Gaussian filter 220 with $\sigma=2.7713$ and the job of re-sampling the image is assigned to the decimator 221, the function of which is to discard every other line and every other column from the blurred image supplied by the Gaussian filter 220.

From the sizes of the filter kernels listed above, it can be seen that the minimum number of lines in the line buffer 101 is determined by the size of zeroth octave filter $|H_{27}|$ (113' in FIG. 13), which, as shown, requires 27 lines of image data simultaneously. The minimum number of lines in the decimated line buffer 201 is determined by the size of subsequent octave filter $|H_{27}|$ (213' in FIG. 13), which, as shown, also requires 27 lines of image data simultaneously. It will therefore be understood that 27 lines of image data are supplied simultaneously to the convolution registers 104, 204. As a new line of image data is received, it is conveyed to the convolution registers 104, 204 together with 26 lines of previously received data from the line buffer 101 or decimated line buffer 201, making for 27 lines of data altogether. At the same time, the oldest line of data in the line buffer 101, 201 is discarded and the new line of data is stored. The size of the convolution registers are also determined by this requirement. The convolution registers are 27 rows×27 columns.

The data is conveyed and discarded on a column-by-column basis. In other words, when a new pixel of image data is received, it is conveyed to the convolution registers 104, 204 together with 26 pixels of previously received data from the associated column in the line buffer 101 or decimated line buffer 201, making for a column of data with 27 pixels altogether. This column of data is shifted into the convolution registers 104, 204 and the oldest column in the convolution registers 104, 204 drops out. Thus, the subset of image data contained in each of the line buffers 101, 201 and the convolution registers contained in each of the line buffers 101, 201 is continually being turned over. All 27 lines of image data are conveyed from the convolution registers 104, 204 to the Hessian DoG filters 110' . . . 113', 210' . . . 213'.

Downscaled image data is supplied to the decimated line buffer 201 through multiplexer 202. The multiplexer determines whether data from the zeroth octave decimator 121 of the subsequent octave decimator 221 is going to be written into the decimated line buffer. During operation of the device of FIG. 13, the decimated line buffer 201 contains 26½-lines of first octave data (because a line of octave one data is half as long as a line of zeroth octave data). It contains 26¼-lines of second octave data, 26⅛-lines of third octave data, and so on. This means that 26 rows of all octaves of downscaled image data (first octave, second octave, etc.) can be stored in a decimated line buffer 201 that is no larger than the zeroth octave line buffer 101.

The outputs of the four Hessian filters 110' . . . 113', 210' . . . 213' are supplied to two peak detectors 131, 132, 231, 232. Only two are needed in each of the zeroth and subsequent octave hardware 100, 200 because only four filters are used instead of five. The first zeroth octave peak detector 131 is connected to the output of the first to third zeroth octave Hessian filters 110', 111' and 112'. The second zeroth octave peak detector 132 is connected to the output of the second to fourth zeroth octave Hessian filters 111', 112' and 113'.

The first subsequent octave peak detector 231 is connected to the output of the first to third subsequent octave Hessian filters 210', 211' and 212'. The second subsequent octave peak detector 232 is connected to the output of the second to fourth subsequent octave Hessian filters 211', 212' and 213'.

The peak detectors 131 . . . 132, 231 . . . 232 are identical and their purpose is to perform the extremum detection that has already been described with reference to FIG. 3. The output of the peak detectors is supplied to localization block 135', 235' which in this case performs exactly the same function as both the localization block 135, 235 and the interpolator 136, 236 of FIG. 9. The interpolated position $\hat{x}$ of candidate interest points is output to weak and edge point eliminator 137, 237, which also receives the input from edge function calculator 138, 238.

Once an interest point that has not been discarded as a weak point or an edge point has been identified, the weak and edge point eliminator 137, 237 outputs the position of the interest point in scale space. It also signals the orientation and localization engine 103, 203 accordingly. The orientation and localization engine 103, 203 determines the orientation (m, θ) and generates a descriptor. The descriptor may be the same descriptor as is used in SIFT, described above with reference to FIG. 9, or a SURF descriptor or another descriptor. Each of the orientation and localization engines 103, 203 may contain the same hardware as in FIG. 9, including the processors 140, 141, 240, 241 that assign orientation and calculate the descriptors and output the results.

The operation of the device illustrated in FIG. 13 is essentially the same as that of FIG. 9. At a high level, each of the zeroth octave and subsequent octave hardware 100, 200 includes a line buffer 101, 201, a pipeline consisting of the convolution registers 104, 204, a convolution engine consisting of the Hessian filters 110' . . . 113', 210' . . . 213' and the Gaussian filters 120, 220, an interest point identifier consisting of the peak detectors 131, 132, 231, 232, localization and interpolation block 135', 235', edge function calculator 138, 238, and weak and edge point eliminator 137, 237. In addition, each of the zeroth octave and subsequent octave hardware 100, 200 includes sequencing circuitry that controls the operation of the other components so that the correct operations are performed on the correct data and the correct time. The sequencing circuitry may be a control block that coordinates the operation of the other components or it may, as illustrated in FIG. 13, not be a separately identifiable functional block, but rather built into the other components in a distributed way. The sequencing may be implemented as a state machine, either as a central control block, or distributed state machines, or a combination of both.

The process by which image data is received into the line buffer 101 has already been described. As the 26$^{th}$ line of image data is received into the line buffer 101, it is output to the pipeline 104 and thence to the convolution engine 110' . . . 113', 120 together with the zeroth to 25$^{th}$ lines of image data that have previously been stored in the line buffer 101, and at the same time the zeroth line of image data is discarded and replaced by the 26$^{th}$ line. This process continues until all the lines of image data are received. Thus, as the j$^{th}$ line of image data is received into the line buffer 101, it is output to the pipeline 104 and thence to the convolution engine 110 . . . 114, 120 together with the j−26$^{th}$ to j−1$^{th}$ lines that have previously been stored in the line buffer 101, and at the same time the j−26$^{th}$ line of image data is discarded and replaced by the j$^{th}$ line.

The Gaussian filter 120 of the convolution engine receives the image data from the line buffer 101 via the pipeline 104, blurs it and outputs it to the decimator 121. The decimator 121 outputs the blurred data from every other row and every other column, in other words a pattern of every fourth pixel location in the received image data, as downscaled image data. This data is fed via the multiplexer 202 into the decimated line buffer 201 of the subsequent octave hardware 200. The image data from the pipeline 104 is convolved with the Hessian filters 110' . . . 113', which output Hessian filtered data to the interest point identifier 131, 132, 135-138. The interest point identifier receives the Hessian-filtered data and detects extrema in the peak detectors 131, 132 to identify candidate interest points at appropriate scales, and, once the remaining components have interpolated and rejected weak points and edge points, it outputs the position and scale of the candidate interest points.

Data fed via the multiplexer 202 into the decimated line buffer 201 of the subsequent octave hardware 200 is treated in a similar way. As the $26^{th}$ line of decimated image data is received into the decimated line buffer 201, it is output to the pipeline 204 and thence to the convolution engine 210' . . . 213', 220 together with the zeroth to $25^{th}$ lines of decimated image data that have previously been stored in the decimated line buffer 201, and at the same time the zeroth line of decimated image data is discarded and replaced by the $26^{th}$ line. This process continues until all the lines of decimated image data are received. Thus, as the $j^{th}$ line of decimated image data is received into the decimated line buffer 201, it is output to the pipeline 204 and thence to the convolution engine 210 . . . 214, 220 together with the $j-26^{th}$ to $j-1^{th}$ lines that have previously been stored in the decimated line buffer 101, and at the same time the $j-26^{th}$ line of image data is discarded and replaced by the $j^{th}$ line.

The Gaussian filter 220 of the convolution engine receives the decimated image data from the pipeline 204, blurs it and outputs it to the decimator 221. The decimator 221 outputs the blurred data from every other row and every other column, in other words a pattern of every fourth pixel location in the decimated image data as twice decimated image data. This data is fed back via the multiplexer 202 into the decimated line buffer 201 of the subsequent octave hardware 200. The decimated image data from the pipeline 204 is convolved with the Hessian filters 210' . . . 213', which output Hessian filtered, decimated data to the interest point identifier 231, 232, 235-138. The interest point identifier receives the Hessian-filtered, decimated data and detects extrema in the peak detectors 231, 232 to identify candidate interest points at appropriate scales, and, once the remaining components have interpolated and rejected weak points and edge points, it outputs the position and scale of the candidate interest points.

As has already been discussed, each line of decimated data fed via the multiplexer 202 into the decimated line buffer 201 from the zeroth octave hardware only occupies half as much space as each line of data in the line buffer 101, but the decimated line buffer 201 is as long as the line buffer 101. The data from the zeroth octave hardware 100 therefore occupies one half of each line of the decimated line buffer 201. Twice decimated data from the decimator 221 is also fed via the multiplexer back to the decimated line buffer 201. Lines of this data are half as long again. They occupy one quarter of each line of the decimated line buffer 201 and are positioned directly adjacent to the data fed in from the zeroth octave hardware 100.

As the $26^{th}$ line of twice decimated image data is received into the decimated line buffer 201, it is output to the pipeline 204 and thence to the convolution engine 210' . . . 213', 220 together with the zeroth to $25^{th}$ lines of twice decimated image data that have previously been stored in the decimated line buffer 201, and at the same time the zeroth line of twice decimated image data is discarded and replaced by the $26^{th}$ line. This process continues until all the lines of twice decimated image data are received. Thus, as the $j^{th}$ line of twice decimated image data is received into the decimated line buffer 201, it is output to the pipeline 204 and thence to the convolution engine 210' . . . 213', 220 together with the $j-26^{th}$ to $j-1^{th}$ lines of twice decimated image data that have previously been stored in the decimated line buffer 101, and at the same time the $j-26^{th}$ line of twice decimated image data is discarded and replaced by the $j^{th}$ line.

The Gaussian filter 220 of the convolution engine receives the twice decimated image data from the pipeline 204, blurs it and outputs it to the decimator 221. The decimator 221 outputs the blurred data from every other row and every other column, in other words a pattern of every fourth pixel location in the twice decimated image data, as three times decimated image data. This data is fed back via the multiplexer 202 into the decimated line buffer 201 of the subsequent octave hardware 200. The twice decimated image data from the pipeline 204 is convolved with the Hessian filters 210' . . . 213', which output Hessian filtered, twice decimated data to the interest point identifier 231, 232, 235-138. The interest point identifier receives the Hessian-filtered, twice decimated data and detects extrema in the peak detectors 231, 232 to identify candidate interest points at appropriate scales, and, once the remaining components have interpolated and rejected weak points and edge points, it outputs the position and scale of the candidate interest points.

The three times decimated data from the decimator 221 is also fed via the multiplexer back to the decimated line buffer 201. Lines of this data occupy one eighth of each line of the decimated line buffer 201 and are positioned directly adjacent to the twice decimated data. This process continues until a limit is reached on the number of octaves of data to be decimated, at which point data from the decimator 221 is no longer fed back to the decimated line buffer 201. Each of the lines of the decimated line buffer will, once a steady state has been reached, consist of half a line of decimated image data, one quarter of a line of twice decimated data, one eighth of a line of three times decimated data etc.

Because the throughput of rows of each octave of image data is a multiple of, for example double, that of the rows of the next octave, the line buffer must include some mechanism to allow this to happen. One possibility is that each section of the line buffer (one for each octave) forms a chain of storage locations in the nature of a shift register so that the columns of, for example, an octave of image data can be shifted along and then upwards, thus discarding the uppermost row or rows and making room for a new row or rows at the bottom. Alternatively, pointers could be used to keep track of the location of the oldest rows of data. Another possibility is to configure the buffer as a RAM with suitable addressing.

As with the circuit of FIG. 9, the fact that the various octaves of data are stored next to each other in the decimated line buffer makes it easy to schedule the provision of the various octaves of data to the pipeline 204 and the convolution engine, just as in the case of FIG. 9.

According to the embodiment of the invention illustrated in FIG. 13, time that would otherwise have been idle between the processing of lines of once decimated image data is used to process the next and all subsequent octaves of decimated image data. The data are again processed in octave order, which is precisely the order in which they are stored in the decimated line buffer 201. Thus, if the processing of once decimated data is to be followed by the processing of twice decimated data in the period when otherwise the hardware would be idle, the decimated line buffer 201 will output the content of three quarters of each of its lines instead of one half. The first half of each line contains the once decimated data, and the third quarter contains the twice decimated data. The $27^{th}$ line of the twice decimated data to be processed is generated from the once decimated data processed immediately beforehand and will need to be delayed in a buffer (not shown) before being returned to the decimated line buffer 201 via the multiplexer 202.

Similarly, if the processing of once decimated data is to be followed by the processing of twice and three times decimated data in the period when otherwise the hardware would be idle, the decimated line buffer 201 will output the content of seven eighths of each of its lines instead of one half or three quarters. The first half of each line contains the once decimated data, the third quarter contains the twice decimated data and the seventh eighth contains the three times decimated data. The $27^{th}$ line of the twice decimated data to be processed is generated from the once decimated data processed immediately beforehand and will need to be delayed in a buffer (not shown) before being returned to the decimated line buffer 201 via the multiplexer 202. The $27^{th}$ line of the three times decimated data to be processed is generated from the twice decimated data processed immediately beforehand and will also need to be delayed in a buffer (not shown) before being returned to the decimated line buffer 201 via the multiplexer 202. The timing, once again, is as illustrated in FIG. 12.

As in the implementation discussed with reference to FIG. 9, the zeroth octave can be handled at full pixel rate and subsequent octaves down-sampled into a further buffer 201. It is possible to avoid having two copies of the filter arithmetic by clocking at twice the pixel rate or by doing a simple downscale of the input image to lower resolution (so reducing the pixel rate and the line length).

Only one set of filter sizes is needed: 9×9, 15×15, 21×21, 27×27 for the first octave and subsequent octaves. The down-sampling Gaussian blur filter with σ=2.7713 needs a 25×25 filter, matching well with the largest SURF kernel size. Hence, only 26 lines of memory will be needed for the first octave and also for the subsequent octaves, a total of 52 lines.

Weak point elimination can be performed by a simple thresholding on |H|. Edge point elimination may not be necessary at all. Orientation assignment will be performed using the SIFT method, which also, conveniently, needs 26 lines of memory. The descriptor can be calculated using the SIFT method, using M=2.87 or less, to restrict the number of lines needed to a maximum of 26.

The device of FIG. 13 is susceptible to being integrated onto a single chip. The number of adders needed for all the |H| calculations is a total of just over 800, with about a dozen multipliers. The memory requirement is only 52 lines of RAM or SAM, plus the (much smaller) slope memories and the memory for the processor. It is considerably smaller than the device of FIG. 9.

Figures 16A, 16B:
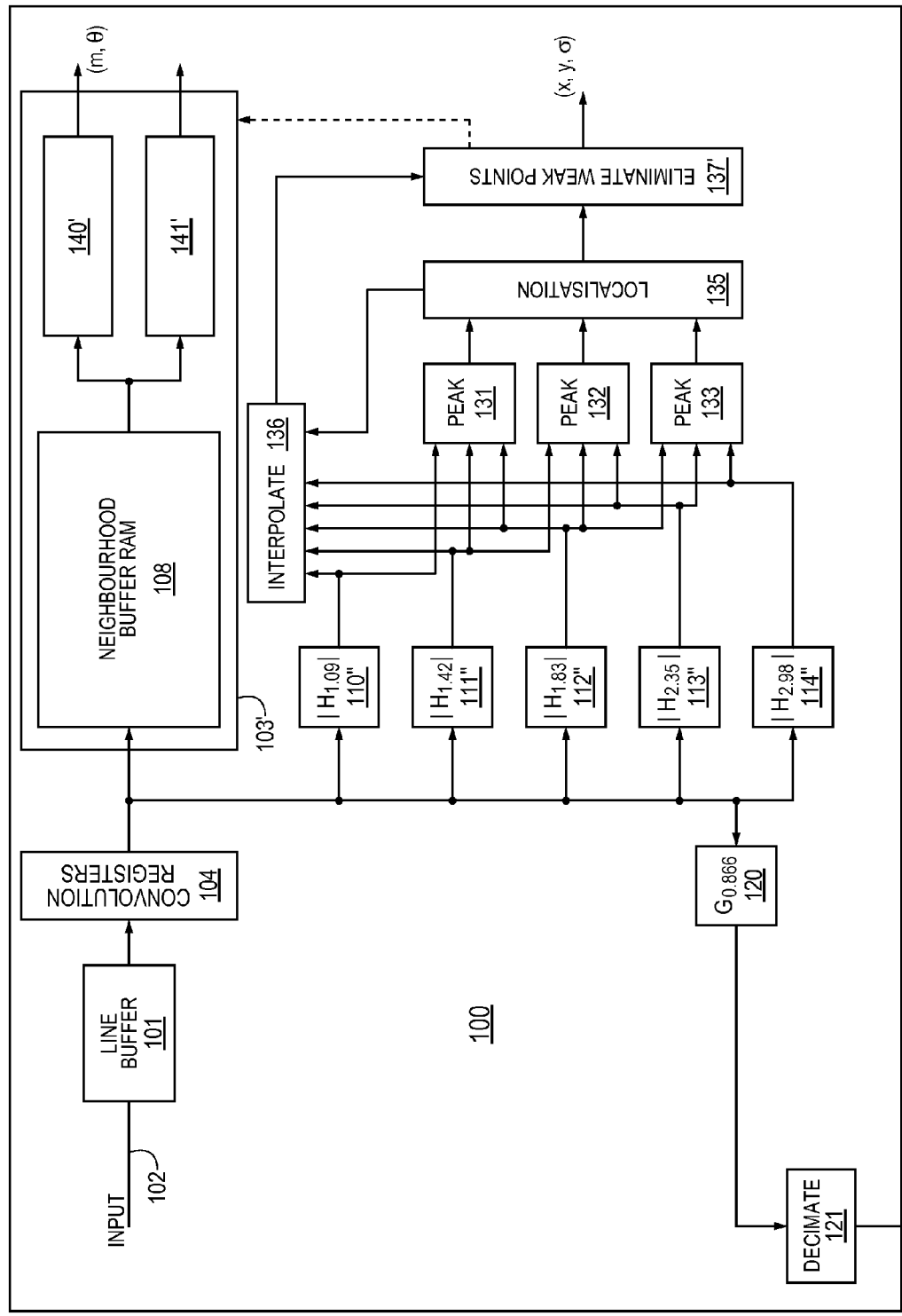
FIG. 16 depicts a second embodiment of the invention.
Figure 16B:
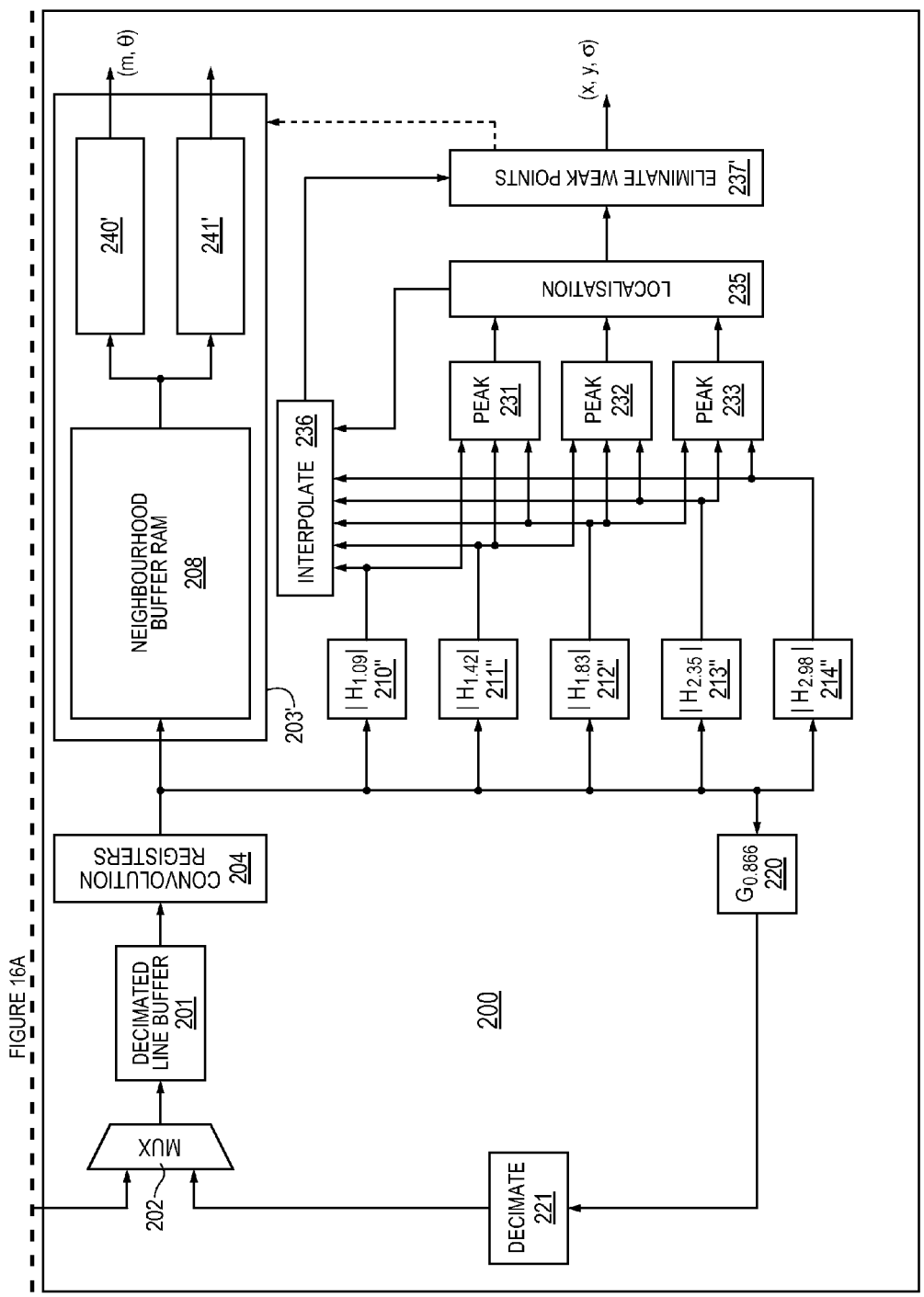

FIG. 16 is a hardware and dataflow diagram for a third embodiment of the invention. All of the components illustrated in FIG. 16 can be integrated onto a single device or chip, although this is not an essential requirement. Nevertheless, the design and arrangement of the components is such as to make this possible, and there are many circumstances in which this would be desirable. The same integrated device or chip can also include additional components that are not shown in this figure, but will be illustrated with reference to later embodiments of the invention. For example, the circuit of FIG. 16 may be embedded into an image sensor chip that possesses all of the components, such as CCDs or CMOS image sensors, necessary to capture an image or series of images in real time on which the circuits of FIG. 16 can then operate.

There are many similarities between the circuit of FIG. 16 and that of FIGS. 9 and 13. Those will be reflected in the use of the same or similar reference numerals. The block forming the top half of FIG. 16 is the zeroth octave hardware 100 and the block forming the bottom half of the figure is the subsequent octave hardware 200. The zeroth octave hardware includes a line buffer 101. A feature of this embodiment of the invention is that the line buffer 101 is smaller than the line buffer in the embodiment of FIGS. 9 and 13. It is constructed as an 18-line buffer and can therefore only buffer 18 lines of image data. Other numbers of lines can be used, of course, but it is useful to reduce the number of lines in the buffer as much as possible so as to reduce the amount of space it occupies on the chip. Each pixel position in the line buffer is embodied as an 8 bit integer value, but other number of bits can be used depending upon the accuracy required.

The line buffer 101 receives image data line-by-line through an input port 102. In the following, these lines of image data will be designated "$L_{zero}$". The image data may simply be the luma channel of original colour image data, or any other channel that carries information suitable for analysis to detect interest points. In general, the image data will contain many more than 18 lines per frame, from which it will be clear that the line buffer 101 is physically incapable of storing more than a fraction of an image frame. Once the line buffer 101 is full, subsequent lines of image data are received into it at the expense of the oldest line of data it contains. For example, the first time this will happen is with the receipt of line 18, at which time the line buffer already holds 18 lines from line 0 to line 17. Line 18 is received into the line buffer at the expense of line 0, which is discarded. As with the circuit of FIG. 9, the size of the line buffer 101 is determined by the requirements of downstream components in the zeroth octave hardware 100.

Zeroth octave hardware 100 also include an orientation and localization engine 103', the function of which will be described later. Nineteen lines of image data are passed to the orientation and localization engine 103' via convolution registers 104, and are received in the neighbourhood buffer RAM 108. The neighbourhood buffer RAM stores 21 rows by 21 columns of image data, as n-bit integer values.

The zeroth octave hardware 100 includes five filters 110", 111", 112", 113" and 114" and these are once again configured as direct Hessian filters that calculate |H|, to which the image data from the convolution registers 104 is simultaneously fed. Each of the Hessian filters calculates the determinant of the Hessian matrix at successive scales. Mathematically, we represent the Hessian filters by the functions $|H_{1.09}|$, $|H_{1.42}|$, $|H_{1.83}|$, $|H_{2.35}|$, and $|H_{2.98}|$. The subscript represents the scale, σ, of the filter in question.

Figure 17:
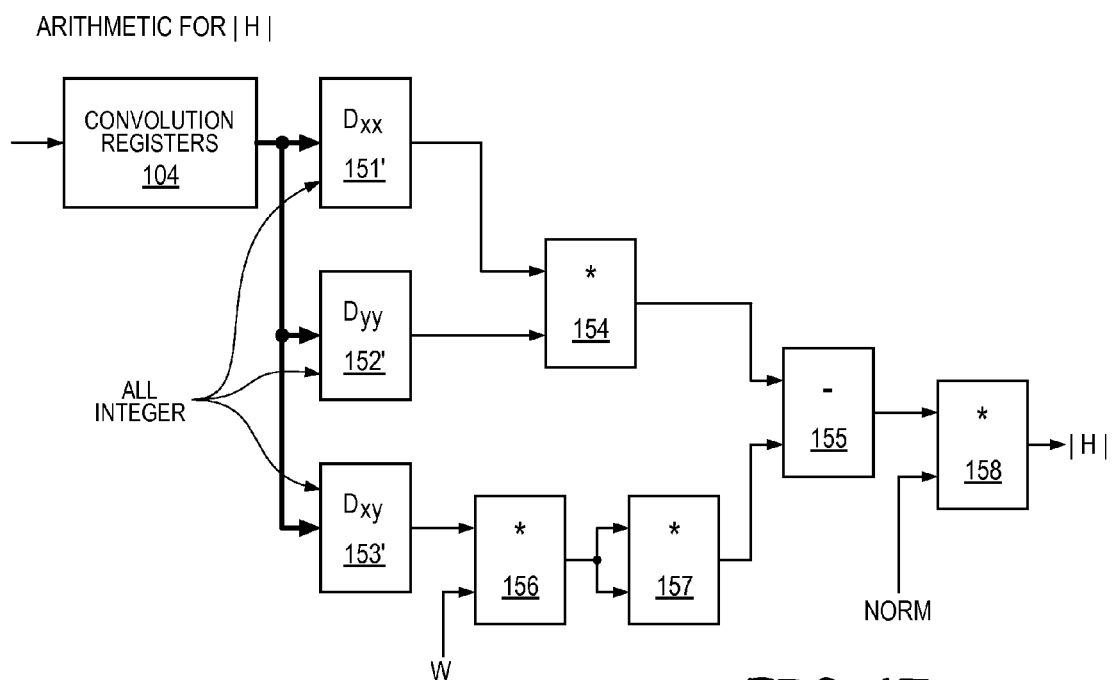
FIG. 17 depicts the Hessian filters of FIG. 16 in accordance with an embodiment of the present invention.

FIG. 17 illustrates the hardware and dataflow for each of the Hessian filters. The three second derivative calculators are labelled 151', 152', 153' and the second the second multiplier 156 receives the output ($D_{xy}$) of the third second derivative calculator 153' and a weighting factor w, a parameter of the system. The calculation of this weighting factor for SURF is described in Bay's dissertation, mentioned above, and a similar method is used here. FIG. 17 also includes one addition multiplier 158, the purpose of which will be described a little later. Other than this, FIG. 17 is identical to FIG. 14 and will be described no further.

The subsequent octave hardware 200 includes a decimated line buffer 201. Again, the decimated line buffer 201 is smaller than the decimated line buffer in the embodiment of FIG. 9. It is constructed as an 18-line buffer and can therefore only buffer 18 lines of image data. Other numbers of lines can be used, of course, but it is useful to reduce the number of lines in the buffer as much as possible so as to reduce the amount of space it occupies on the chip. Each pixel position in the decimated line buffer is embodied as an 8 bit integer value, but other number of bits can be used depending upon the accuracy required.

The decimated line buffer 201 receives decimated image data line-by-line through a multiplexer 202, as in the case of FIGS. 9 and 13. In the following, these lines of decimated image data will be designated "$L_{O,-1}$". In general, the decimated image data will contain many more than 18 lines per frame, from which it will be clear that the decimated line buffer 201 is physically incapable of storing more than a fraction of an image frame. Once the decimated line buffer 201 is full, subsequent lines of decimated image data are received into it at the expense of the oldest line of decimated data it contains. For example, the first time this will happen is with the receipt of line 18, at which time the decimated line buffer already holds 18 lines from line 0 to line 17. Line 18 is received into the line buffer at the expense of line 0, which is discarded. As with the circuit of FIG. 9, the size of the line buffer 201 is determined by the requirements of downstream components in the zeroth octave hardware 200.

Subsequent octave hardware 200 also include an orientation and localization engine 203. Nineteen lines of image data are passed to the orientation and localization engine 203' via convolution registers 204, and are received in the neighbourhood buffer RAM 208. The neighbourhood buffer RAM stores 19 rows by 19 columns of image data, as n-bit integer values.

The subsequent octave hardware 200 includes five filters 210", 211", 212", 213" and 214" and these are once again configured as direct Hessian filters that calculate |H|, to which the image data from the convolution registers 204 is simultaneously fed. Each of the Hessian filters calculates the determinant of the Hessian matrix at successive scales. Mathematically, we represent the Hessian filters by the functions $|H_{1.09}|$, $|H_{1.42}|$, $|H_{1.83}|$, $|H_{2.35}|$, and $|H_{2.98}|$. The subscript represents the scale, σ, of the filter in question. These Hessian filters are constructed in accordance with FIG. 17.

It is important to understand that the amount of blur needed to reduce the resolution of the image by an octave is dependent on the initial blur in the image. When applying a Gaussian blur $\sigma_b$ to an image that already has blur $\sigma_a$, the total resulting blur $\sigma_{ab}$ is given by:

$$\sigma_{ab}\sqrt{\sigma_a^2+\sigma_b^2}.$$

The initial blur indicates the spatial frequencies that are present in the image. The intention of the octave blur and down-sample is to return to a blur in the down-sampled image that is the same as the blur in the original image. Hence the blurred but non-down-sampled image will have twice the blur of the input image. Given an initial blur $\sigma_0$ and a final blur $2\sigma_0$, following the equation above, the blur that needs to be applied by the blurring filter is $\sigma_0\sqrt{3}$.

Assuming that the initial blur of the image is σ=0.5, a direct octave blur on the initial image, requires a kernel with $\sigma_{kernel}=0.5*\sqrt{3}=0.866$. Decimating the resulting blurred image by half in each direction (reducing the data size by a factor of 4), will product an image with σ=0.5 again.

The Gaussian with σ=0.866 is achieved in the zeroth octave hardware by the Gaussian filter 120 and the job of re-sampling the image is assigned to the decimator 121, the function of which is to discard every other line and every other column from the blurred image supplied by the Gaussian filter 120. The subsequent octave image is blurred by the Gaussian filter 220 with σ=0.866 and the job of re-sampling the image is assigned to the decimator 221, the function of which is to discard every other line and every other column from the blurred image supplied by the Gaussian filter 220.

SURF uses a first filter with σ=1.2. It is proposed to use the same scale for the first filter in the embodiment of FIG. 16. The octaves will be evenly divided into three, as in FIG. 9, requiring five evenly spaced filters, starting at σ=1.2, as shown in FIG. 16. In this embodiment of the invention, the Hessian kernels are quantized to reduce the number of values to about 8 or about 16 (3- or 4-bit 2C). The same can be done with the Gaussian kernel, but this is not a requirement even when the Hessian kernels are quantized. The resulting filters and their size (rows×columns) are as follows.

| \multicolumn{4}{c}{Hessian Blob Filter Scales} | | | |
| $\sigma_{scale}$ | $\sigma_{kernel}$ | Kernel Name | Filter Size (r × c) |
|---|---|---|---|
| 1.2 | 1.09 | K_LXX_109 | 5 × 9 |
|  |  | L_LXY_109 | 5 × 5 |
|  |  | K_LYY_109 | 9 × 5 |
| 1.5 | 1.42 | K_LXX_142 | 7 × 9 |
|  |  | L_LXY_142 | 7 × 7 |
|  |  | K_LYY_142 | 9 × 7 |
| 1.9 | 1.83 | K_LXX_183 | 7 × 11 |
|  |  | L_LXY_183 | 9 × 9 |
|  |  | K_LYY_183 | 11 × 7 |
| 2.4 | 2.35 | K_LXX_235 | 11 × 15 |
|  |  | L_LXY_235 | 11 × 11 |
|  |  | K_LYY_235 | 15 × 11 |
| 3.0 | 2.98 | K_LXX_298 | 13 × 19 |
|  |  | L_LXY_298 | 13 × 13 |
|  |  | K_LYY_298 | 19 × 13 |
| Gaussian | 0.866 | K_G87 | 9 × 9 |

Figure 18:
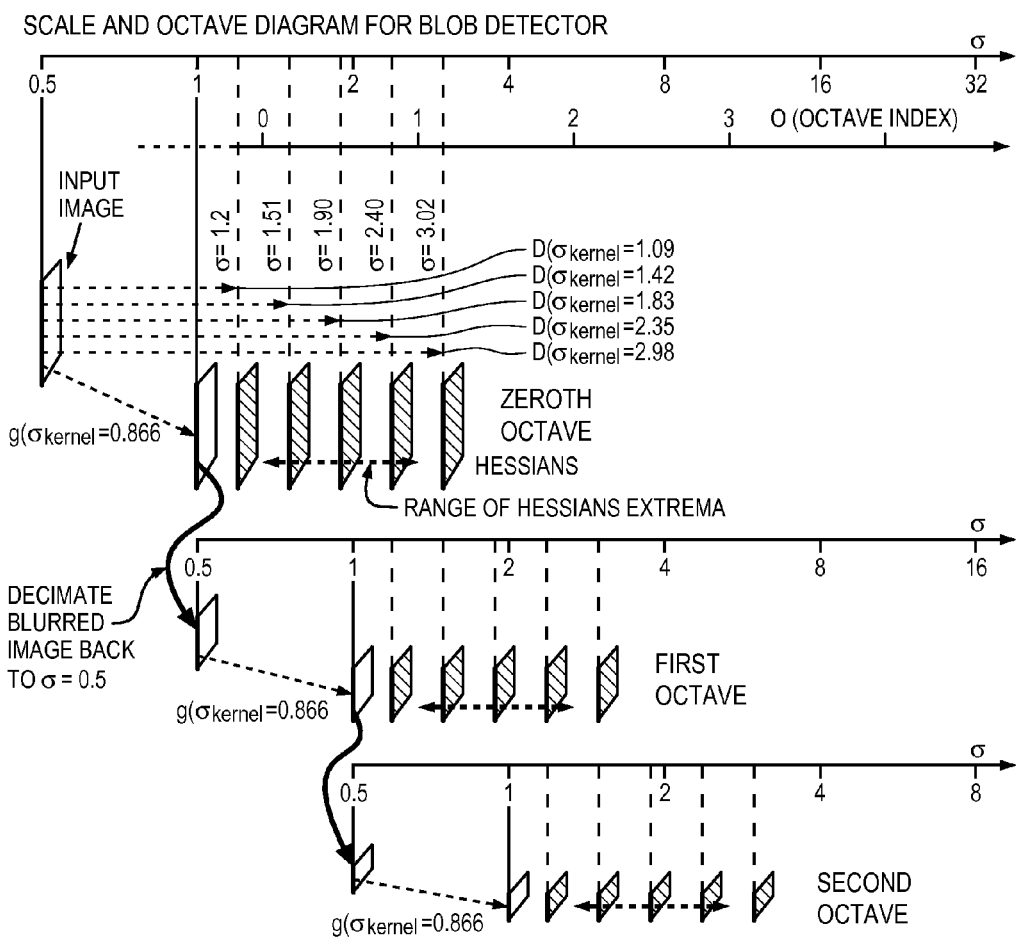
FIG. 18 is a scale and octave diagram for the second embodiment of the invention in accordance with an embodiment of the present invention.

The scale and octave diagram of FIG. 18 illustrates the effects of these choices of filter. The horizontal a axis is a logarithmic scale.

The procedure for generating the filters (in Matlab) is simple. First, Gaussian blur filters G(x, y) with appropriate values of σ are generated. These are shifted and subtracted to calculate derivatives filters:

$$\frac{\partial G(x,y)}{\partial x} \approx G_x = \frac{1}{2}(G(x+1,y)-G(x-1,y))$$

$$\frac{\partial G(x,y)}{\partial y} \approx G_y = \frac{1}{2}(G(x,y+1)-G(x,y-1))$$

The process is repeated to generate the second derivatives:

$$\frac{\partial G_x(x,y)}{\partial x} \approx G_{xx} = \frac{1}{2}(G_x(x+1,y)-G_x(x-1,y));$$

$$\frac{\partial G_y(x,y)}{\partial y} \approx G_{yy} = \frac{1}{2}(G_y(x,y+1)-G_y(x,y-1)); \text{ and}$$

$$\frac{\partial G_x(x,y)}{\partial y} \approx G_{xy} = \frac{1}{2}(G_x(x,y+1)-G_x(x,y-1)); \text{ or}$$

$$\frac{\partial G_y(x,y)}{\partial x} \approx G_{yx} = \frac{1}{2}(G_y(x+1,y)-G_y(x-1,y)).$$

The last two are alternatives because $G_{xy}$ and $G_{yx}$ should be equal.

Next, the quantisation of filter is performed, allowing only a fixed number of values in the filter. This can be achieved by recognising that the most negative filter value is always the minimum of $G_{xx}$. This allows us to define a quantization range:

$$\text{range}=-2\times\min(G_{xx}).$$

With nlevels representing the number of levels permitted in the quantization of the filter, for example 8 or 16, the quantization of the filters can then be achieved by setting:

$$D_{xx} = \text{round}\left(\frac{G_{xx}}{\text{range}} \times (nlevels - 1)\right);$$

$$D_{yy} = \text{round}\left(\frac{G_{yy}}{\text{range}} \times (nlevels - 1)\right);$$

$$D_{xy} = \text{round}\left(\frac{G_{xy}}{\text{range}} \times (nlevels - 1)\right).$$

Quantization of the filters to nlevels levels means that it is no longer normalized. The output of each filter must therefore be re-normalised as follows. If $H_{xx}$ is the convolution product of $D_{xx}$ with the image data, $H_{yy}$ is the convolution product of $D_{yy}$ with the image data and $H_{xy}$ is the convolution product of $D_{xy}$ with the image data, then the scale normalized Hessian determinant is given by:

$$|H(x, y)|_{norm} \approx [H_{xx}(x, y) \cdot H_{yy}(x, y) - (wH_{xy}(x, y))^2] \cdot \left[\frac{\text{range} \cdot \sigma}{(nlevels - 1)}\right]^2.$$

The first term in square brackets on the right hand side is the output from the subtractor 155 in FIG. 17. It is provided as a first input to the extra multiplier 158. The other input to the extra multiplier is the factor norm:

$$norm = \left[\frac{\text{range} \cdot \sigma}{(nlevels - 1)}\right]^2.$$

Since for each filter, range, σ and nlevels are all known, the factor norm is a pre-calculated floating-point constant that is built into the hardware.

The weight w that is used to balance the determinant is calculated from:

$$w = \frac{\|G_{xy}\|_F \|D_{yy}\|_F}{\|G_{yy}\|_F \|D_{xy}\|_F}$$

The notation $\|G_{xy}\|_F$ denotes the Frobenius norm. For each filter, this matrix norm is known, so that factor w is also a pre-calculated floating-point constant that is built into the hardware.

From the sizes of the filter kernels listed above, it can be seen that the minimum number of lines in the line buffer 101 is determined by the size of zeroth octave filter $|H_{2.98}|$ (114" in FIG. 16), which, as shown, requires 19 lines of image data simultaneously. The minimum number of lines in the decimated line buffer 201 is determined by the size of subsequent octave filter $|H_{2.98}|$ (214" in FIG. 16), which, as shown, also requires 19 lines of image data simultaneously. It will therefore be understood that 19 lines of image data are supplied simultaneously to the convolution registers 104, 204. As a new line of image data is received, it is conveyed to the convolution registers 104, 204 together with 18 lines of previously received data from the line buffer 101 or decimated line buffer 201, making for 19 lines of data altogether. At the same time, the oldest line of data in the line buffer 101, 201 is discarded and the new line of data is stored. The size of the convolution registers are also determined by this requirement. The convolution registers are 19 rows×19 columns.

The data is conveyed and discarded on a column-by-column basis. In other words, when a new pixel of image data is received, it is conveyed to the convolution registers 104, 204 together with 18 pixels of previously received data from the associated column in the line buffer 101 or decimated line buffer 201, making for a column of data with 19 pixels altogether. This column of data is shifted into the convolution registers 104, 204 and the oldest column in the convolution registers 104, 204 drops out. Thus, the subset of image data contained in each of the line buffers 101, 201 and the convolution registers contained in each of the line buffers 101, 201 is continually being turned over. All 19 lines of image data are conveyed from the convolution registers 104, 204 to the Hessian filters 110" ... 113", 210" ... 213".

Downscaled image data is supplied to the decimated line buffer 201 through multiplexer 202. The multiplexer determines whether data from the zeroth octave decimator 121 of the subsequent octave decimator 221 is going to be written into the decimated line buffer. During operation of the device of FIG. 16, the decimated line buffer 201 contains 18½-lines of first octave data (because a line of octave one data is half as long as a line of zeroth octave data). It contains 18¼-lines of second octave data, 18⅛-lines of third octave data, and so on. This means that 18 rows of all octaves of downscaled image data (first octave, second octave, etc.) can be stored in a decimated line buffer 201 that is no larger than the zeroth octave line buffer 101.

The outputs of the five Hessian filters 110" ... 114", 210" ... 214" are supplied to three peak detectors 131 ... 133, 231 ... 233. Three are used in each of the zeroth and subsequent octave hardware 100, 200 because five filters are used. The first zeroth octave peak detector 131 is connected to the output of the first to third zeroth octave Hessian filters 110", 111" and 112". The second zeroth octave peak detector 132 is connected to the output of the second to fourth zeroth octave Hessian filters 111", 112" and 113". The third zeroth octave peak detector 133 is connected to the output of the third to fifth zeroth octave Hessian filters 112", 113" and 114".

The first subsequent octave peak detector 231 is connected to the output of the first to third subsequent octave Hessian filters 210", 211" and 212". The second subsequent octave peak detector 232 is connected to the output of the second to fourth subsequent octave Hessian filters 211", 212" and 213". The second subsequent octave peak detector 232 is connected to the output of the third to fifth subsequent octave Hessian filters 212", 213" and 214".

The peak detectors 131 ... 132, 231 ... 232 are identical and their purpose is to perform the extremum detection that has already been described with reference to FIG. 3. The output of the peak detectors is supplied to localization block 135, 235 which in this case performs exactly the same function as the localization block 135, 235 of FIG. 9. An interpolator 136, 236 also performs as in FIG. 9. The interpolated position $\hat{x}$ of candidate interest points is output to weak point eliminator 137', 237', which also receives the output of localization block 135, 235. Weak points are eliminated as before, but there is no edge detection in this embodiment.

Once an interest point that has not been discarded as a weak point has been identified, the weak point eliminator 137, 237 outputs the position of the interest point in scale space. It also signals the orientation and localization engine 103, 203 accordingly. The orientation and localization engine 103, 203 determines the orientation (m, θ) and generates a descriptor. The descriptor may be the same descriptor as is used in SIFT, described above with reference to FIG. 9, or a SURF descriptor or another descriptor. Each of the orientation and localization engines 103, 203 may contain the same hardware as in FIG. 9, including processors 140', 141', 240', 241' that assign orientation and calculate the descriptors, but here it is illustrated with a neighbourhood buffer RAM instead of a slope RAM, meaning that if the same orientation and descriptor calculations are to be performed as in FIGS. 9 and 13, the processors 140', 141', 240', 241' will have to calculate the slopes themselves.

The operation of the device illustrated in FIG. 16 is essentially the same as that of FIGS. 9 and 13. At a high level, each of the zeroth octave and subsequent octave hardware 100, 200 includes a line buffer 101, 201, a pipeline consisting of the convolution registers 104, 204, a convolution engine consisting of the Hessian filters 110"... 114", 210"... 213" and the Gaussian filters 120, 220, an interest point identifier consisting of the peak detectors 131... 133, 231... 233, localization block 135, 235, interpolators 136, 236, and weak point eliminators 137', 237'. In addition, each of the zeroth octave and subsequent octave hardware 100, 200 includes sequencing circuitry that controls the operation of the other components so that the correct operations are performed on the correct data and the correct time. The sequencing circuitry may be a control block that coordinates the operation of the other components or it may, as illustrated in FIG. 16, not be a separately identifiable functional block, but rather built into the other components in a distributed way. The sequencing may be implemented as a state machine, either as a central control block, or distributed state machines, or a combination of both.

The process by which image data is received into the line buffer 101 has already been described. As the $18^{th}$ line of image data is received into the line buffer 101, it is output to the pipeline 104 and thence to the convolution engine 110"... 114", 120 together with the zeroth to $17^{th}$ lines of image data that have previously been stored in the line buffer 101, and at the same time the zeroth line of image data is discarded and replaced by the $18^{th}$ line. This process continues until all the lines of image data are received. Thus, as the $j^{th}$ line of image data is received into the line buffer 101, it is output to the pipeline 104 and thence to the convolution engine 110"... 114", 120 together with the $j-18^{th}$ to $j-1^{th}$ lines that have previously been stored in the line buffer 101, and at the same time the $j-18^{th}$ line of image data is discarded and replaced by the $j^{th}$ line.

The Gaussian filter 120 of the convolution engine receives the image data from the line buffer 101 via the pipeline 104, blurs it and outputs it to the decimator 121. The decimator 121 outputs the blurred data from every other row and every other column, in other words a pattern of every fourth pixel location in the received image data, as downscaled image data. This data is fed via the multiplexer 202 into the decimated line buffer 201 of the subsequent octave hardware 200. The image data from the pipeline 104 is convolved with the Hessian filters 110"... 114", which output Hessian filtered data to the interest point identifier 131... 133, 135-137'. The interest point identifier receives the Hessian-filtered data and detects extrema in the peak detectors 131... 133 to identify candidate interest points at appropriate scales, and, once the remaining components have interpolated and rejected weak points and edge points, it outputs the position and scale of the candidate interest points.

Data fed via the multiplexer 202 into the decimated line buffer 201 of the subsequent octave hardware 200 is treated in a similar way. As the $18^{th}$ line of decimated image data is received into the decimated line buffer 201, it is output to the pipeline 204 and thence to the convolution engine 210'... 213', 220 together with the zeroth to $17^{th}$ lines of decimated image data that have previously been stored in the decimated line buffer 201, and at the same time the zeroth line of decimated image data is discarded and replaced by the $18^{th}$ line. This process continues until all the lines of decimated image data are received. Thus, as the $j^{th}$ line of decimated image data is received into the decimated line buffer 201, it is output to the pipeline 204 and thence to the convolution engine 210... 214, 220 together with the $j-18^{th}$ to $j-1^{th}$ lines that have previously been stored in the decimated line buffer 101, and at the same time the $j-18^{th}$ line of image data is discarded and replaced by the $j^{th}$ line.

The Gaussian filter 220 of the convolution engine receives the decimated image data from the pipeline 204, blurs it and outputs it to the decimator 221. The decimator 221 outputs the blurred data from every other row and every other column, in other words a pattern of every fourth pixel location in the decimated image data as twice decimated image data. This data is fed back via the multiplexer 202 into the decimated line buffer 201 of the subsequent octave hardware 200. The decimated image data from the pipeline 204 is convolved with the Hessian filters 210"... 214", which output Hessian filtered, decimated data to the interest point identifier 231... 233, 235-137'. The interest point identifier receives the Hessian-filtered, decimated data and detects extrema in the peak detectors 231... 233 to identify candidate interest points at appropriate scales, and, once the remaining components have interpolated and rejected weak points and edge points, it outputs the position and scale of the candidate interest points.

As has already been discussed, each line of decimated data fed via the multiplexer 202 into the decimated line buffer 201 from the zeroth octave hardware only occupies half as much space as each line of data in the line buffer 101, but the decimated line buffer 201 is as long as the line buffer 101. The data from the zeroth octave hardware 100 therefore occupies one half of each line of the decimated line buffer 201. Twice decimated data from the decimator 221 is also fed via the multiplexer back to the decimated line buffer 201. Lines of this data are half as long again. They occupy one quarter of each line of the decimated line buffer 201 and are positioned directly adjacent to the data fed in from the zeroth octave hardware 100.

As the $18^{th}$ line of twice decimated image data is received into the decimated line buffer 201, it is output to the pipeline 204 and thence to the convolution engine 210"... 214", 220 together with the zeroth to $17^{th}$ lines of twice decimated image data that have previously been stored in the decimated line buffer 201, and at the same time the zeroth line of twice decimated image data is discarded and replaced by the $18^{th}$ line. This process continues until all the lines of twice decimated image data are received. Thus, as the $j^{th}$ line of twice decimated image data is received into the decimated line buffer 201, it is output to the pipeline 204 and thence to the convolution engine 210'... 213', 220 together with the $j-18^{th}$ to $j-1^{th}$ lines of twice decimated image data that have previously been stored in the decimated line buffer 101, and at the same time the $j-18^{th}$ line of twice decimated image data is discarded and replaced by the $j^{th}$ line.

The Gaussian filter 220 of the convolution engine receives the twice decimated image data from the pipeline 204, blurs it and outputs it to the decimator 221. The decimator 221 outputs the blurred data from every other row and every other column, in other words a pattern of every fourth pixel location in the twice decimated image data, as three times decimated image data. This data is fed back via the multiplexer 202 into the decimated line buffer 201 of the subsequent octave hardware 200. The twice decimated image data from the pipeline 204 is convolved with the Hessian filters 210"... 214", which output Hessian filtered, twice decimated data to the interest point identifier 231... 233, 235-137'. The interest point identifier receives the Hessian-filtered, twice decimated data and detects extrema in the peak detectors 231... 233 to identify candidate interest points at appropriate scales, and, once the remaining components have interpolated and rejected weak points and edge points, it outputs the position and scale of the candidate interest points.

The three times decimated data from the decimator 221 is also fed via the multiplexer back to the decimated line buffer 201. Lines of this data occupy one eighth of each line of the decimated line buffer 201 and are positioned directly adjacent to the twice decimated data. This process continues until a limit is reached on the number of octaves of data to be decimated, at which point data from the decimator 221 is no longer fed back to the decimated line buffer 201. Each of the lines of the decimated line buffer will, once a steady state has been reached, consist of half a line of decimated image data, one quarter of a line of twice decimated data, one eighth of a line of three times decimated data etc.

Because the throughput of rows of each octave of image data is a multiple of, for example double, that of the rows of the next octave, the line buffer must include some mechanism to allow this to happen. One possibility is that each section of the line buffer (one for each octave) forms a chain of storage locations in the nature of a shift register so that the columns of, for example, an octave of image data can be shifted along and then upwards, thus discarding the uppermost row or rows and making room for a new row or rows at the bottom. Alternatively, pointers could be used to keep track of the location of the oldest rows of data. Another possibility is to configure the buffer as a RAM with suitable addressing.

As with the circuit of FIG. 9, the fact that the various octaves of data are stored next to each other in the decimated line buffer makes it easy to schedule the provision of the various octaves of data to the pipeline 204 and the convolution engine, just as in the case of FIGS. 9 and 13.

According to the embodiment of the invention illustrated in FIG. 16, time that would otherwise have been idle between the processing of lines of once decimated image data is used to process the next and all subsequent octaves of decimated image data. The data are again processed in octave order, which is precisely the order in which they are stored in the decimated line buffer 201. Thus, if the processing of once decimated data is to be followed by the processing of twice decimated data in the period when otherwise the hardware would be idle, the decimated line buffer 201 will output the content of three quarters of each of its lines instead of one half. The first half of each line contains the once decimated data, and the third quarter contains the twice decimated data. The 19$^{th}$ line of the twice decimated data to be processed is generated from the once decimated data processed immediately beforehand and will need to be delayed in a buffer (not shown) before being returned to the decimated line buffer 201 via the multiplexer 202.

Similarly, if the processing of once decimated data is to be followed by the processing of twice and three times decimated data in the period when otherwise the hardware would be idle, the decimated line buffer 201 will output the content of seven eighths of each of its lines instead of one half or three quarters. The first half of each line contains the once decimated data, the third quarter contains the twice decimated data and the seventh eighth contains the three times decimated data. The 19$^{th}$ line of the twice decimated data to be processed is generated from the once decimated data processed immediately beforehand and will need to be delayed in a buffer (not shown) before being returned to the decimated line buffer 201 via the multiplexer 202. The 19$^{th}$ line of the three times decimated data to be processed is generated from the twice decimated data processed immediately beforehand and will also need to be delayed in a buffer (not shown) before being returned to the decimated line buffer 201 via the multiplexer 202. The timing, once again, is as illustrated in FIG. 12.

As in the implementations discussed with reference to FIGS. 9 and 13, the zeroth octave can be handled at full pixel rate and subsequent octaves down-sampled into a further buffer 201. It is possible to avoid having two copies of the filter arithmetic by clocking at twice the pixel rate or by doing a simple downscale of the input image to lower resolution (so reducing the pixel rate and the line length).

The device of FIG. 16 is susceptible to being integrated onto a single chip. By using integers in the calculation of |H|, each block of similar coefficients only requires two adders per line for the convolution calculation irrespective of the size of the block. Consequently, the number of adders needed for all the |H| calculations is a total of just over 800, with about two dozen multipliers. The memory requirement is only 36 lines of RAM or SAM, plus the (much smaller) neighbourhood memories and the memory for the processor.

Figure 19:
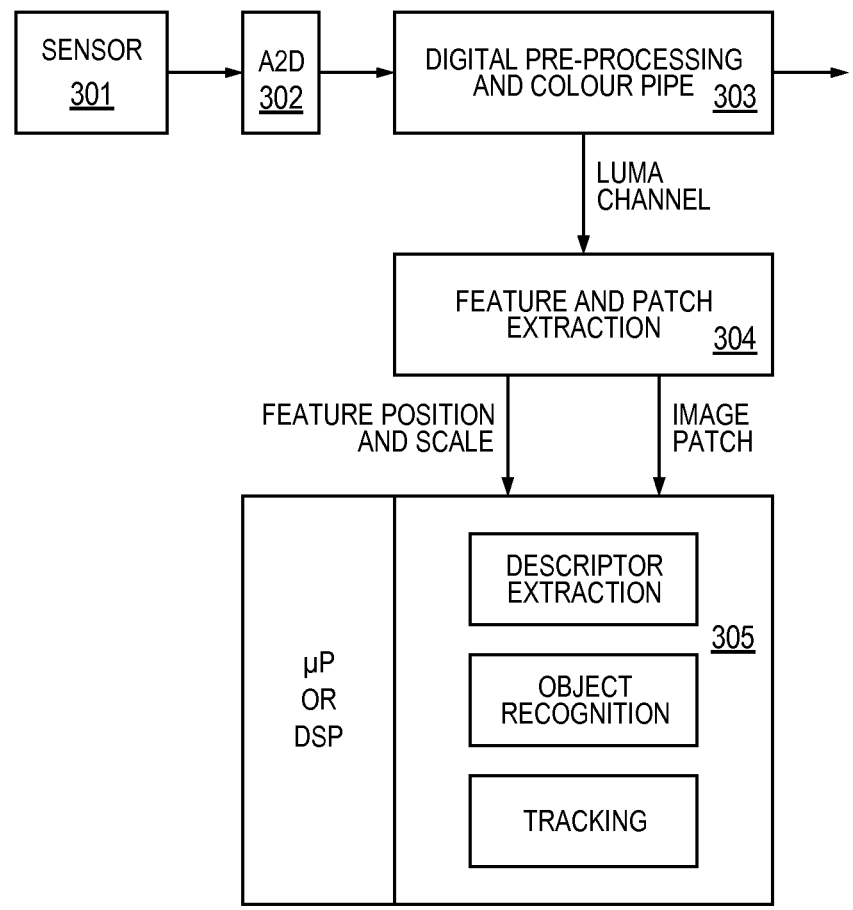
FIG. 19 is a block diagram of an image sensor chip according to a fourth embodiment of the invention in accordance with an embodiment of the present invention.

FIG. 19 is a block diagram of an image sensor chip according to an embodiment of the invention. The chip includes a CCD or CMOS image sensor 301, the output of which is passed via an analogue-to-digital converter 302 to a digital pre-processing and colour pipe 303. The digital pre-processing and colour pipe 303 extracts the luma channel from the digitally converted image data and passes it to the feature and patch extraction block 304. The output of the feature and patch extraction block 304 passes to a microprocessor or digital signal processor DSP 305, which calculates descriptors and may also perform additional functions such as object recognition and tracking.

Figure 20:
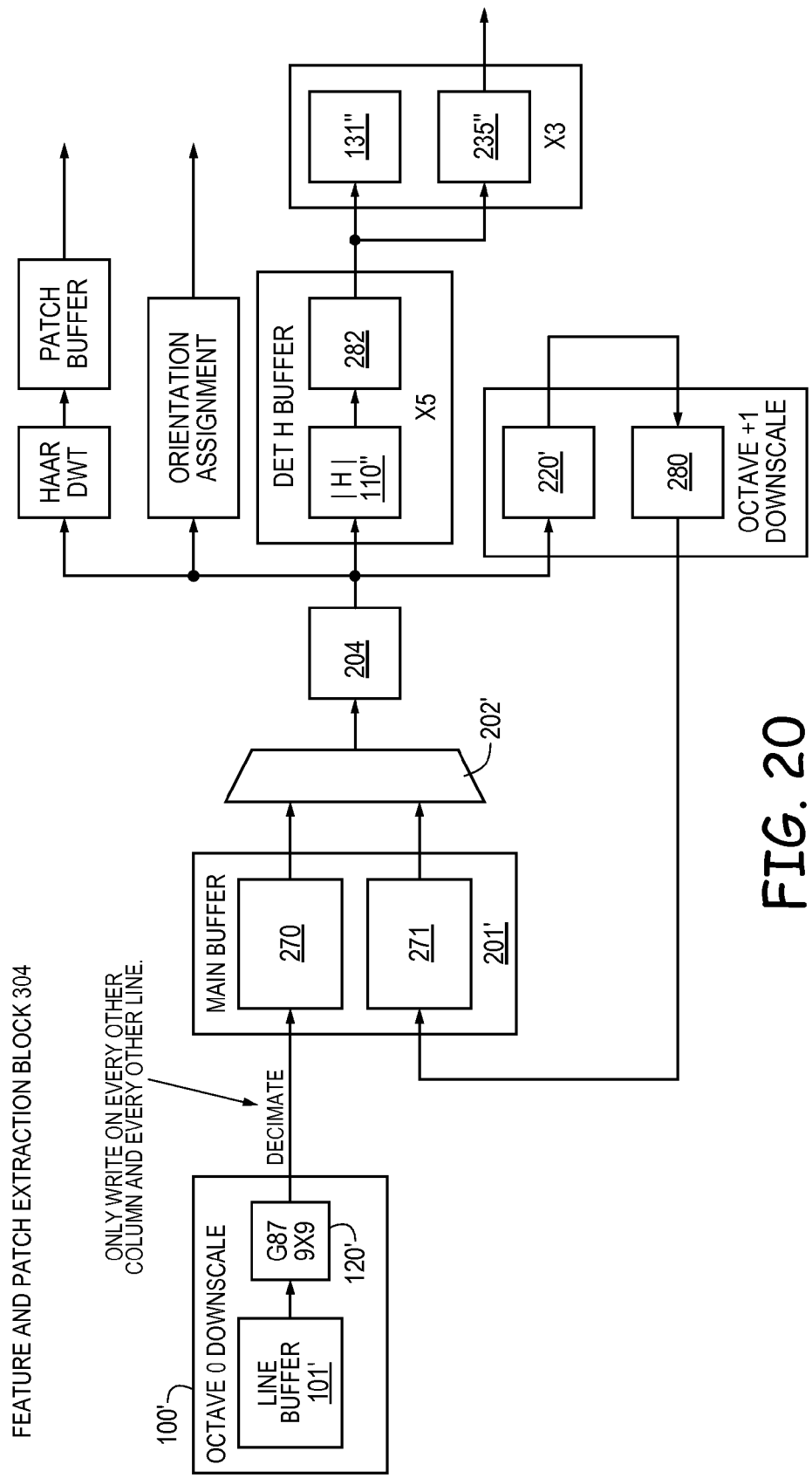
FIG. 20 depicts the feature and patch extraction block of FIG. 19 in accordance with an embodiment of the present invention.

An overview of the feature and patch extraction block 304 is shown in FIG. 20. In many ways, it is similar to the embodiments of the invention illustrated in FIGS. 9, 13 and 16, but there are a number of differences. One difference is that the feature and patch extraction block 304 does not possess zeroth octave hardware 100 of the type found in the previously discussed embodiments of the invention.

The zeroth octave hardware 100' of this embodiment includes a line buffer 101' and a 9×9 Gaussian filter 120'. Image data is received directly into the line buffer 101'. The line buffer 101' contains eight full lines of image data and, in the same way as has been described at length in relation to the line buffers of previous embodiments of the invention, nine lines of image data can therefore be supplied to the Gaussian filter 120' simultaneously on a column-by-column basis. The blurred data is written to a main buffer 201' on alternate rows and columns. Thus, zeroth octave image data is simply blurred and decimated before being stored in the main line buffer 201'.

As illustrated, the main line buffer 201' is divided into a first octave buffer 270 and a subsequent octaves buffer 271. Decimated data from the zeroth octave hardware 100' is written to the first octave buffer 270 and therefore this buffer need only be on half line in length. In common with the embodiment of the invention illustrated in FIG. 16, this buffer contains 18 lines. A feature of this embodiment of the invention is that the line buffer 270 is smaller than the line buffer 101 in the embodiment of FIG. 16. It is constructed as an 18½ line buffer. Each pixel position in the line buffer is embodied as an 8 bit integer value, but other number of bits can be used depending upon the accuracy required.

Exactly as described with reference to the line buffer 101 of FIG. 16, the line buffer 270 receives image data line-by-line. In general, the image data will contain many more than 18 lines per frame, from which it will be clear that the line buffer 101 is physically incapable of storing more than a fraction of an image frame. Once the line buffer 101 is full, subsequent lines of image data are received into it at the expense of the oldest line of data it contains. As before, the size of the line buffer 101 is determined by the requirements of downstream components.

As will be described a little later, data from the first octave buffer 270 is processed and decimated and the decimated data is written to the subsequent octave buffer 271. The process continues with further levels of decimation, just as before. For reasons that will be apparent given previous discussions, subsequent octave buffer 271 is also an 18½ line buffer. Each pixel position in the line buffer is embodied as an 8 bit integer value, but other number of bits can be used depending upon the accuracy required. Again, the subsequent octave buffer 271 is physically incapable of storing more than a fraction of an image frame. Once the line buffer 101 is full, subsequent lines of image data are received into it at the expense of the oldest line of data it contains.

To ensure that the right data, from the first octave buffer 270 or the subsequent octave buffer 271, are processed at the right time, a multiplexer 202' is provided at the output of the two buffers and from it data is written to convolution pipeline registers 204. Thus, data from either the first octave buffer 270 or the subsequent octave buffer 271 are selected by the multiplexer 202' under the control of sequencing circuitry (not shown). It should be understood, however, that this is only one example of how things might be done. An alternative is to use a single 18 full line buffer with a multiplexer on its input side, selecting data from the zeroth octave hardware 100' or data that has already been processed and decimated, just as is done in the case of the decimated line buffers of the previously described embodiments. One can conceptualize such an 18 full line buffer as the two buffers 270, 271 placed side by side, so that each line of the full line buffer consists of a line of the first octave buffer 270 and a line of the subsequent octave buffer. Indeed, for the purposes of this application, there is no difference between such a side-by-side arrangement and the top-and-bottom arrangement that is shown. Physically, the arrangements are different, but logically they are the same. Thus, where in this application reference is made to a line of a buffer or a row or a column or, this can mean either a physical line, row or column or a logical line, row or column.

The feature and patch extraction block 304 includes five filters 110", of which only one is shown and these are once again configured as direct Hessian filters that calculate |H|, to which the image data from the convolution pipeline 204 is simultaneously fed. Each of the Hessian filters calculates the determinant of the Hessian matrix at successive scales. These filters are identical to the filters of the embodiment of FIG. 16, as illustrated in FIG. 17 and discussed above. As before, the size of the filter $|H_{2.98}|$ determines the minimum number of lines in the line buffers, here 18, and the pipeline registers, here 19×19.

A downscaling Gaussian 220' and ½-line delay buffer 280 perform the blurring, and decimation functions that have been described with reference to previous embodiments of the invention and delay the decimated data so that it is synchronized with the data being read out of the line buffer 271. Although the previous embodiments do not show a delay buffer 280, such a buffer has been mentioned for the purposes of synchronization. Both the Gaussian filters 120', 220' have σ=0.866.

Thus, the subsequent octave line buffer 271 receives decimated image data line-by-line. In general, the decimated image data will contain many more than 18 lines per frame, from which it will be clear that the buffer 271 is physically incapable of storing more than a fraction of an image frame. Once the subsequent octave line buffer 271 is full, subsequent lines of decimated image data are received into it at the expense of the oldest line of decimated data it contains.

It can be seen that the minimum number of lines in the subsequent octave line buffer 271 is determined by the size of the filter $|H_{2.98}|$, which requires 19 lines of image data simultaneously.

During operation of the device of FIGS. 19 and 20, the subsequent octave line buffer 271 contains 18¼-lines of second octave data, 18⅛-lines of third octave data, and so on. This means that 18 rows of all subsequent octaves of downscaled image data (second octave, third octave, etc.) can be stored in a subsequent octave line buffer 271 that is no larger than the first octave line buffer 270.

Figure 21:
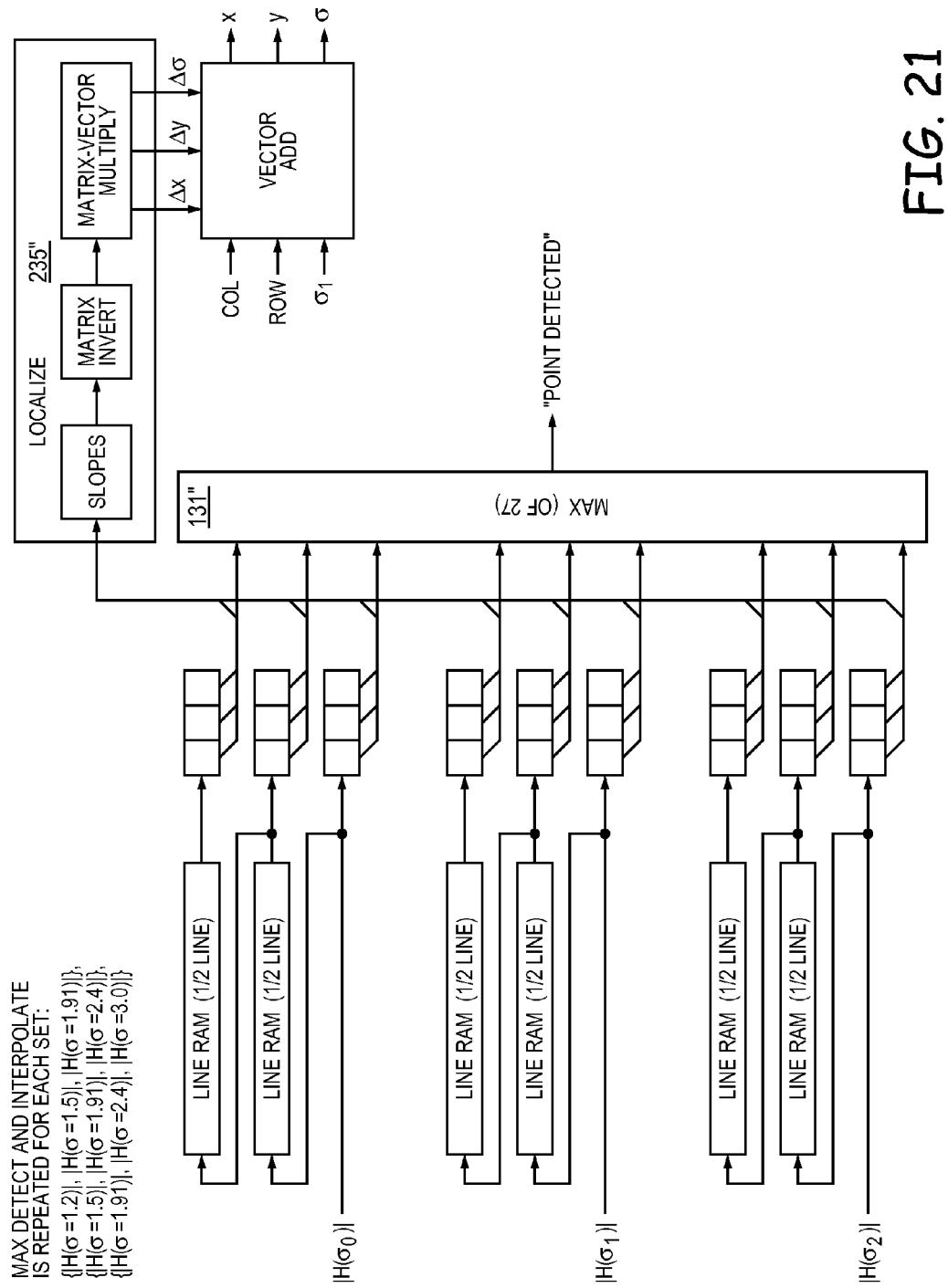
FIG. 21 depicts the peak detectors and localization block of FIG. 20.

The outputs of the five Hessian filters 110" are buffered in line RAMs 282, to make sure that two previous lines' worth of |H| calculations are available to peak detectors 131". The results are passed onto localization block 235". This is shown in greater detail in FIG. 21. Here it can be seen that the outputs of each Hessian filter 110" are cycled through two serially connected ½-line RAMs and into 3×3 registers on which the peak detectors work. This same arrangement can be used in the embodiments of the invention previously described.

Three peak detectors 131" are used because five filters 110" are used. The peak detectors 131 . . . 132, 231 . . . 232 are identical and their purpose is to perform the extremum detection that has already been described with reference to FIG. 3. The localization block 235" performs exactly the same function as the localization blocks 135, 235 of FIG. 9. An interpolator may also be present to perform as in FIG. 9. The interpolated position $\hat{x}$ of candidate interest points may be output to a weak point eliminator, but this is not shown or required.

Orientation assignment may be performed as before, and the neighbourhood of an image around detected interest points may be stored in a patch buffer. The image data may be Haar transformed beforehand.

The operation of the device illustrated in FIG. 19 is quite similar to that of FIG. 16. At a high level, it includes a line buffer 270, 271, a pipeline consisting of the convolution pipeline registers 204, a convolution engine consisting of the Hessian filters and the Gaussian filters 120', 220' and an interest point identifier consisting of the peak detectors 131" and localization block 235", interpolators 136, 236, and weak point eliminators 137', 237'. In addition, it includes sequencing circuitry that controls the operation of the other components so that the correct operations are performed on the correct data and the correct time. The sequencing circuitry may be a control block that coordinates the operation of the other components or it may, as illustrated in FIG. 19, not be a separately identifiable functional block, but rather built into the other components in a distributed way. The sequencing may be implemented as a state machine, either as a central control block, or distributed state machines, or a combination of both.

The process by which image data is received into the first octave line buffer 270 has already been described. As the 18$^{th}$ line of image data is received into the first octave line buffer 270, it is output to the pipeline 204 via the multiplexer 202' and thence to the convolution engine 110", 120', 220' together with the zeroth to 17$^{th}$ lines of image data that have previously been stored in the first octave line buffer 270, and at the same time the zeroth line of image data is discarded and replaced by the 18$^{th}$ line. This process continues until all the lines of image data are received. Thus, as the j$^{th}$ line of image data is received into the first octave line buffer 270, it is output to the pipeline 204 and thence to the convolution engine 110", 120', 220' together with the j–18$^{th}$ to j–1$^{th}$ lines that have previously been stored in the line buffer 101, and at the same time the j–18$^{th}$ line of image data is discarded and replaced by the j$^{th}$ line.

The Gaussian filter 220' of the convolution engine receives the image data from the first octave line buffer 270 via the pipeline 204, blurs it and outputs it to the delay buffer 280. The delay buffer stores blurred data from every other row and every other column, in other words a pattern of every fourth pixel location in the received image data, as downscaled image data. This data is fed into the subsequent octave line buffer 271. The image data from the pipeline 204 is convolved with the Hessian filters 110", which output Hessian filtered data to the interest point identifier 131", 235". The interest point identifier receives the Hessian-filtered data and detects extrema in the peak detectors 131" to identify candidate interest points at appropriate scales, and, once the remaining components have localized the interest point, it outputs the position and scale of the candidate interest points.

Data fed into the subsequent octave line buffer 271 is treated in a similar way. As the 18$^{th}$ line of second octave image data is received into the subsequent octave line buffer 271, it is output to the pipeline 204 via the multiplexer 202' and thence to the convolution engine 110", 120', 220', together with the zeroth to 17$^{th}$ lines of second octave image data that have previously been stored in the subsequent octave line buffer 271, and at the same time the zeroth line of second octave image data is discarded and replaced by the 18$^{th}$ line. This process continues until all the lines of second octave image data are received. Thus, as the j$^{th}$ line of second octave image data is received into the subsequent octave line buffer 271, it is output to the pipeline 204 and thence to the convolution engine together with the j–18$^{th}$ to j–1$^{th}$ lines that have previously been stored in the subsequent octave line buffer 271, and at the same time the j–18$^{th}$ line of second octave image data is discarded and replaced by the j$^{th}$ line.

The Gaussian filter 220' of the convolution engine receives the second octave image data from the pipeline 204, blurs it and outputs it to the delay buffer 280, which performs as already described. The delay buffer 280 stores the blurred data from every other row and every other column, in other words a pattern of every fourth pixel location in the second octave image data as twice decimated image data. This data is fed back into the subsequent octave line buffer 271. The second octave image data from the pipeline 204 is convolved with the Hessian filters 110", which output Hessian filtered, second octave data to the interest point identifier. The interest point identifier receives the Hessian-filtered, second octave data and detects extrema in the peak detectors 131" to identify candidate interest points at appropriate scales, and, once the remaining components have localized the interest point, it outputs the position and scale of the candidate interest points.

Each line of second octave data fed into the subsequent octave line buffer 271 only occupies half as much space as each line of data in the first octave line buffer 270, but the subsequent octave line buffer 271 is as long as the first octave line buffer 270. The second octave data therefore occupies one half of each line of the subsequent octave line buffer 271. Third octave data from the delay buffer 280 is also fed back to the subsequent octave line buffer 271. Lines of this data are half as long again. They occupy one quarter of each line of the subsequent octave line buffer 271 and are positioned directly adjacent to the second octave image data.

As the 18$^{th}$ line of third octave image data is received into the subsequent octave line buffer 271, it is output via the multiplexer 202' to the pipeline 204 and thence to the convolution engine together with the zeroth to 17$^{th}$ lines of third octave image data that have previously been stored in the subsequent octave line buffer 271, and at the same time the zeroth line of third octave image data is discarded and replaced by the 18$^{th}$ line. This process continues until all the lines of third octave image data are received. Thus, as the j$^{th}$ line of third octave image data is received into the subsequent octave line buffer 271, it is output to the pipeline 204 and thence to the convolution engine together with the j–18$^{th}$ to j–1$^{th}$ lines of third octave image data that have previously been stored in the subsequent octave line buffer 271, and at the same time the j–18$^{th}$ line of third octave image data is discarded and replaced by the j$^{th}$ line.

The Gaussian filter 220' of the convolution engine receives the third octave image data from the pipeline 204, blurs it and outputs it to the delay buffer, which performs as before. This data is fed back into the subsequent octave line buffer 271. The third octave image data from the pipeline 204 is convolved with the Hessian filters 110", which output Hessian filtered, third octave data to the interest point identifier, which again performs as before.

The fourth octave decimated data from the delay buffer is also fed back to the subsequent octave line buffer 271. Lines of this data occupy one eighth of each line of the subsequent octave line buffer 271 and are positioned directly adjacent to the third octave data. This process continues until a limit is reached on the number of octaves of data to be decimated, at which point data from the delay buffer 280 is no longer fed back to the subsequent octave line buffer 271. Each of the lines of the subsequent octave line buffer 271 will, once a steady state has been reached, consist of half a line of second octave image data, one quarter of a line of third octave data, one eighth of a line of fourth octave data etc.

Because the throughput of rows of each octave of image data is a multiple of, for example double, that of the rows of the next octave, the line buffer must include some mechanism to allow this to happen. One possibility is that each section of the line buffer (one for each octave) forms a chain of storage locations in the nature of a shift register so that the columns of, for example, an octave of image data can be shifted along and then upwards, thus discarding the uppermost row or rows and making room for a new row or rows at the bottom. Alternatively, pointers could be used to keep track of the location of the oldest rows of data. Another possibility is to configure the buffer as a RAM with suitable addressing.

As with previous embodiments, the fact that the various octaves of data are stored next to each other in the subsequent octave line buffer makes it easy to schedule the provision of the various octaves of data to the pipeline 204 and the convolution engine.

As before, the data is conveyed and discarded on a column-by-column basis. In other words, when a new pixel of image data is received or generated, it is conveyed to the convolution pipeline 204, together with 18 pixels of previously received data from the associated column in the line buffer 270, 271, making for a column of data with 19 pixels altogether. This column of data is shifted into the convolution pipeline 204, and the oldest column in the pipeline drops out.

According to the embodiment of the invention illustrated in FIG. 19, time that would otherwise have been idle between the processing of lines of second octave image data is used to process the next and all subsequent octaves of decimated image data. The data are again processed in octave order, which is precisely the order in which they are stored in the subsequent octave line buffer 271. Thus, if the processing of second octave data is to be followed by the processing of third octave data in the period when otherwise the hardware would be idle, the subsequent octave line buffer 271 will output the content of three quarters of each of its lines instead of one half. The first half of each line contains the second octave data, and the third quarter contains the third octave data. The 19$^{th}$ line of the third octave data to be processed is generated from the second octave data processed immediately beforehand and is delayed in the delay buffer 280 before being returned to the subsequent octave line buffer 271.

Similarly, if the processing of second octave data is to be followed by the processing of third and fourth octave data in the period when otherwise the hardware would be idle, the subsequent octave line buffer 271 will output the content of seven eighths of each of its lines instead of one half or three quarters. The first half of each line contains the second octave data, the third quarter contains the third octave data and the seventh eighth contains the fourth octave data. The 19$^{th}$ line of the third octave data to be processed is generated from the second octave data processed immediately beforehand and is delayed in the delay buffer before being returned to the subsequent octave line buffer. The 19$^{th}$ line of the fourth octave data to be processed is generated from the third octave data processed immediately beforehand and is delayed in the delay buffer 280 before being returned to the subsequent octave line buffer 271. The timing, once again, is as illustrated in FIG. 12.

As was mentioned with reference to FIGS. 9, 13 and 16, it is possible to avoid having two copies of the filter arithmetic by clocking at twice the pixel rate or by doing a simple downscale of the input image to lower resolution (so reducing the pixel rate and the line length). This is achieved in this embodiment of the invention.

The device of FIG. 19 is integrated onto a single chip. By using integers in the calculation of |H|, each block of similar coefficients only requires two adders per line for the convolution calculation irrespective of the size of the block. Consequently, the number of adders needed for all the |H| calculations is a total of just over 800, with about two dozen multipliers. The memory requirement is only 26 lines plus RAM or SAM, plus the (much smaller) neighbourhood memories and the memory for the processor.

Figure 22:
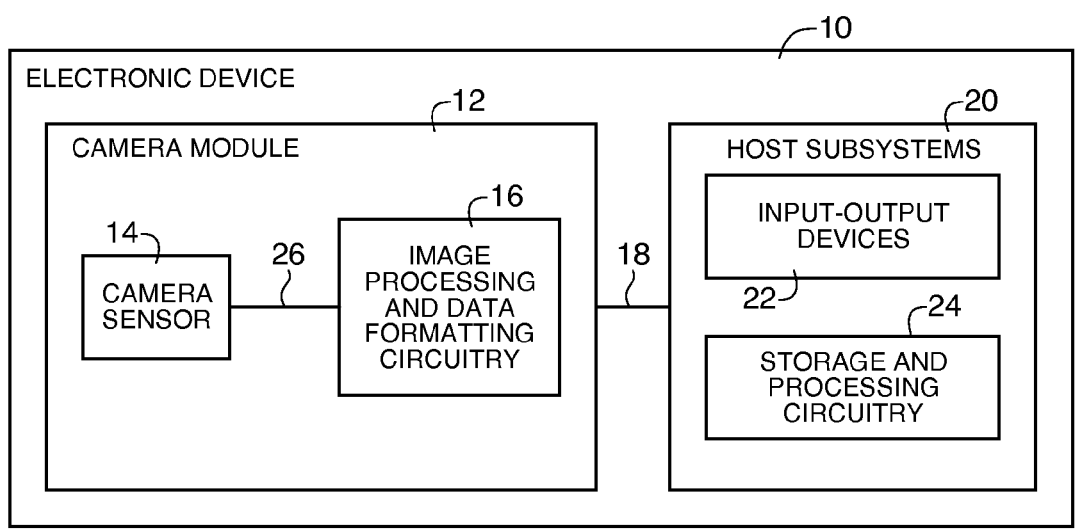
FIG. 22 is a diagram of an illustrative electronic device that may include processing circuitry that identifies interest points in one or more images in accordance with an embodiment of the present invention.

An electronic device with a digital camera module is shown in FIG. 22. Electronic device 10 of FIG. 22 may, as examples, be used in matching interest points as described in connection with FIGS. 1-21 of this application. Electronic device 10 may include hardware, software running on circuitry, and other components and elements that may be utilized in implementing the arrangements described in connection with FIGS. 1-21 of this application.

Electronic device 10 may be a digital camera, a computer, a cellular telephone, a medical device, or other electronic device. Camera module 12 may include image sensor 14 and one or more lenses. During operation, the lenses focus light onto image sensor 14. Image sensor 14 includes photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from camera sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip or SOC arrangement, camera sensor 14 and image processing and data formatting circuitry 16 are implemented on a common integrated circuit. The use of a single integrated circuit to implement camera sensor 14 and image processing and data formatting circuitry 16 can help to minimize costs.

Camera module 12 (e.g., image processing and data formatting circuitry 16) conveys acquired image data to host subsystem 20 over path 18. Electronic device 10 typically provides a user with numerous high-level functions. In a computer or advanced cellular telephone, for example, a user may be provided with the ability to run user applications. To implement these functions, host subsystem 20 of electronic device 10 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

The foregoing is merely illustrative of the principles of this invention which can be practiced in other embodiments.

What is claimed is:

1. A method of identifying candidate interest points in an image having rows and columns of image data, the method comprising:
   receiving the rows of image data in series;
   generating downscaled image data by blurring the image data received, wherein the downscaled image data represents the blurred data from a pattern of pixel locations in the received image data;
   identifying candidate interest points at a first scale by Hessian-filtering the image data and detecting extrema in the Hessian-filtered data;
   discarding the rows of image data in series;
   identifying candidate interest points at a second scale by Hessian-filtering the downscaled image data and detecting extrema in the Hessian-filtered, downscaled data, wherein at least one of the rows of image data is discarded before all the rows of image data have been received;
   generating twice downscaled image data by blurring the downscaled image data, wherein the twice downscaled image data represents the blurred data from a pattern of pixel locations in the once downscaled image data; and
   detecting candidate interest points at a third scale by Hessian-filtering the twice downscaled image data and detecting extrema in the Hessian-filtered, twice downscaled data.

2. The method of claim 1 comprising discarding at least one of the rows of once downscaled image data before all the rows of once downscaled image data have been generated.

3. The method of claim 1 comprising, for m equals 2 to n, where n is an integer greater than 2:
   generating m-times downscaled image data by blurring m−1-times downscaled image data, wherein the m-times downscaled image data represents the blurred data from a pattern of pixel locations in the m−1-times downscaled image data;

identifying candidate interest points at an (m+1)th scale by Hessian filtering the m-times downscaled image data and detecting extrema in the Hessian-filtered, m-times downscaled data; and discarding the rows of m−1-times downscaled image data in series.

4. The method of claim 3 wherein, for m equals 2 to n−1, at least one of the rows of m−1-times downscaled image data is discarded before all the rows of m−1-times downscaled image data have been generated.

5. The method of claim 4 wherein the received image data is received into and discarded from a line buffer.

6. The method of claim 5 wherein the downscaled image data is also received into a line buffer.

7. The method of claim 6 wherein the received image data is received into and discarded from a line buffer and all the downscaled image data is also received into the same line buffer.

8. The method of claim 7 wherein identifying candidate interest points at a particular scale comprises applying at least three Hessian filters spaced in scale space to the image data and detecting extrema in the resulting Hessian-filtered data.

9. The method of claim 8 wherein identifying candidate interest points at a particular scale comprises applying more than three Hessian filters spaced in scale space to the image data and detecting extrema in the resulting Hessian-filtered data at more than one scale.

10. The method of claim 9 wherein the Hessian filters are equally spaced in scale space.

11. A circuit for identifying candidate interest points in an image having rows and columns of image data, the circuit comprising:

at least one input for receiving the rows of image data in series;

a line buffer for storing at most a subset of the rows of image data as they are received, whereby at least one of the rows of image data is to be discarded from the line buffer before all the rows of image data have been received;

a convolution engine adapted to convolve received image data with a blurring filter and to output blurred data from a pattern of pixel locations in the received image data as downscaled image data, and to convolve received image data with at least three Hessian filters of different scales and to output the Hessian filtered data;

an interest point identifier adapted to receive the Hessian filtered data from the convolution engine, to detect extrema in the Hessian-filtered data to identify candidate interest points and to output the position and scale of the candidate interest points so identified; and sequencing circuitry adapted to sequence the operation of the circuit to pass received image data from the line buffer to the convolution engine to be convolved with both the blurring filter and the Hessian filters, to pass downscaled image data from the blurring filter back to the convolution engine to be convolved with the Hessian filters, and to discard the rows of received image data in series, whereby the interest point identifier identifies candidate interest points at a first scale in the Hessian-filtered received image data and at a second scale in the Hessian-filtered, downscaled data and outputs the position and scale of the candidate interest points so identified.

12. The circuit of claim 11 wherein the sequencing circuitry is adapted to sequence the operation of the circuit to pass downscaled image data from the line buffer to the convolution engine to be convolved with both the blurring filter and the Hessian filters, to pass twice downscaled image data from the blurring filter back to the convolution engine to be convolved with the Hessian filters, and to discard the rows of once downscaled image data in series, whereby the interest point identifier also identifies candidate interest points at a third scale in the Hessian-filtered, twice downscaled data and outputs the position and scale of the candidate interest points so identified.

13. The circuit of claim 11 wherein the sequencing circuitry is adapted to sequence the operation of the circuit, for m equals 2 to n, where n is an integer greater than 2, to pass m−1-times downscaled image data from the line buffer to the convolution engine to be convolved with both the blurring filter and the Hessian filters, to pass m-times downscaled image data from the blurring filter back to the convolution engine to be convolved with the Hessian filters, and to discard the rows of m−1-times downscaled image data in series, whereby the interest point identifier also identifies candidate interest points at an (m+1)th scale in the Hessian-filtered, m-times downscaled data and outputs the position and scale of the candidate interest points so identified.

14. The circuit of claim 13 wherein the sequencing circuitry is adapted to sequence the operation of the circuit to pass to pass twice downscaled image data, or m-times downscaled image data as the case may be, from the blurring filter back to the line buffer and then from the line buffer to the convolution engine to be convolved with the Hessian filters.

15. A method of downscaling and organising image data, the method comprising:

receiving image data organised into rows and columns;

storing the image data in a line buffer organised into rows and columns, wherein the rows of image data are stored in successive rows of the line buffer and, in each row, the image data is stored in successive columns;

generating downscaled image data by blurring the image data received, wherein the downscaled image data is organised into rows and columns and represents the blurred data from a pattern of pixel locations in the received image data;

storing the downscaled image data in the same line buffer, wherein the rows of the downscaled image data are stored in successive rows of the line buffer, at least one of which also stores received image data and, in each row, the downscaled image data is stored in successive unused columns;

generating twice downscaled image data by blurring the downscaled image data, wherein the twice downscaled image data is organised into rows and columns and represents the blurred data from a pattern of pixel locations in the once downscaled image data; and storing the twice downscaled image data in the same line buffer, wherein the rows of the twice downscaled image data are stored in successive rows of the line buffer, at least one of which also stores received and once downscaled image data and, in each row, the twice downscaled image data is stored in successive unused columns of the line buffer.

16. The method of claim 15 comprising, for m equals 2 to n, where n is an integer greater than 2:

generating m-times downscaled image data by blurring m−1-times downscaled image data, wherein the m-times downscaled image data represents the blurred data from a pattern of pixel locations in the m−1-times downscaled image data;

storing the m-times downscaled image data into the same line buffer, wherein the rows of the m-times downscaled image data are stored in successive rows of the line buffer, at least one of which also stores received and m−1 times downscaled image data and any and all intermediate downscaled image data, and, in each row, the m-times downscaled image data is stored in successive unused columns.

17. The method claim 16 wherein more than one row of the line buffer stores both received image data and downscaled image data.

18. The method of claim 16 wherein more than one row of the line buffer stores received image data, downscaled image data and twice downscaled image data.

* * * * *